United States Patent [19]
Osumi et al.

[11] Patent Number: 5,588,611
[45] Date of Patent: Dec. 31, 1996

[54] RETRACTOR WITH A CLAMPING MECHANISM

[75] Inventors: Sadanori Osumi; Kiyoshi Ogawa; Toshifumi Taguchi, all of Kanagawa; Mutsumu Haraoka, Aichi, all of Japan

[73] Assignees: NSK Ltd., Tokyo; Toyota Jidosha Kabushiki Kaisha, Toyota, both of Japan

[21] Appl. No.: 399,634

[22] Filed: Mar. 7, 1995

[30] Foreign Application Priority Data

Mar. 10, 1994 [JP] Japan .................................. 6-065441
Mar. 10, 1994 [JP] Japan .................................. 6-065443
Mar. 10, 1994 [JP] Japan .................................. 6-066557

[51] Int. Cl.$^6$ .................................................. B60R 22/42
[52] U.S. Cl. .................................................. 242/381.1
[58] Field of Search ........................... 242/381.1, 381.4; 280/805, 806, 807; 297/472, 476, 478

[56] References Cited

U.S. PATENT DOCUMENTS

| | | |
|---|---|---|
| 4,422,593 | 12/1983 | Takada . |
| 4,949,995 | 8/1990 | Haland et al. ..................... 280/805 |
| 5,154,368 | 10/1992 | Fujimura et al. . |
| 5,174,604 | 12/1992 | Numazawa et al. ............... 280/806 |
| 5,242,213 | 9/1993 | Fohl .................................. 297/472 |
| 5,299,854 | 4/1994 | Fujimura et al. .................. 297/472 |
| 5,323,977 | 6/1994 | Frei et al. ......................... 242/381.1 |

FOREIGN PATENT DOCUMENTS

| | | |
|---|---|---|
| 0487760 | 6/1992 | European Pat. Off. . |
| 3220234 | 3/1983 | Germany . |
| 4014566 | 11/1991 | Germany . |
| 0556719 | 8/1993 | Germany . |
| 9309143 | 9/1993 | Germany . |
| 443550 | 4/1992 | Japan . |
| 443551 | 4/1992 | Japan . |
| 462255 | 5/1992 | Japan . |
| 55618 | 1/1993 | Japan . |
| 556689 | 7/1993 | Japan . |
| 2282317 | 4/1995 | United Kingdom . |

*Primary Examiner*—John M. Jillions
*Attorney, Agent, or Firm*—Sughrue, Mion, Zinn, Macpeak & Seas

[57] ABSTRACT

In a retractor with a clamping mechanism, when a tension exceeding a predetermined value acting on a webbing in a vehicle emergency, a guide member moves in the webbing draw-out direction while plastically deforming a holding device, with the movement of a clamp member in the webbing draw-out direction. After the removal of the guide member, the guide member moves in the webbing draw-out direction while plastically deforming the holding device for preventing its movement. At the same time, the webbing is tightened on the winding shaft. Further, in an initial stage of holding the webbing by the clamping mechanism, the clamp member holds the webbing with all of clamp teeth formed on the clamp member, thereby preventing the draw-out of the webbing. When a tension acting on the webbing after the webbing is held exceeds a predetermined value, plastic deformation of the guide member for guiding the clamp member starts. The clamp member which holds the webbing moves along the webbing. Through the movement of these member, kinetic energy transferred from the occupant to the webbing is absorbed to thereby hold back an increase of the tensile force acting on the webbing.

22 Claims, 37 Drawing Sheets

5,588,611

RETRACTOR WITH A CLAMPING MECHANISM

BACKGROUND OF THE INVENTION

The present invention relates to a retractor (winding device) for use in a seat belt device, and particularly to an improved retractor with a clamping mechanism which directly holds a webbing between opposite parts thereof in a vehicle emergency, thereby to minimize the amount of draw-out of the webbing.

Conventionally, a seat belt device has been used in a vehicle to protect an occupant against collision shocks. The seat belt, when operated, restrains the occupant in a seat. Some retractors are provided with an emergency locking mechanism and a clamping mechanism. In a vehicle emergency, such as a collision, the emergency locking mechanism locks the rotation of the winding shaft with a webbing wound thereon in the webbing draw-out direction, and the clamping mechanism directly holds the webbing between opposite parts thereof to prevent the draw-out of the seat belt because of the tightening of the seat belt.

In a vehicle emergency, it is conceivable that the webbing held by the clamping mechanism possibly would receive a force greater than the breaking strength of the webbing. Specifically, if a strong tensile force to draw out the webbing is further applied to the retractor in which the clamping mechanism has prevented the seat belt from drawing out by holding the webbing, there is a possibility that a force would be concentrated on the webbing holding portion.

The retractor with a simple clamping mechanism functioning so as to prevent the seat belt from drawing out by holding the webbing, operates as indicated by a dotted line in FIG. 38, in the emergency. As time passed immediately after a vehicle collision, a tension of the webbing increases. When a shock by the collision is extremely large, an abrupt deceleration acts on the body of the occupant. As a result, a load by the seat belt to the occupant can also be large.

In order to avoid the above problems, there is another proposal of the retractor with an improved clamping mechanism. According to this retractor, in an early stage where the tensile force acts on the webbing upon a collision shock applied smaller than a predetermined value, the clamping mechanism is operated to prevent the draw-out of the seat belt, whereby the body of the occupant is reliably restrained to the seat. Thereafter, the tensile force acting on the webbing exceeds the predetermined value. At this time, the operation of the clamping mechanism is removed to allow the webbing to be drawn out a predetermined amount thereof, and the deceleration in the body of the occupant is lessened. As a result, the occupant is protected from the collision.

Various types of the retractors with clamping mechanism are proposed, for example, in U.S. Pat. Nos. 5,154,368 and 5,299,854, and Unexamined Japanese Utility Model Publication No. Hei. 4-43550. The disclosed retractor uses a clamp removing mechanism which removes the clamping force in such a manner that when a tensile force exceeding a predetermined value is applied to the webbing, a part of the rotary holding member holding the webbing is plastically deformed, or a part of a case (retractor base) rotatably supporting an end of the rotary holding member or a part of the shaft is plastically deformed or broken. Thus, a deceleration acting on the body of the occupant is lessened to reliably protect the occupant from a collision shock in such a manner that in an emergency, a predetermined amount of the extension of the seat belt is allowed by removing the clamping mechanism in operation.

As for the clamping mechanism, the clamp member rotatably supported at an end of the retractor base holds the webbing to prevent the extension of the seat belt as mentioned above. On the other hand, there is another clamping mechanism. In this mechanism, to prevent the extension of the seat belt, a wedge-shaped clamp member holds the webbing so that the clamp member bites into a space between the base back plate and a slide surface of a guide member fixed to the retractor base. Because of differences of the constituent components and parts, such a clamping mechanism cannot be applied to the various clamp removing mechanisms.

U.S. Pat. No. 5,242,213 and Unexamined Japanese Utility Model Publication No. Hei. 4-43551 disclose clamp removing mechanisms that are applicable to the clamping mechanism using the wedge-shaped clamp member.

In the clamp removing mechanisms disclosed, a belt retracting device (retractor) and a webbing clamping device (clamping mechanism) are connected to each other by a connecting device, which allows a limited motion of the webbing clamping device. At the instant that a predetermined load value is reached, the webbing clamping device is plastically deformed to move apart from the belt retractor. When a webbing tensile force exceeding a predetermined load value acts on the webbing clamping device, the connecting device is broken to remove the holding of the webbing by the webbing clamping device.

In the construction of the clamp removing mechanism disclosed in Unexamined Japanese Utility Model Publication No. Hei. 4-43551, a holding portion (teeth portion) provided on the surface of a holding device where it faces the webbing is capable of being sheared by a tensile force acting on the webbing. When a tensile force exceeding a predetermined value is applied to the webbing, the holding portion is sheared, to remove the webbing from being held by the holding device.

The retractor with the clamping mechanism, disclosed in Unexamined Japanese Utility Model Publication No. Hei. 4-43551, is shown in FIGS. 39 through 42. In case of emergency, for example, when a vehicle collision takes place, the retractor operates in the following way. An emergency locking mechanism 124 locks a winding shaft 123 with a webbing 126 (serving as a seat belt) wound thereon, thereby preventing the draw-out of the webbing 126 that is based on the rotation of the winding shaft 123. At the same time, a clamping mechanism 125 holds the webbing 126 that has been drawn out onto a base back plate 121 of the retractor base 120, from the winding shaft 123. With the holding, the webbing 126 left on the winding shaft 123 is prevented from drawing out because of the tightening of the webbing 126.

The clamping mechanism 125 includes a clamp shaft 111 supported at both ends thereof by a pair of side walls 122 of the retractor base 120, a clamp holder 112 which is supported swingably about the clamp shaft 111 and moves along the webbing 126 on the base back plate 121 of the retractor base 120, and a clamp member 113 attached to the top of the clamp holder 112. In an emergency, the clamp holder 112 is swung in the direction of an arrow B (FIG. 39), thereby to press the clamp member 113 against the webbing 126. In this state, the webbing 126 is compressed between the clamp member 113 and the base back plate 121, so that the webbing is locked there. In this way, the webbing 126 is prevented from being drawn out.

The clamp member 113 has a semicircular shape as shown also in FIG. 40. Support shafts 114, rotatably supported by the clamp holder 112, are extended from both sides of the clamp member 113. The clamp member 113 is rotatably attached to the top end of the clamp holder 112 in a state that a semicircular outer surface 115 thereof is located close to the clamp holder 112. A flat surface of the clamp member 113, which faces the webbing 126, has a number of holding portions 116 (clamp teeth) formed thereon. As also shown in FIG. 40, these holding portions have sharpened portions at ends thereof to prevent the webbing from drawing out by sticking the sharpened portions into the webbing when the holding portions 116 are pushed toward the webbing 126. The strength and the size of the holding portions 116 are selected such that when a load exceeding a predetermined value acts on the sharpened portions of the holding portions 116, these sharpened portions of the holding portions are sheared, so that the webbing is removed from its held state.

The clamping mechanism 125 shown in FIGS. 39 and 40 operates in the following way. In an early stage of an emergent collision, the clamp member 113 is pressed against the webbing 126 to stick the holding portions 116 into the webbing 126. Thus, the webbing 126 is placed in a locked state. In this state, it cannot be drawn out. When after the webbing is arrested, a tensile force acting on the webbing is increased to exceed a predetermined value by an inertial energy of the occupant, for example, the holding portions 116 are sheared to release the webbing from its locked state. Accordingly, the shock to the body of the occupant, that results from the webbing tightly holding the occupant, is lessened.

FIG. 41 shows a state of the retractor in which the clamping mechanism 125 operates to stick the holding portions 116 of the clamp member 113 into the webbing 126, thereby locking the webbing. FIG. 42 shows another state of the retractor in which after the webbing is arrested, the tensile force acting on the webbing reaches a predetermined value or greater, so that the holding portions 116 are sheared to release the webbing from its locked state. In this case, the upper half portions 117 of the holding portions 116 are left in the webbing 126.

A kinetic energy absorbing mechanism based on the plastic deformation is disclosed in Unexamined Japanese Utility Model Publication No. Hei. 4-62255. In this mechanism, a plastic deformation of the folded portions of a U-shaped plate absorbs kinetic energy.

In the retractor with a clamp removing mechanism disclosed in U.S. Pat. No. 5,242,213, when the tensile force of the webbing exceeding a predetermined value acts on the webbing holding device, the connecting device is broken and the webbing holding device moves apart from the belt retractor. In the retractor with a clamp removing mechanism disclosed in Unexamined Japanese Utility Model Publication No. Hei. 4-43551, when the tensile force of the webbing exceeding a predetermined value acts on the clamp member, the holding portion is sheared, so that the webbing holding force is instantaneously removed.

In these clamping mechanisms, at the instant that the webbing holding force is removed, the webbing put on the winding shaft is tightened. Accordingly, the webbing is abruptly drawn out after the removal of the holding force, and a tensile force acting on the webbing abruptly decreases. Thereafter, the rotation of the winding shaft in the webbing draw-out direction is locked by the emergency locking mechanism, and the tensile force of the webbing abruptly increases again if circumstances require.

The retractor of Unexamined Japanese Utility Model Publication No. 4-43551 is constructed such that when the tensile force acting on the webbing reaches a predetermined value or greater after the webbing is held by the clamping mechanism 125, the webbing is released from its holding state. In the retractor thus constructed, a variation of the tensile force of the webbing after the collision takes place is as indicated by a two-dot chain line in FIG. 38. As shown, when the tensile force reaches a predetermined value P1, the draw-out of the webbing caused by the tension therein starts and the tensile force decreases. When the draw-out of the webbing stops, the tensile force of the webbing increases again from a tension P2 at that time and reaches a tension P3 that is greater than the tension P1. Accordingly, the maximum tension acting on the seat belt can be controlled to be smaller than that by a retractor which uses a clamping mechanism without a clamp removal function.

To properly reduce the maximum tension acting on the seat belt, a timing to remove the holding of the webbing by shearing the holding portions 116 must be made to exactly correspond to the tensile force acting on the webbing. Additionally, to effectively reduce collision shocks acting on the occupant in case of emergency, it is necessary to reduce the maximum tension acting on the seat belt, to avoid abrupt increases and decreases of the tension in the webbing, and to minimize a variation of the tension.

In the construction of the conventional clamping mechanism 125, the timing (webbing tension) of shearing the holding portions 116 tends to vary depending on shock operating conditions (deceleration conditions). Therefore, it is very difficult to make the timing of the holding removal correspond to the tension acting on the webbing. As a consequence, it is difficult to obtain the shock absorption performances as designed.

The causes of this problem are as follows. As shown in FIG. 43, two forces acts on the holding portions 116 of the clamp member 113 when it is pressed against the webbing 126. One of the two forces is a shearing force f1 by the tension in the webbing 126, and the other is a reaction force f2 to the pushing force that is applied to the webbing 126 by the swing motion of the clamp holder 112. It is estimated that the resultant force f3 of these forces f1 and f2 would actually break the holding portions 116. In the above-mentioned clamping mechanism 125, after the webbing is compressed, the operation of pushing the webbing against the base back plate through the swing motion of the clamp holder 112 continues until the holding portions 116 are broken by the resultant force f3. Under this condition, the reaction force f2 continuously increases as a tensile force acting on the webbing 126 increases. An increasing rate of the reaction force f2 varies depending on an increasing rate of the tensile force and the like. Due to these facts, the reaction force f2 greatly influences the resultant force f3 to actually break the holding portions 116.

According to the construction of the conventional clamping mechanism 125 as mentioned above, the increase and decrease of the tensile force are alternately repeated at short time intervals as shown also in FIG. 38. Therefore, a tension acting on the seat belt is also sharply increased and decreased, so that the amplitude of the tension variation would also be great.

Further, in those clamp removing mechanisms, when a vehicle collision takes place and the retractor operates to restrain an occupant, the energy absorption immediately after the clamp removal is inefficient. The increase of the load which follows the decrease thereof is great. Its rising slope is sharp. Consequently, the kinetic energy of the occupant is insufficiently absorbed, and reduction of a collision shock applied to the occupant is also insufficient.

When the energy absorption mechanism disclosed in Unexamined Japanese Utility Model Publication No. Hei. 4-62255 is incorporated into the retractor, a folded portion of a U-shaped member is formed on the lower stay extending downward from the retractor base. The main body of the retractor is fixed to a vehicle body with a casing secured to the panel of the vehicle body inserted therebetween. If a webbing tensile force exceeding a predetermined value acts on the retractor, the folded portion is plastically deformed. As a result, the main body of the retractor moves upward. Because of the extension of the upper stay upward from the retractor base, it is difficult to fix it to the vehicle body. In this respect, its reliability of mounting on the vehicle body is poor. Additionally, there is a possibility that additional vibrations are easily generated in the main body of the retractor that is fixed to the body panel only by the lower stay.

SUMMARY OF THE INVENTION

The present invention has been made in view of the above circumstances and has an object to provide a retractor with a clamping mechanism in that the retractor is securely mounted on the vehicle body, the timing of removing the holding of the webbing that is held by the clamp removing mechanism is made to exactly correspond to a tensile force acting on the webbing, the increase and decrease of a tension acting on the seat belt after the webbing is held is controlled to be gentle, the amplitude of the tension variation is reduced, and a collision shock acting on an occupant from the seat belt is effectively be reduced.

According to a first aspect of the present invention, there is provided a retractor with a clamping mechanism for directly holding a webbing in a vehicle emergency, providing: a retractor base; a lower plate fixed to the retractor base; a movable clamp member for holding a webbing between the lower plate and the clamp member; a guide member for guiding the clamp member to a webbing holding position; and a holding device for preventing a movement of the guide member in a webbing draw-out direction, the holding device including a plastically deforming portion which is deformed in accordance with a movement of the clamp member in the webbing draw-out direction; in which the guide member is fixed to the holding device so that the clamp member is moved in the webbing draw-out direction while keeping a webbing holding force of the clamp member by deforming the plastically deforming portion of the holding device in accordance with the movement of the clamp member in the webbing draw-out direction when a tensile force exceeding a predetermined value acts on the webbing.

According to a second aspect of the present invention, there is provided a retractor with a clamping mechanism for directly holding a webbing in a vehicle emergency, providing: a retractor base; a lower plate fixed to the retractor base; a movable clamp member for holding a webbing between the lower plate and the clamp member, in which the clamp member includes clamp teeth for clamping and engaging the webbing to a webbing opposing surface of the clamp member, the clamp teeth including first clamp teeth with sharpened ends and second clamp teeth with flat ends, a flat portion located on an opposite side of the webbing opposing surface, a rear edge located at a rear end of the flat portion, and a flat surface located on a front end of the clamp member; and a guide member for guiding the clamp member to a webbing holding position, in which the guide member includes: an inclined portion sliding on the flat portion of the clamp member; a guide portion extending from a front end of the inclined portion in parallel with respect to the webbing; and a stopper portion coupling to a front end of the guide portion, in which the sharpened ends of the first clamp teeth are sheared or deformed when a tensile force acting on the webbing exceeds a first value, in which the inclined portion and the guide portion are deformed by the rear edge of the clamp member in accordance with a movement of the clamp member in a webbing draw-out direction when a load acting on the guide member exceeding a second value, and in which the first value is set to be larger than the second value.

According to a third aspect of the present invention, there is provided a retractor with a clamping mechanism for directly holding a webbing in a vehicle emergency, providing: a retractor base; a lower plate fixed to the retractor base; a movable clamp member for holding a webbing between the lower plate and the clamp member, in which the clamp member includes clamp teeth for clamping and engaging the webbing to a webbing opposing surface of the clamp member, the clamp teeth including first clamp teeth with sharpened ends and second clamp teeth with flat ends; a guide member for guiding the clamp member to a webbing holding position; and a holding device for preventing a movement of the guide member in a webbing draw-out direction, the holding device including a plastically deforming portion which is deformed in accordance with a movement of the clamp member in the webbing draw-out direction, in which the sharpened ends of the first clamp teeth are sheared or deformed when a tensile force acting on the webbing exceeds a first value, in which the guide member is fixed to the holding device so that the clamp member is moved in the webbing draw-out direction while keeping a webbing holding force of the clamp member by deforming the plastically deforming portion of the holding device in accordance with the movement of the clamp member in the webbing draw-out direction when a load acting on the holding device exceeding a second value, and in which the first value is set to be larger than the second value.

According to a fourth aspect of the present invention, there is provided a retractor with a clamping mechanism for directly holding a webbing in a vehicle emergency, providing: a retractor base; a lower plate fixed to the retractor base; a movable clamp member for holding a webbing between the lower plate and the clamp member, the clamp member including clamp teeth for clamping and engaging the webbing to a webbing opposing surface of the clamp member, in which the clamp teeth have first clamp teeth with sharpened portions for preventing the webbing from drawing out by sticking the sharpened portions to the webbing, and second clamp teeth with flat portions for preventing the webbing from drawing out by pressing the flat portions against a surface of the webbing and cooperating with the lower plate to hold the webbing; and a guide member for guiding the clamp member to a webbing holding position, in which the guide member includes a slide surface for guiding the clamp member, and a stopper formed on a front end of the slide surface of the guide member for preventing the clamp member from moving toward the webbing at a position where the sharpened portions of the first clamp teeth are stuck to the webbing.

According to a fifth aspect of the present invention, there is provided a retractor with a clamping mechanism for directly holding a webbing in a vehicle emergency, providing: a retractor base; a winding shaft rotatably supported in a retractor base for winding the webbing; a webbing guide for guiding the webbing drawn out of the winding shaft, along the retractor base; a clamp holder supported swingably about a clamp shaft supported at both ends thereof by the retractor base; a clamp member mounted in a front end of the clamp holder for holding the webbing between the webbing guide and the clamp member by a swinging movement of the clamp holder, the clamp member including clamp teeth for clamping and engaging the webbing to a webbing opposing surface of the clamp member, in which the clamp teeth include first clamp teeth with sharpened portions for preventing the webbing from drawing out by sticking the sharpened portions to the webbing, and second clamp teeth with flat portions for preventing the webbing from drawing out by pressing the flat portions against a surface of the webbing and cooperating with the webbing guide to hold the webbing; and a stopper disposed for preventing the clamp member from moving toward the webbing by contacting with the clamp holder when the sharpened portions of the first clamp teeth are stuck to the webbing, in which the sharpened portions of the first clamp teeth are sheared or deformed when a tensile force acting on the webbing exceeds a predetermined value.

With such a construction, when a tensile force exceeding a predetermined value acts on the webbing held by the emergency locking mechanism operated, a load of a predetermined value is applied to the guide member through the clamp member for holding the webbing. The guide member, together with the clamp member, moves in the webbing draw-out direction while plastically deforming the holding device with the movement of the clamp member in the webbing draw-out direction. Finally, the holding operation of the clamping mechanism is removed.

Since the guide member, together with the clamp member, moves in the webbing draw-out direction, the webbing is extended from the retractor and the clamping mechanism is removed in its holding operation. Thereafter, the guide member moves in the webbing draw-out direction while plastically deforming the holding device which prevents the movement of the guide member. Simultaneously, the webbing wound around the winding shaft is tightened.

At this time, deformation resistance of the holding device and tightening resistance of the webbing effectively consume kinetic energy of the occupant. An abrupt fall of the tensile force in the webbing is prevented at the time of removing the holding force, and the webbing is drawn out from the retractor while keeping a fixed draw-out force.

The holding device is plastically deformed, and the guide member, together with the clamp member, moves in the webbing draw-out direction. As a result, the holding operation of the clamping mechanism is removed. Therefore, there is no problem in fixing the main body of the retractor to the vehicle body. The retractor base is firmly mounted on the panel of the vehicle body. Further, the retractor is well mounted on the vehicle body.

With such a construction of the retractor with the clamping mechanism according to the present invention, in an early stage of holding the webbing by the clamping mechanism, the webbing is held with all the clamp teeth, thereby preventing the webbing from drawing out. When the tensile force acting on the webbing after the webbing is held exceeds a predetermined value, the plastic deformation of the guide member for guiding the clamp member starts. The clamp member which holds the webbing moves along the webbing or the plastic deformation of the holding device starts and the guide member, together with the clamp member, moves in the webbing draw-out direction. Through the movement of these members, kinetic energy transferred from the occupant to the webbing is absorbed to thereby limit an increase of the tensile force acting on the webbing.

When the plastic deformation of the guide member or the holding device terminates and the clamp member cannot move in the webbing draw-out direction, the tension acting on the webbing increases. In this case, when the tension reaches a predetermined value, the clamp teeth are sheared or deformed. The holding force of the webbing decreases to allow the webbing to be drawn out by the corresponding amount. As a result, the tension acting on the webbing is reduced. The clamp teeth, which are used for reducing the holding force by their shearing or deformation, are limited to a part of the clamp projections or the clamp teeth formed. Because of this, there is no chance that the clamping force is abruptly reduced. Accordingly, reduction of the tension acting on the webbing that is caused by the shearing or the deformation is gentle. When the extension of the webbing caused by the shearing or the deformation of the clamp teeth is completed, the tension acting on the webbing increases again. However, the increase of the tension this time is not so high because of the kinetic energy absorption and the tension reduction in the previous operation.

Further, in an emergency, for example, a vehicle collision, the clamping mechanism operates to press the clamp member against the webbing that is drawn out from the winding shaft onto the lower plate mounted on the retractor base. The clamp teeth formed on the clamp member are stuck into the webbing, thereby preventing the webbing from drawing out. The movement of the clamp member in the direction in which the clamp member is pushed for sticking the clamp teeth into the webbing is stopped, by a stopper, when the tips of the clamp teeth reach a predetermined depth of the webbing.

Therefore, in the hypothesis that the force acting on the clamp teeth for preventing the draw-out of the webbing contains a reaction force f2 to the pushing force to push the clamp teeth to the webbing, in addition to a shearing force f1 caused by the tension acting on the webbing, the reaction force f2 to the pushing force does not increase with increase of the tension of the webbing, and is controlled to be below a predetermined value, much smaller than the shearing force f1 caused by the increasing tension acting on the webbing. Therefore, the resultant force f3 causing the deformation or shearing of the clamp teeth can be regarded as including only the shearing force f1 caused by the tension in the webbing.

BRIEF DESCRIPTION OF THE DRAWINGS

In the accompanying drawings:

FIG. 29A is a longitudinal sectional view showing the retractor with the clamping mechanism as shown in FIG. 27, for showing a holding state of a webbing with first and second clamp teeth of the clamping mechanism;

DETAILED DESCRIPTION OF THE PREFERRED EMBODIMENTS

Embodiments of the present invention will be described below with reference to the accompanying drawings.

Figure 1:
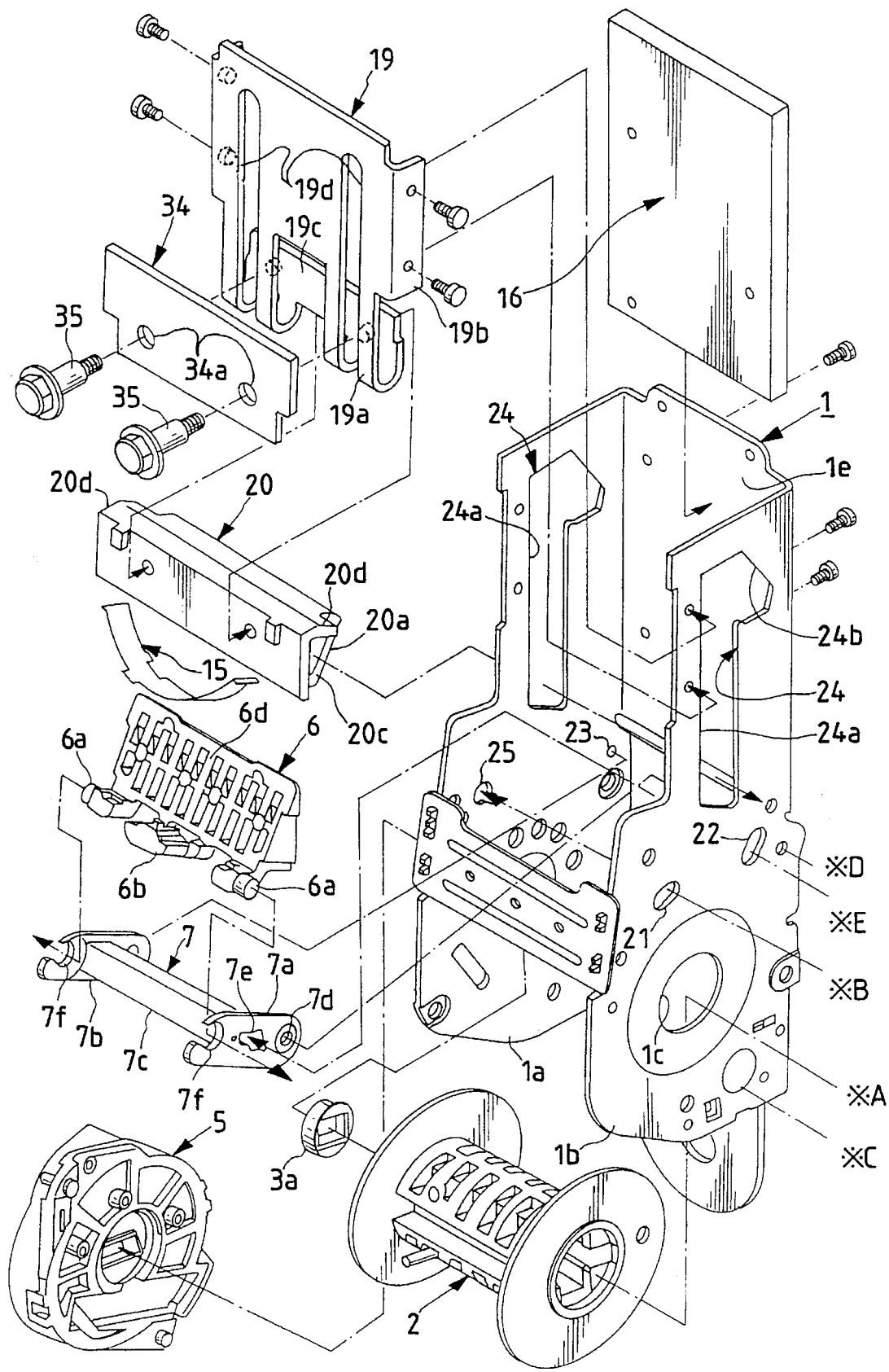
FIG. 1 is an exploded perspective view showing a part of a retractor with a clamping mechanism according to a first embodiment of the present invention.
Figure 2:
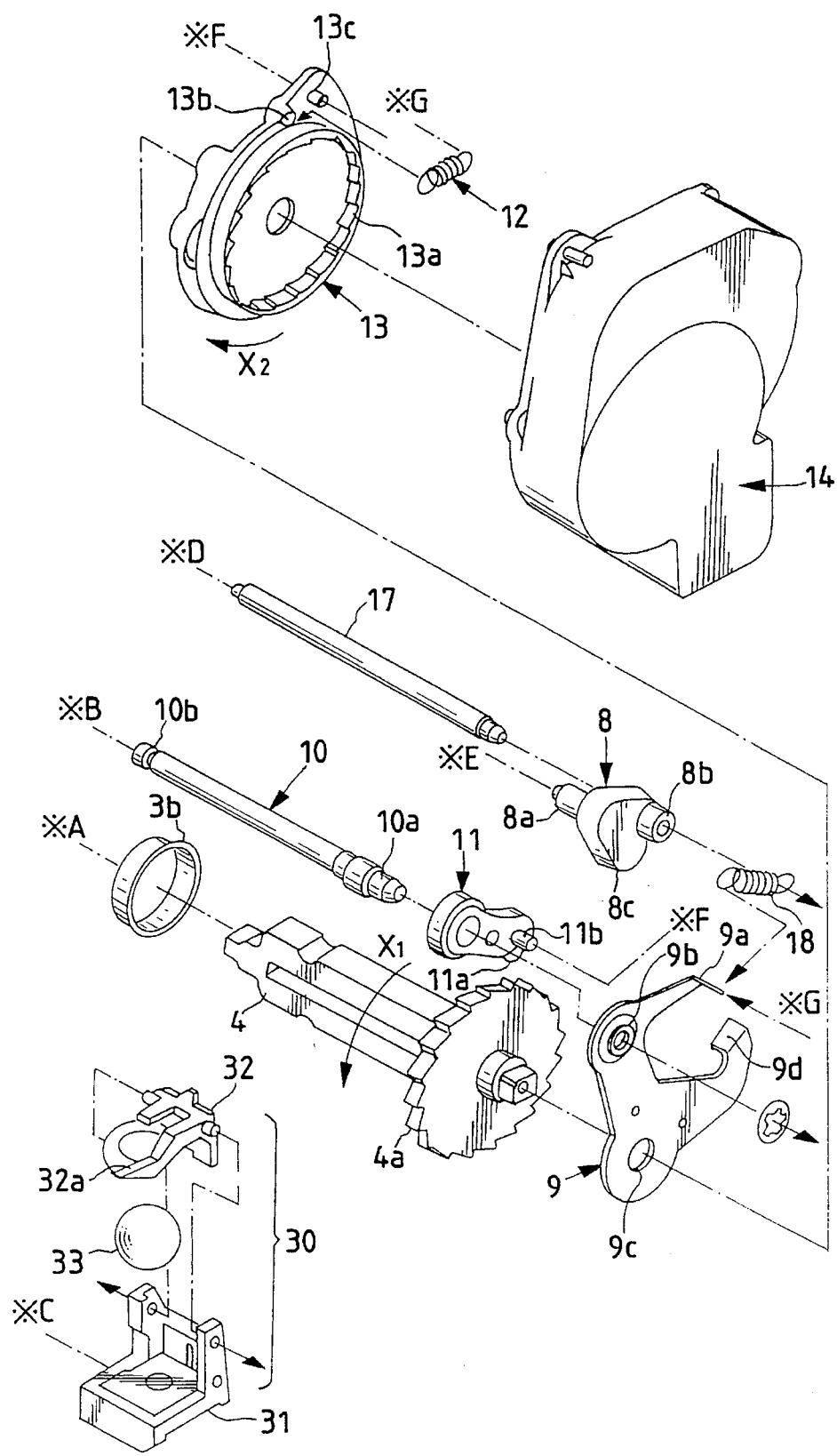
FIG. 2 is an exploded perspective view showing the remaining part of the retractor with the clamping mechanism as shown in FIG. 1.

FIGS. 1 and 2 show a retractor with a clamping mechanism according to a first embodiment of the present invention. In the figures, a retractor base 1 is provided with a pair of base side plates 1a and 1b, opposed to each other. The retractor base is U-shaped in cross section, as a whole. Through holes 1c are respectively formed in the corresponding locations of the base side plates 1a and 1b, while being also opposed to each other. Plastic bushings 3a and 3b are fit into the holes 1c, respectively. A bobbin 2 around which a webbing is wound is fixed to a winding shaft 4. The winding shaft 4 is rotatably supported at the plastic bushes 3a and 3b in the holes 1c of the base side plates 1a and 1b of the retractor base 1. A well-known winding spring device 5 is disposed at one end of the winding shaft 4. By the winding spring device 5, the winding shaft 4 is constantly urged in the webbing winding direction.

An emergency locking mechanism is disposed at the other end of the winding shaft 4. In an emergency, the emergency locking mechanism operates to prevent the webbing from being drawn out. The emergency locking mechanism includes a ratchet plate 4a, as a ratchet wheel, fixed to the other end of the winding shaft 4. A part of the winding shaft 4 is protruded from the ratch plate 4a. A tension plate 9 and a ratchet cup 13 are loosely fit to the protruded portion of the winding shaft 4. The tension plate 9 has a through hole 9c formed therein. The ratchet cup 13 serves as a ratchet member. Inner teeth 13a are formed on the inner wall of the ratchet cup 13. A return spring 12 is placed between a spring hanger 13b of the ratchet cup 13 and a spring hanger 9a of the tension plate 9. The return spring 12 urges the ratchet cup 13 in the direction of an arrow $X_2$ (referred to as the direction $X_2$). A lock device and an inertial member, both being well known and not shown, are coupled with a part of the winding shaft 4 which is located outside the ratchet cup 13. In an emergency, such as a vehicle collision, a tension acts on the webbing and an abrupt turning force exceeding a predetermined value is applied to the winding shaft 4 in the direction (of an arrow $X_1$) of drawing out the webbing (referred to as a webbing draw-out direction). Then, the ratchet cup 13 is turned in the direction of the arrow $X_1$ (referred to as the direction $X_1$) while resisting the urging force of the return spring 12.

A pawl 11 as a pawl member, when in engagement with the ratchet plate 4a, prevents the rotation of the ratchet plate 4a in the webbing draw-out direction (of the arrow $X_1$). The pawl 11 is rotatably supported by a pawl pin 10 outside the base side plate 1b and that the pawl 11 is engagable with and disengagable from the ratchet plate 4a. The pawl pin 10 spans over the space between both the base side plates 1a and 1b, while being inserted into a through hole 25 of the base side plate 1a and an elongated hole 21 of the base side plate 1b. An outer end portion 10a of the pawl pin 10 is swingable about an engaging portion of the pawl pin where it engages the through hole 25.

The outer end portion 10a of the pawl pin is inserted into a through hole 9b formed in a first swing end of the tension plate 9. Accordingly, the pawl 11 is able to shift the center of swinging rotation thereof along the elongated hole 21. A pawl guide protrusion 11b is protruded from the pawl 11. The pawl guide protrusion 11b is inserted into a pawl guide hole 13c protruded from an extended portion formed on the circumference of the ratchet cup 13.

A sensor case 31 forming a vehicle body acceleration sensing device 30 is fixed to the lower side of the base side plate 1b of the retractor base 1. A ball weight 33 as a sensor is placed with the sensor case 31. A sensor arm 32 with an engaging protruded piece 32a is swingably attached to the sensor case 31. A sensor cover 14 for covering the emergency locking mechanism is disposed outside the base side plate 1b.

A clamping mechanism is provided above the retractor base 1 and covered with a dust cover (not shown). The clamping mechanism prevents the webbing from drawing out by directly holding the webbing.

Figure 3:
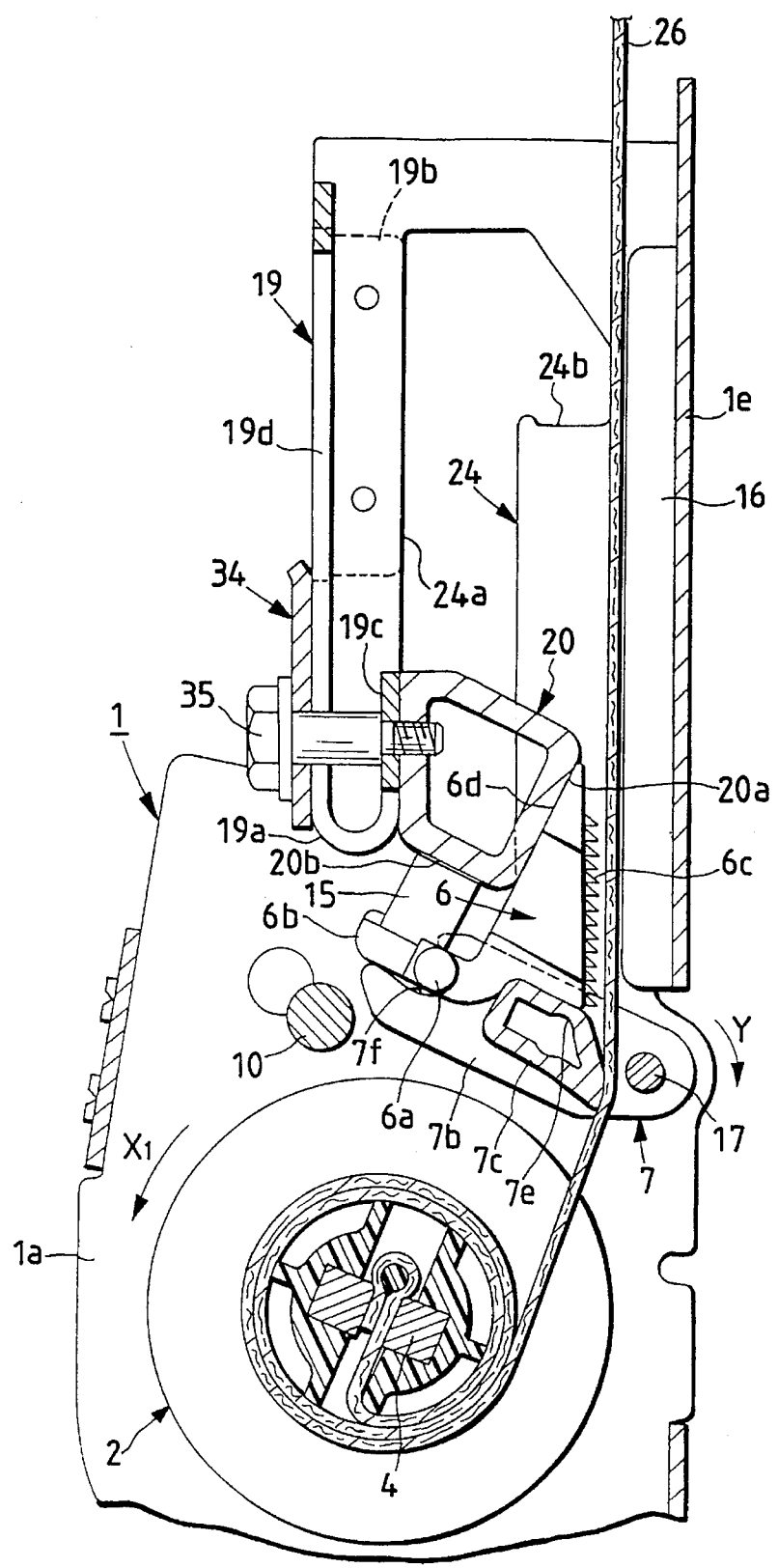
FIG. 3 is a longitudinal sectional view showing a main portion of the retractor with the clamping mechanism as shown in FIG. 1, for explaining the operation of the clamping mechanism of the retractor.
Figure 4:
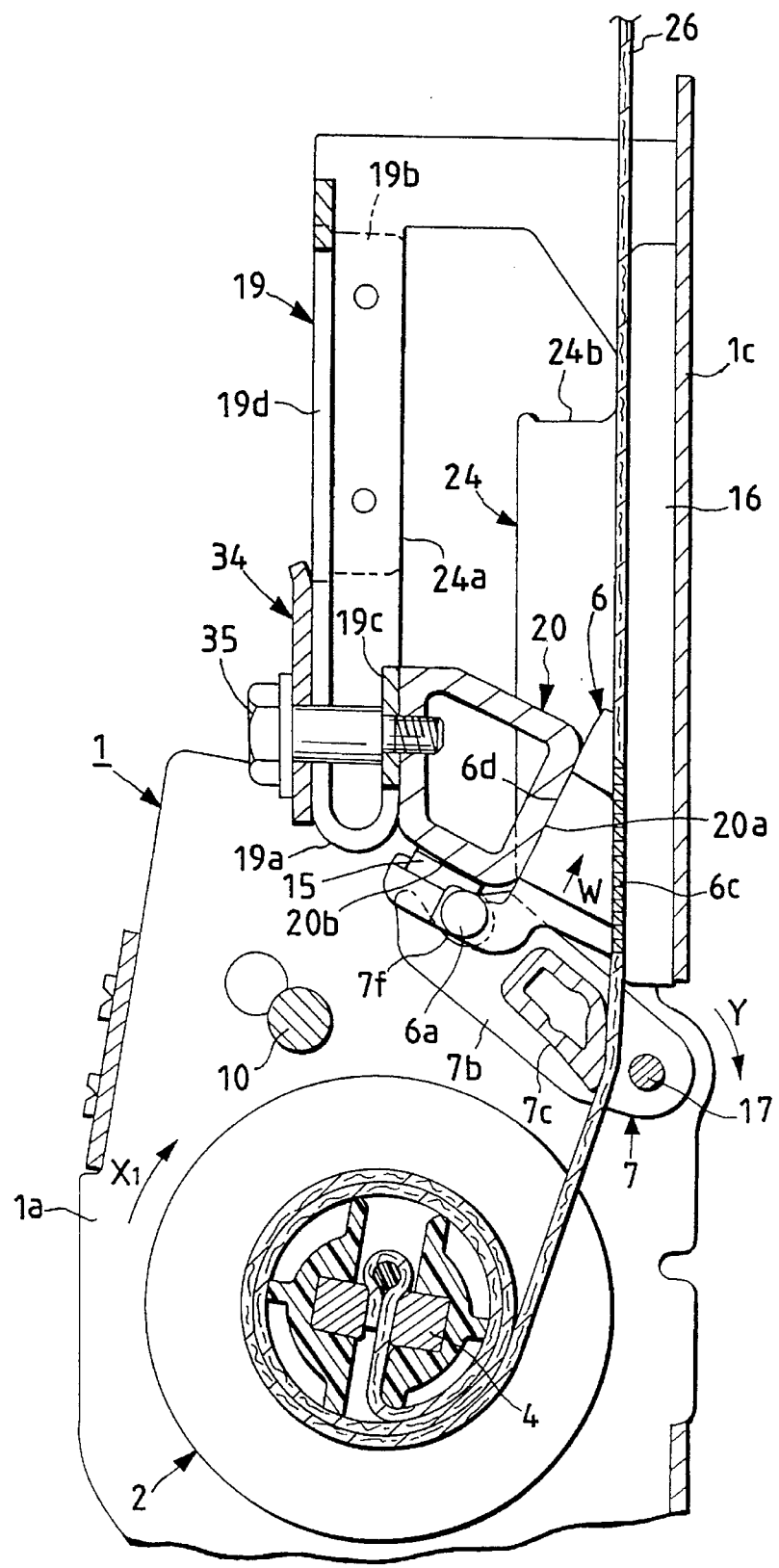
FIG. 4 is a longitudinal sectional view showing the main portion of the retractor with the clamping mechanism as shown in FIG. 1, for explaining the operation of the clamping mechanism of the retractor.

FIG. 3 showing a longitudinal sectional view of the clamping mechanism is also referred to. The clamping mechanism includes a clamp member 6, an upper plate 20, and an upper stay 19. The clamp member 6, wedge-shaped, includes a clamp teeth 6c. In clamping and engaging a webbing 26 with the clamp member 6, the clamp member 6 contacts with the webbing surface at a high friction force, with provision of the clamp teeth 6c. The upper plate 20 as a guide member slidably contacts with a flat portion 6d of the clamp member 6, which is opposite to the side thereof having the clamp teeth 6c formed thereon, whereby guiding the clamp member 6 (FIG. 4). The upper stay 19 as a holding member functions to prevent the movement of the upper plate 20 in the webbing draw-out direction.

The upper plate 20 is a hollowed member which is made of metal, shaped like a trapezoid in cross section, and has a longitudinal length that is greater than the distance between the opposed base side plates 1a and 1b of the retractor base 1. The upper plate 20 has a slide surface 20a where it slidably contacts with the flat portion 6d of the clamp member 6. Steps 20c are formed at both ends 20d of the upper plate 20, respectively. The distance between the steps 20c is less than the distance between the base side plates 1a and 1b. Through holes 24 are formed in the base side plates 1a and 1b, respectively. Each of the through holes 24 includes a guide portion 24a and an insertion portion 24b. The guide portion 24a is extended along the base back plate 1e of the retractor base 1, which connects the base side plates 1a and 1b. The insertion portion 24b is coupled to the top end of the guide portion 24a, and has the substantially same shape as the shape in cross section of the upper plate 20.

The upper plate 20 is inserted into the through holes 24, from the insertion portion 24b thereof. In this case, both the ends 20d of the upper plate 20 are slidably set in the guide portion 24a of the through holes 24. The steps 20c of the upper plate 20 are in contact with the inner walls of the base side plates 1a and 1b of the retractor base 1. Accordingly, the upper plate 20 is made immovable in the longitudinal direction but movable along the base back plate 1e of the retractor base 1.

Both sides in the width direction of the upper stay 19 are curved rearward to form mounting portions 19b that are L-shaped in cross section. The lower portion of the upper stay 19 is curved to be J-shaped in cross section. The upper stay 19 is firmly attached to the retractor base 1 and the upper plate 20 in a state that the mounting portions 19b thereof are fixed to the base side plates 1a and 1b of the retractor base 1 by means of screws, and the J-shaped lower portion of the upper stay 19 is fixed to the upper plate 20 by means of bolts. With this structure, the upper plate 20 is locked in the movement in the webbing draw-out direction.

The upper stay 19 is a metal holding member bent after being punched to have a desired shape. The upper stay 19 provides a base portion, that is substantially rectangular in shape, bent rearward to form the mounting portions 19b on both side ends in the width direction. A pair of legs are extended downward from the base portion of the upper stay 19 and bent upward in the inner side of the retractor base, so that the bottom portion of the upper stay 19 is J-shaped in cross section. These legs which are coupled to an upper plate fixing portion 19c serve as a plastically deforming portion 19a. A pair of elongated holes 19d are formed in the base portion of the upper stay 19. The elongated holes 19d, extended along the base back plate 1e of the retractor base 1, range from the bottom of the upper stay 19 to the upper portion of the base portion of the upper stay 19.

Fixing bolts 35 are inserted into the through holes 34a of a slide plate 34 attached to the outer side of the upper stay 19, the elongated holes 19d of the upper stay 19, and holes of the upper plate fixing portion 19c, so that the fixing bolts 35 are screwed into the upper plate 20. As a result, as shown in FIG. 3, the slide surface 20a of the upper plate 20 is inclined at a given angle to a lower plate 16, with its top close to the lower plate 16. The lower plate 16 is fixed to the base back plate 1e of the retractor base 1. The upper plate 20 is locked in the movement in the webbing draw-out direction. The slide surface 20a of the upper plate 20 guides the clamp member 6 to the webbing clamping and engaging position.

The clamp member 6 is positioned in a state that the flat portion 6d of the clamp member 6 is in contact with the slide surface 20a of the upper plate 20 while the acutely angled tip top of the clamp member 6 is directed upward. Accordingly, the clamp teeth 6c of the clamp member 6 are constantly disposed in parallel with respect to the surface of the webbing 26 that is held by the clamp teeth. Therefore, the clamp member 6 which slides on the slide surface 20a of the upper plate 20 is capable of uniformly clamping and engaging the webbing 26. A return spring 15 is disposed between the rear end surface 20b of the upper plate 20 and an engaging portion 6b extended rearward from the rear end of the clamp member 6. By the return spring 15, the clamp member 6 is urged in the disengaged direction with the webbing 26.

A clamp lever 7 is disposed under the clamp member 6. The clamp lever 7 prevents the movement of the clamp member 6 urged by the return spring 15. The clamp lever 7 cooperates with an outer plate 8, which is located outside the base side plate 1b and engages the tension plate 9, thereby to form a lever device as an interlocking mechanism which moves the clamp member 6 in the webbing holding direction while interlocking with the emergency locking mechanism.

The clamp lever 7 includes a pair of plate members 7a and 7b and a coupling portion 7c for connecting these plate members to each other and for abutting against the rear end wall of the clamp 6. The plate members 7a and 7b have cutouts 7f respectively, which support pivots 6a protruded from the side walls of the clamp member 6. The clamp lever 7 further includes a hole 7d. The hole 7d receives a lever pin 17, which is inserted into through holes 23 of the base side plates 1a and 1b of the retractor base 1. Thus, the clamp lever 7 is rotatably supported by the lever pin 17. The outer plate 8 includes a hole 8b. The hole 8b receives one end of the lever pin 17, which is passed through the through hole 23. Thus, the outer plate 8 is rotatable along the base side plate 1b. The outer plate 8 further includes an inner shaft 8a and a contact portion 8c. The inner shaft 8a, protruded toward the inner side, passes through an elongated hole 22 of the base side plate 1b and enters a hole 7e of a plate member 7a of the clamp lever 7. The contact portion 8c of the outer plate 8 is brought into contact with an engaging portion 9d of the second swing end of the tension plate 9.

The clamp lever 7 prevents the movement of the clamp member 6 while resisting the urging force of the return spring 15 since the rear wall of the clamp member 6 comes into contact with the coupling portion 7c. The pivots 6a of the clamp member 6 are supported at the cutouts 7f formed in the swing ends of the plate members 7a and 7b, and the rear wall of the clamp member 6 is supported by the coupling portion 7c. The clamp teeth 6c of the clamp member 6 are held at a position where they are disengaged from the webbing 26. Accordingly, when the outer plate 8 is turned upward, the clamp lever 7 is also turned upward with respect to the inner shaft 8a. The clamp lever 7, when turned upward, pushes the pivot 6a of the clamp member 6 while resisting the urging force of the return spring 15. In turn, the clamp member 6 is moved toward the engaged direction with the webbing 26 while the flat portion 6d of the clamp member 6 is slid on the slide surface 20a of the upper plate 20. At this time, the elongated hole 22 does not interfere with the inner shaft 8a.

A return spring 18 is placed between the spring hanger 9a of the tension plate 9 and the lever pin 17, so that the tension plate 9 is urged in the direction $X_2$ by the return spring 18 which is stronger than the return spring 12. As a result, the pawl pin 10 is urged in the webbing winding direction, on the rear end surface 21a of the elongated hole 21.

The lever member including the clamp lever 7 and the outer plate 8, and the tension plate 9 are combined to make up a control device for moving the clamp member 6 to a first position where it prohibits the webbing 26 from being drawn out or to a second position where it allows the webbing 26 to be drawn out.

The retractor with the clamping mechanism thus constructed will be described hereunder.

Figure 6:
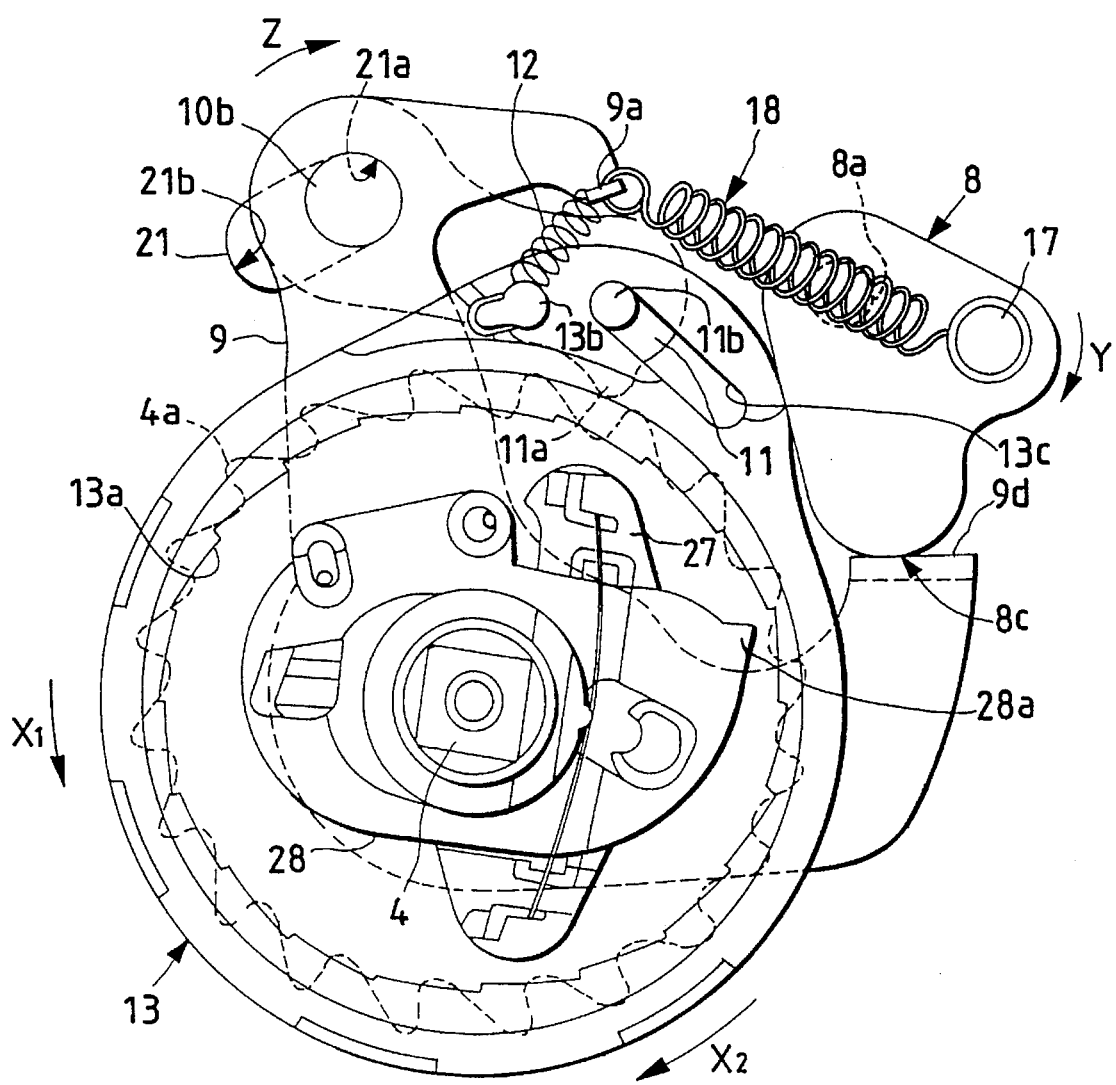
FIG. 6 is a longitudinal sectional view showing a main portion of the retractor with the clamping mechanism as shown in FIG. 1, for explaining the operation of an emergency locking mechanism of the retractor.
Figure 7:
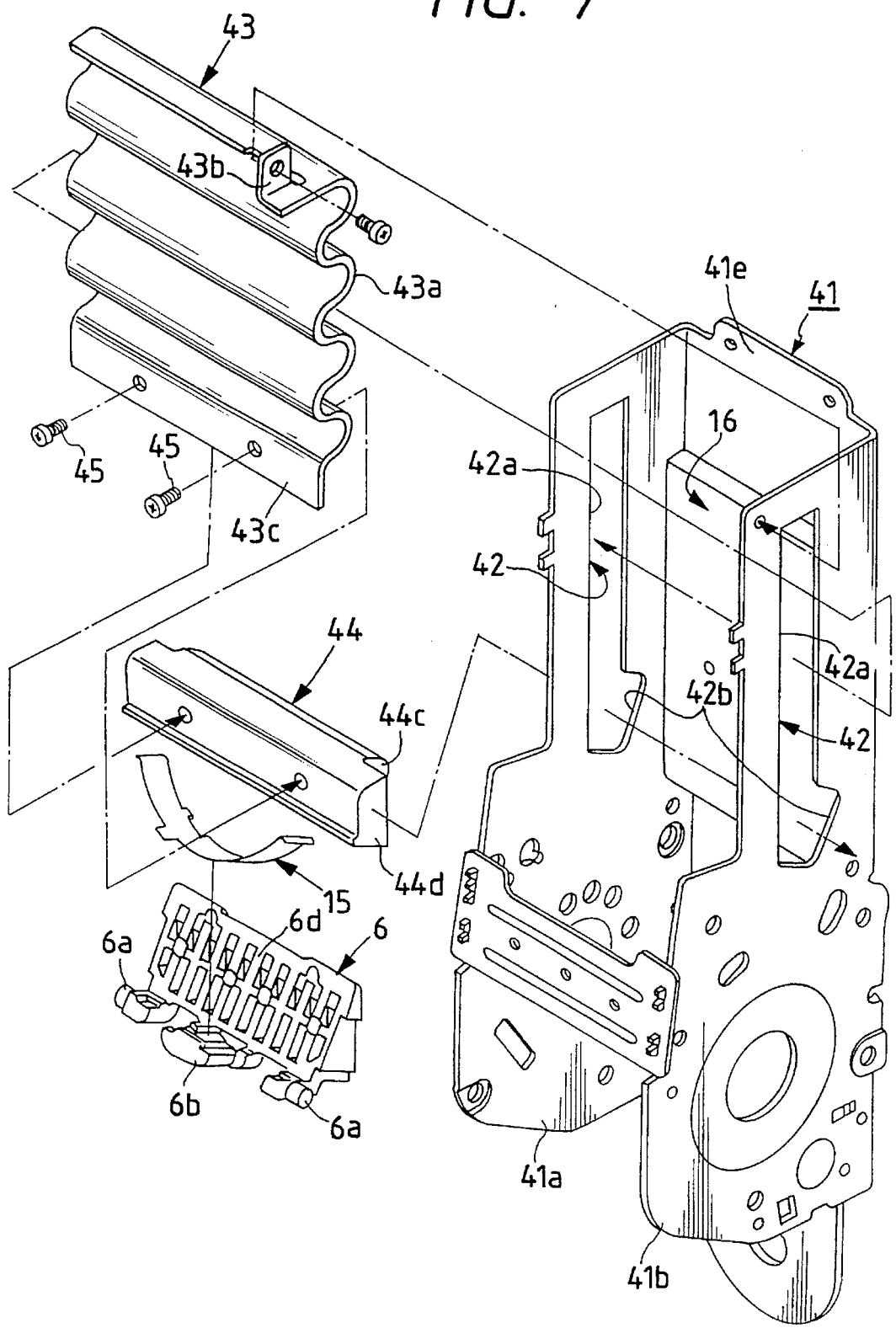
FIG. 7 is exploded perspective view showing a part of a retractor with a clamping mechanism according to a second embodiment of the present invention.

In a normal mode of the vehicle travel, as shown in FIG. 3, the inner shaft 8a of the outer plate 8, which engages the hole 7e of the clamp lever 7, is positioned at the lower end of the elongated hole 22 by the return spring 15. The clamp member 6 is urged in the disengaged direction with the webbing 26, by the return spring 15. As shown in FIG. 6, the ratchet cup 13 is urged in the direction $X_2$ by the return spring 12, which is placed between the spring hanger 13b of the ratchet cup 13 and the spring hanger 9a of the tension plate 9. The pawl 11, of which the pawl guide protrusion 11b is inserted into the pawl guide hole 13c, is urged in the disengaged direction with the ratchet plate 4a. Therefore, in the normal mode, the webbing 26 can freely be drawn out.

In an emergency, such as a vehicle collision, if a tension acts on the webbing 26 and an abrupt turning force exceeding a predetermined value is applied to the winding shaft 4 in the webbing draw-out direction $X_1$, then an inertia member (not shown) receives a force of inertia to generate a rotation delay in the rotation of the winding shaft 4 in the webbing draw-out direction. Responsive to this, the lock device operates, the engaging portion 28a of the lock member 28 comes in engagement with the inner teeth 13a of the ratchet cup 13 (FIG. 6). A rotation force of the flange 27 is transmitted to the ratchet cup 13, so that the ratchet cup 13 is turned in the direction $X_1$ while resisting the urging force of the return spring 12. The pawl guide hole 13c, which engages the pawl guide protrusion 11b, turns the pawl 11 in the direction of an arrow Z, thereby causing the engaging portion 11a to be in engagement with the ratchet plate 4a.

When the winding shaft 4 is further turned in the direction $X_1$ in a state that the engaging portion 11a of the pawl 11 is in engagement with the ratchet plate 4a, the pawl pin 10, which rotatably supports the pawl 11, moves from the rear end surface 21a of the elongated hole 21 to the front end surface 21b thereof, while resisting the urging forces of the return spring 15 and the return spring 18 through the tension plate 9. Accordingly, the tension plate 9 is swung in the direction $X_1$. The engaging portion 9d of the tension plate 9, which is in contact with the contact portion 8c of the outer plate 8, turns the outer plate 8 in the direction of an arrow Y. Accordingly, the clamp lever 7, which is coupled with the inner shaft 8a of the outer plate 8, also turns in the direction Y.

Then, the clamp member 6, supported by the cutouts 7f formed in the swing ends of the clamp lever 7, is immediately moved upward along the slide surface 20a of the upper plate 20. As noted above, the slide surface 20a of the upper plate 20 is inclined to the lower plate 16, with its top close to the lower plate 16. Because of this, the wedge-shaped clamp member 6 that is moved upward while resisting the urging force of the return spring 15, is moved in the webbing holding direction (of an arrow W), to thereby hold the webbing 26 in a state that it is nipped between the slide surface 20a and the lower plate 16.

At this time, a vertical drag is applied between the clamp member 6 holding the webbing 26 and the upper plate 20. A thrusting force for moving the upper plate 20 along the guide portion 24a in the webbing draw-out direction, acts on the upper plate 20. A bending force to move the upper plate fixing portion 19c together with the upper plate 20 toward the upper portion of the retractor acts on the plastically deforming portion 19a of the upper stay 19. However, the upper plate 20 is prevented from movement in the webbing draw-out direction since the plastically deforming portion 19a has such a rigidity as to prevent deformation of the plastically deforming portion 19a when a tension acting on the webbing 26 is smaller than a given tension and when a load that is smaller than a predetermined load is applied to the plastically deforming portion 19a of the upper stay 19, through the clamp member 6 and the upper plate 20. Accordingly, the webbing 26 is compressed between the clamp member 6 and the lower plate 16, so that it cannot be drawn out.

The pawl pin 10, which axially supports the pawl 11, stops its movement when it comes in contact with the front end surface 21b of the elongated hole 21, and hence stops the rotation of the winding shaft 4 in the direction X. The timing when the pawl pin 10 contacts the front end surface 21b is set at the timing of its contact immediately after the clamp teeth 6c are completely stuck into the webbing 26. The operation timings of the clamp member 6 and the pawl 11 can be changed appropriately by modifying the shapes of the contact portion 8c and the elongated hole 21.

Also when a change of vehicle speed exceeds a predetermined value in a vehicle emergency, the vehicle body acceleration sensing device 30 drives the lock device, and in turn the clamping mechanism and the emergency locking mechanism operate.

When the tension applied to the webbing 26 is removed, the force to drive the clamp member 6 in the webbing holding direction is lost. The clamp member 6 is urged, by the return spring 15, to move in the disengaged direction with the webbing 26, so that the clamping mechanism is removed in its holding operation. At the same time, the tension plate 9 is urged to turn in the removal direction (direction $X_2$) by the return spring 18. As a result, the clamp member 6 and the tension plate 9 are returned to their initial positions. When the webbing 26 is further wound up, the pawl 11 is turned in the direction opposite to the direction Z, thereby disengaging the engaging portion 11a of the pawl 11 from the ratchet plate 4a of the winding shaft 4. When the webbing 26 is additionally wound up, the engaging portion 28a of the lock member 28 is disengaged from the inner teeth 13a of the ratchet cup 13. The ratchet cup 13 is turned in the direction $X_2$ by the return spring 12 to return to its initial position. In this state, the webbing 26 can freely be drawn out.

In the clamping state as mentioned above, when the collision shock becomes excessively large and the tension F of the webbing 26 further grows, the clamp member 6 moves in the direction W. Accordingly, a pushing force (vertical drag) of the clamp member 6 against the lower plate 16 and the upper plate 20 also grows.

A tensile force F that is larger than a predetermined value acts on the webbing 26, and the clamp member 6 moves the upper plate 20 and the upper plate fixing portion 19c of the upper stay 19 toward the upper portion of the retractor while keeping the holding force of the webbing. And a bending force acting on the plastically deforming portion 19a of the upper stay 19 exceeds a predetermined load. Accordingly, the upper plate 20, together with the clamp member 6, moves in the webbing draw-out direction while plastically deforming the plastically deforming portion 19a, with the movement of the clamp member 6 in the webbing draw-out direction. As a result, the clamping mechanism holding operation is terminated.

Figure 5:
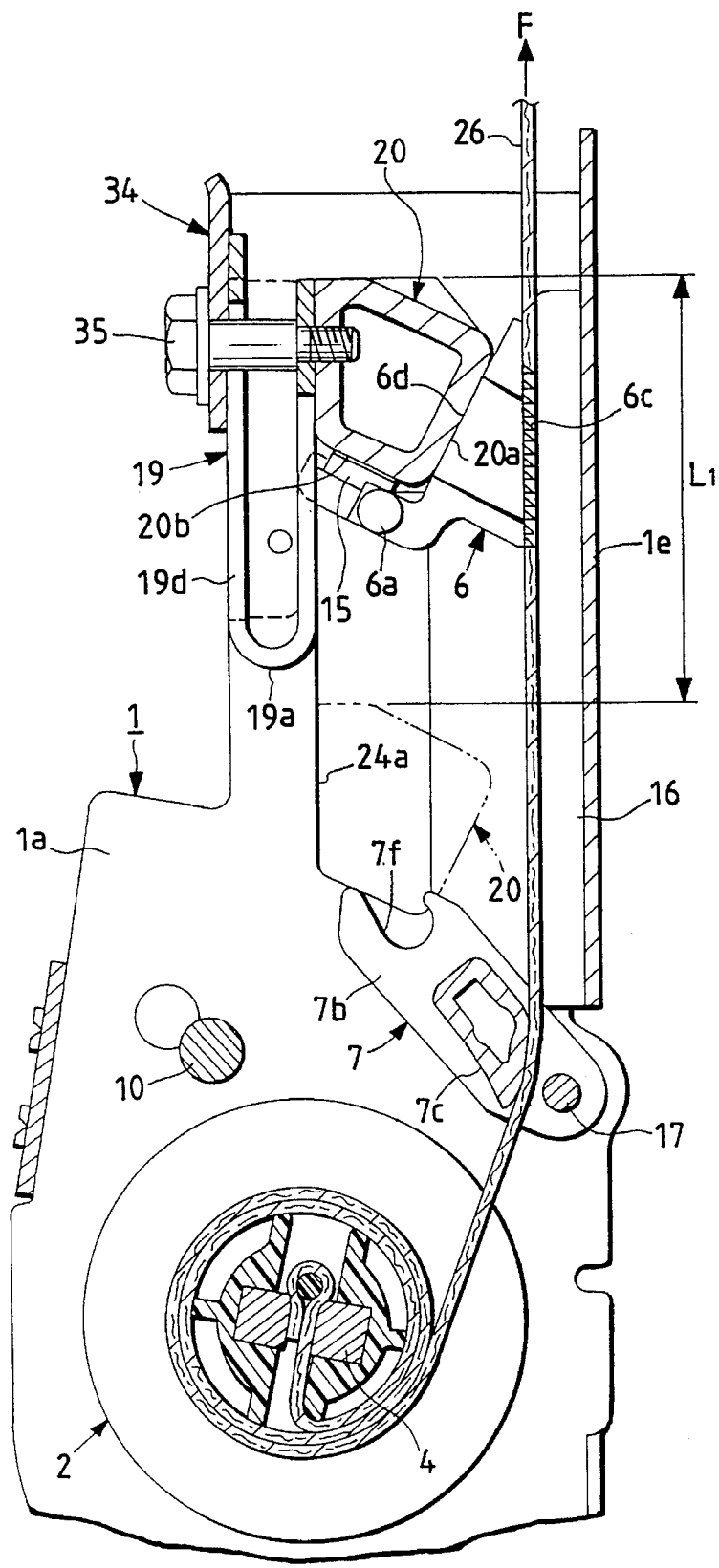
FIG. 5 is a longitudinal sectional view showing the main portion of the retractor with the clamping mechanism as shown in FIG. 1, for explaining the operation of the clamping mechanism of the retractor.

The upper plate 20, together with the clamp member 6, moves in the webbing draw-out direction, the webbing 26 is extended from the retractor, and the holding operation of the clamping mechanism is terminated. Thereafter, the upper plate 20 further moves a distance $L_1$ in the webbing draw-out direction while deforming the upper stay 19 which prevents the movement of the upper plate 20 (FIG. 5). At the same time, the webbing 26 wound on the bobbin 2 is tightened to be extended outward a length $L_1$.

The kinetic energy of the occupant is effectively absorbed by a deformation resistance of the upper stay 19 and a winding resistance of the webbing 26. Further, an abrupt decrease of the tension to the webbing 26 is prevented when the clamp is removed. The webbing 26 is drawn out of the retractor while the draw-out force is kept at a fixed value.

Thus, by preventing the abrupt decrease of the tension of the webbing 26 after the clamp is removed, an efficient absorption of the kinetic energy of the occupant at the initial stage of the collision is realized. The load increase following the load decrease can be prevented, thereby effectively reducing the shock to the occupant.

Figure 15:
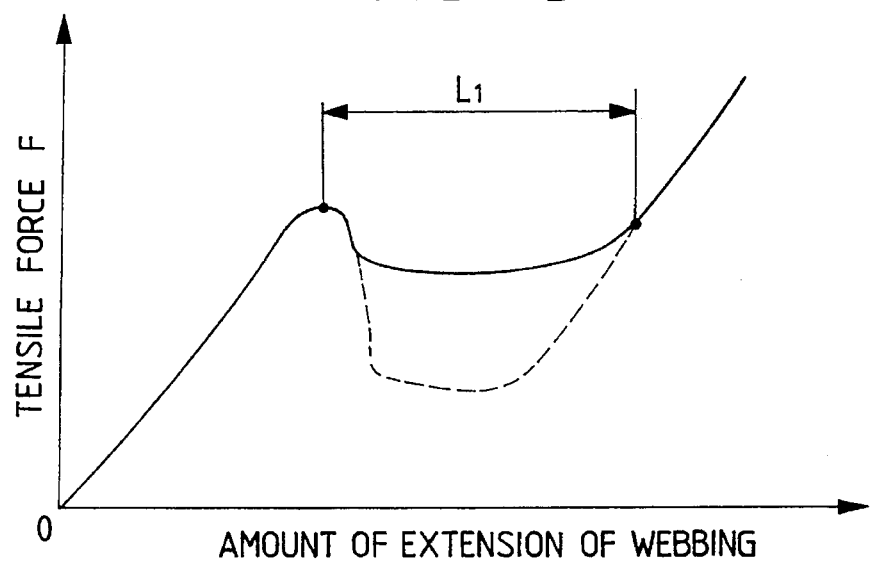
FIG. 15 is a graph showing a variation of a tension F with respect to the amount of extension of the webbing.

FIG. 15 shows a graph of a variation of a tension F with respect to the amount of extension of the webbing. In the graph, the curve indicated by a broken line represents a variation of a tension in a conventional retractor with a clamping mechanism. As shown, as the holding operation of the clamping mechanism is removed, tight winding of the webbing wound on the winding shaft starts and the webbing is abruptly extended. Accordingly, the tension acting on the webbing also abruptly decreases. With the locking of the movement of the winding shaft in the webbing draw-out direction by the emergency locking mechanism, the webbing tension abruptly increases again. Another curve indicated by a solid line is representative of a variation of a tension in the retractor with the clamping mechanism according to the present invention. As shown, after the clamping mechanism operation is terminated, the webbing tension gently decreases. Accordingly, abrupt load increase following the load decrease is prevented.

In the retractor with the clamping mechanism according to the first embodiment, to remove the clamping mechanism, the upper plate 20, together with the clamp member 6, moves in the webbing draw-out direction while plastically deforming the upper stay 19. Therefore, there is no need for movably attaching the main body of the retractor to the vehicle body. The retractor base 1 can be firmly attached to the panel of the vehicle body. The mounting of the retractor on the vehicle body is excellent.

FIGS. 7 to 10 illustrate a main portion of a retractor with a clamping mechanism according to a second embodiment of the present invention. Brief description will be given of the same or equivalent components, parts, and members as those in the first embodiment.

An upper plate 44 as a guide member forming the clamping mechanism of the retractor (FIG. 7) is a solid member which is made of metal, and has the longitudinal length that is greater than the distance between the opposed base side plates 41a and 41b of a retractor base 41. The upper plate 44 has a slide surface 44a where it slidably contacts with the flat portion 6d of the clamp member 6. Steps 44c are formed at both ends 44d of the upper plate 44, respectively. The distance between the steps 44c is less than the distance between the base side plates 41a and 41b. Through holes 42 are formed in the base side plates 41a and 41b, respectively. Each of the through holes 42 includes a guide portion 42a and an insertion portion 42b. The guide portion 42a is extended along the base back plate 41e of the retractor base 41. The insertion portion 42b is coupled to the bottom of the guide portion 42a, and has the substantially same shape as the shape in cross section of the upper plate 44.

The upper plate 44 is inserted into the through holes 42, from the insertion portion 42b thereof. In this case, both the ends 44d of the upper plate 44 are slidably set in the guide portion 42a of the through holes 42. The steps 44c of the upper plate 44 are in contact with the inner walls of the base side plates 41a and 41b of the retractor base 41. When moved upward relative to the retractor base, the steps 44c of the upper plate 44 abut on the inner walls of the base side plates 41a and 41b, so that the upper plate 44 is made immovable in the longitudinal direction but movable along the base back plate 41e of the retractor base 41.

An upper stay 43 forms a holding device for preventing the movement of the upper plate 44 in the webbing draw-out direction. The upper stay 43 is a holding member made of a metal plate that is punched to have a desired shape in plan and bent to have a corrugated shape in cross section. More specifically, the upper stay 43 includes a corrugated plastically deforming portion 43a and an upper plate fixing portion 43c constituting the lower end portion thereof.

The upper stay 43 is inserted into the guide portions 42a of the through holes 42. The mounting portions 43b constituting the upper end portion of the upper stay 43 are fixed to the base side plate 41b by means of machine screws. The upper plate 44 is fixed to the upper plate fixing portion 43c by means of fixing machine screws 45. The upper stay 43 is wider than a distance between the base side plates 41a and 41b of the retractor base 41. The height of the corrugation of the corrugated plastically deforming portion 43a is substantially equal to the opening width of the guide portion 42a.

Figure 8:
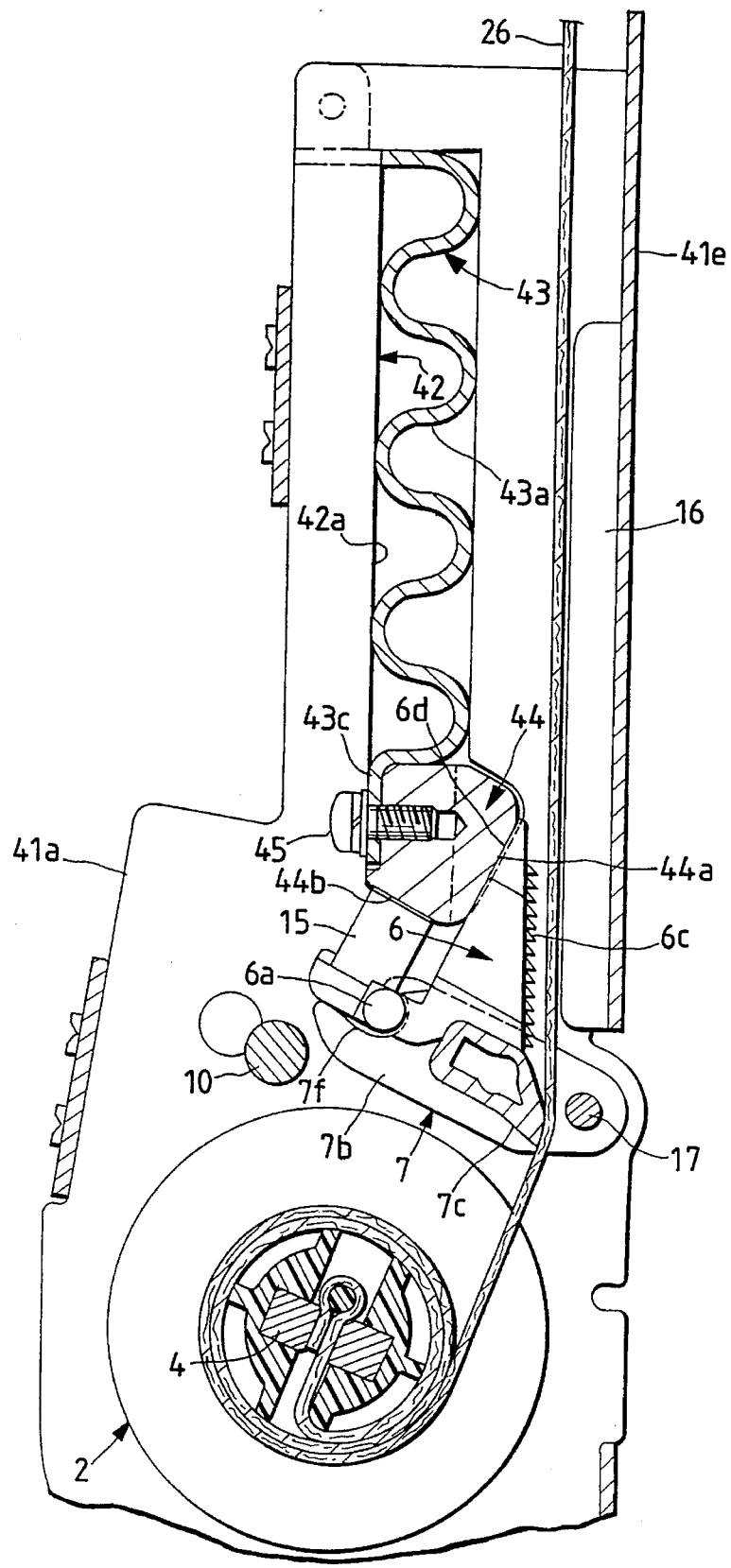
FIG. 8 is a longitudinal sectional view showing a main portion of the retractor with the clamping mechanism as shown in FIG. 7, for explaining the operation of the clamping mechanism of the retractor.

As shown in FIG. 8, the slide surface 44a of the upper plate 44 is inclined at a given angle to a lower plate 16, with its top close to the lower plate 16. The lower plate 16 is fixed to the base back plate 41e of the retractor base 41. The upper plate 20 is locked in the movement in the webbing draw-out direction. The slide surface 44a of the upper plate 44 guides the clamp member 6 to the webbing clamping and engaging position.

The operation of the clamping mechanism according to the second embodiment of the present invention will be described.

Figure 9:
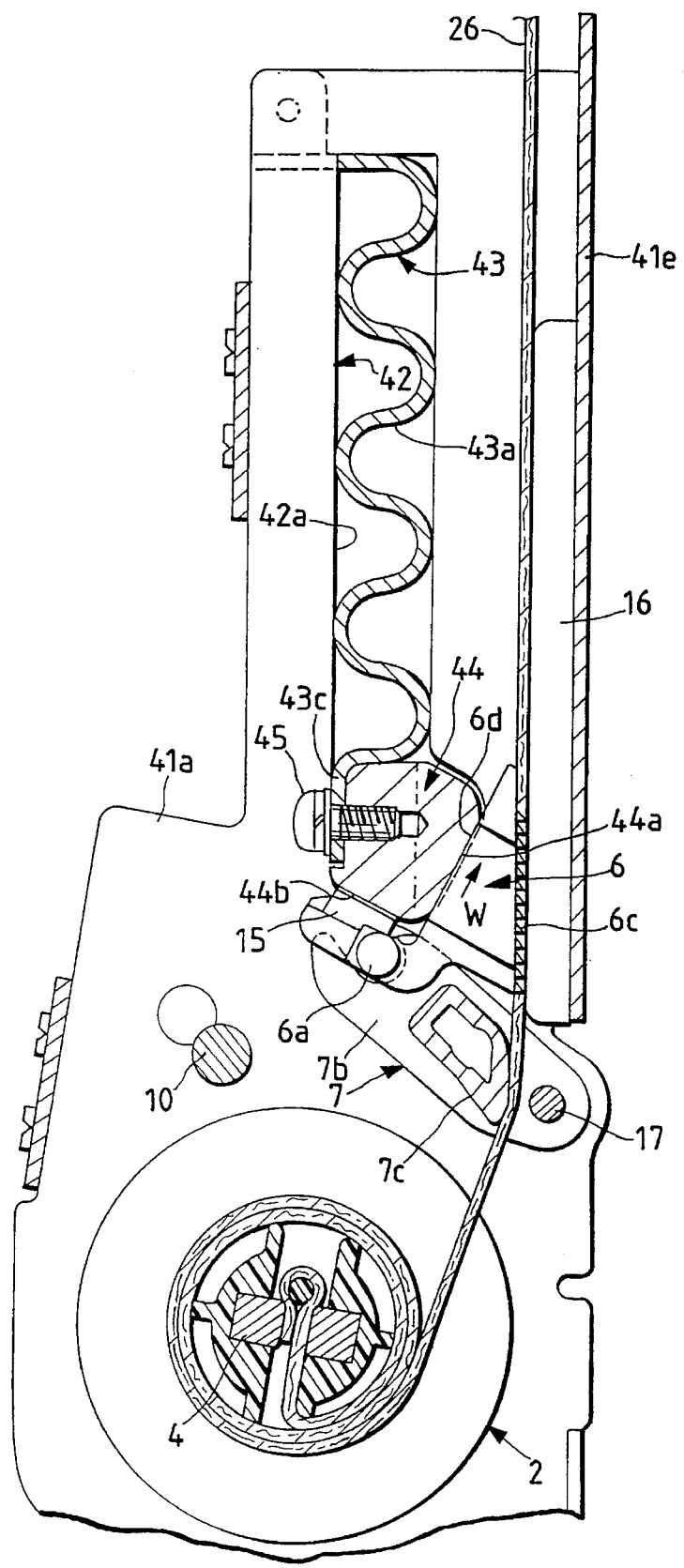
FIG. 9 is a longitudinal sectional view showing the main portion of the retractor with the clamping mechanism as shown in FIG. 7, for explaining the operation of the clamping mechanism of the retractor.

In an emergency, such as a vehicle collision, a tension acts on the webbing 26 and an abrupt turning force exceeding a predetermined value is applied to the winding shaft 4 in the webbing draw-out direction. The wedge-shaped clamp member 6 is immediately moved upward along the slide surface 44a of the upper plate 44 by the clamp lever 7, while resisting the spring force of the return spring 15 (FIG. 9). At this time, the wedge-shaped clamp member 6 is moved in the webbing holding direction (of an arrow W), to thereby hold the webbing 26 in a state that it is nipped between the slide surface 44a and the lower plate 16.

At this time, a vertical drag is applied between the clamp member 6 holding the webbing 26 and the upper plate 44. A pushing force for moving the upper plate 44 along the guide portion 42a in the webbing draw-out direction, acts on the upper plate 44. A compressing force to move the upper plate fixing portion 43c together with the upper plate 44 toward the upper portion of the retractor acts on the plastically deforming portion 43a of the upper stay 43. However, the upper plate 44 is prevented in the movement in the webbing draw-out direction since the plastically deforming portion 43a has such a rigidity as to prevent deformation of the plastically deforming portion 43a when a tension acting on the webbing 26 is smaller than a given tension and when a load that is smaller than a predetermined load is applied to the plastically deforming portion 43a of the upper stay 43, through the clamp member 6 and the upper plate 44. Accordingly, the webbing 26 is pressed between the clamp member 6 and the lower plate 16, so that it cannot be drawn out.

In the clamping state as mentioned above, when the collision shock becomes excessively large and the tension F of the webbing 26 further grows, the clamp member 6 moves in the direction W. Accordingly, a thrusting force (vertical drag) of the clamp member 6 against the lower plate 16 and the upper plate 20 also grows.

A tension F larger than a predetermined value acts on the webbing 26, and the clamp member 6 moves the upper plate 44 and the upper plate fixing portion 43c of the upper stay 43 toward the upper portion of the retractor while keeping the holding force. And a compressing force acting on the plastically deforming portion 43a of the upper stay 43 exceeds a predetermined load. Accordingly, the upper plate 44, together with the clamp member 6, moves in the webbing draw-out direction while folding up the plastically deforming portion 43a, with the movement of the clamp member 6 in the webbing draw-out direction. As a result, the holding operation of the clamping mechanism is terminated.

Figure 10:
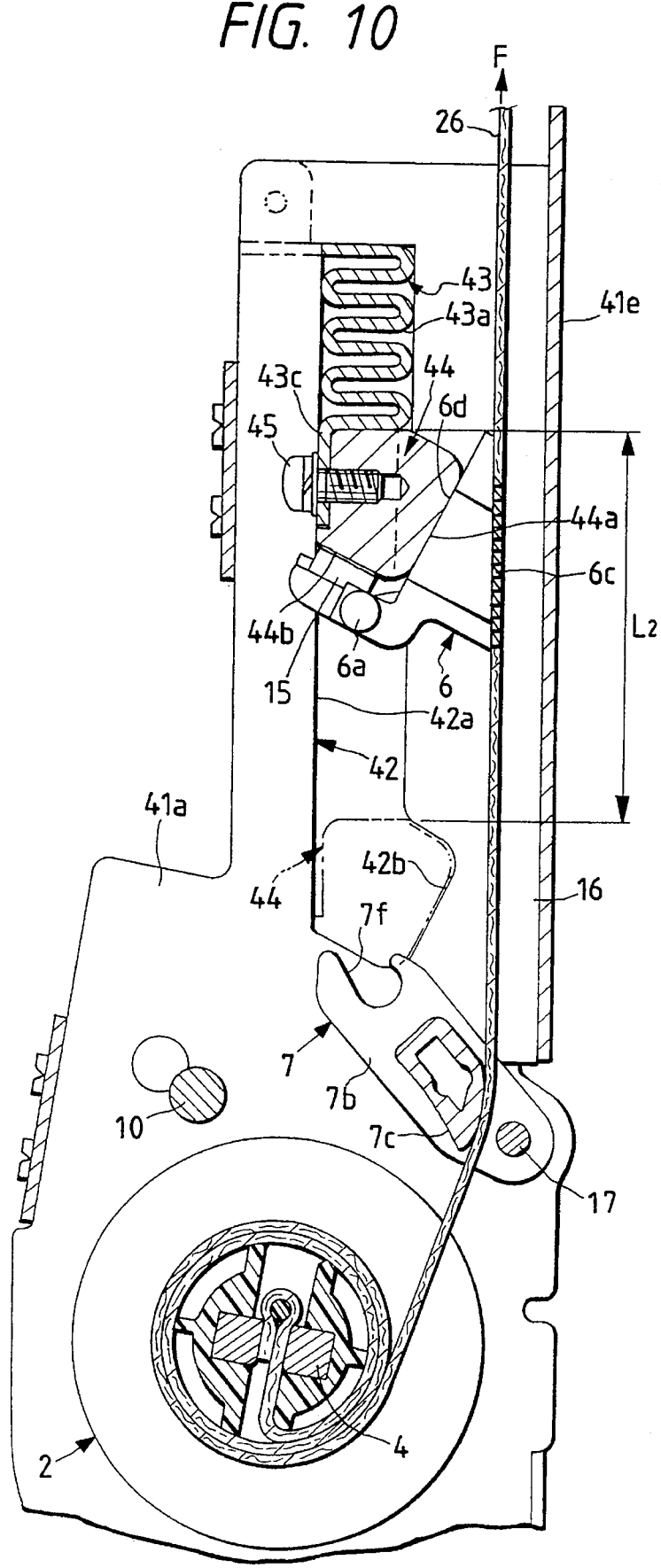
FIG. 10 is a longitudinal sectional view showing the portion of the retractor with the clamping mechanism as shown in FIG. 7, for explaining the operation of the clamping mechanism of the retractor.

The upper plate 44, together with the clamp member 6, moves in the webbing draw-out direction, the webbing 26 is extended from the retractor, and the clamping mechanism operation is terminated. Thereafter, the upper plate 44 further moves a distance $L_2$ in the webbing draw-out direction while deforming the upper stay 43 which prevents the movement of the upper plate 44 (FIG. 10). At the same time, the webbing 26 wound on the bobbin 2 is tightened to be extended outward a length $L_2$.

The kinetic energy of the occupant is effectively consumed by a deformation resistance of the upper stay 43 and a winding resistance of the webbing 26. Further, an abrupt decrease of the tension to the webbing 26 is prevented when the clamp is removed. The webbing 26 is drawn out of the retractor while the draw-out force is kept at a fixed value.

Thus, as in the clamping mechanism of the first embodiment, in the clamping mechanism of the second embodiment, by preventing the abrupt decrease of the tension of the webbing 26 after the clamp is removed, an efficient absorption of the kinetic energy of the occupant at the initial stage of the collision is realized. The load increase following the load decrease can be prevented, thereby effectively reducing the shock to the occupant.

In the retractor with the clamping mechanism according to the second embodiment, to remove the clamping mechanism, the upper plate 44, together with the clamp member 6, moves in the webbing draw-out direction while deforming the upper stay 43. Therefore, there is no need for movably attaching the main body of the retractor to the vehicle body. The retractor base 41 can be firmly attached to the panel of the vehicle body. The mounting of the retractor on the vehicle body is excellent.

It is evident that the shapes of the guide member and the holding member, the position of the deforming portion of the holding member, and the like are not limited to in the embodiment, but those can be altered within the scope of the present invention.

FIGS. 11 to 14 illustrate a main portion of a retractor with a clamping mechanism according to a third embodiment of the present invention. Brief description will be given of the same or equivalent components, parts, and members as those in the above-mentioned embodiments.

Figure 11:
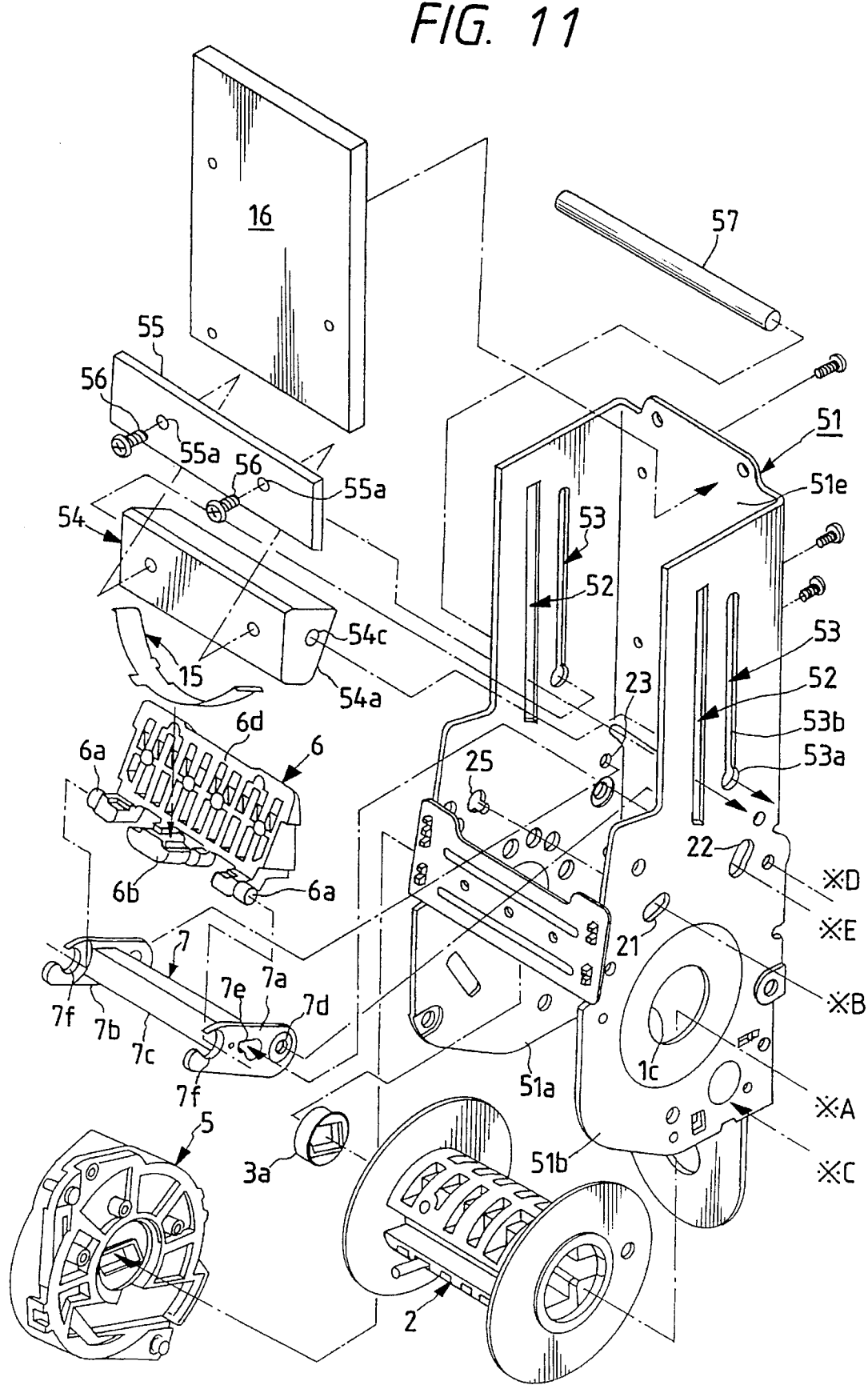
FIG. 11 is an exploded perspective view showing a part of a retractor with a clamping mechanism according to a third embodiment of the present invention.

A clamping mechanism shown in FIG. 11 includes a clamp member 6, an upper plate 54, and a through pin 57. The upper plate 54 as a guide member which slidably contacts a flat portion 6d of the clamp member 6, that is opposite to the side thereof having the clamp teeth 6c formed thereon, whereby guiding the clamp member 6. The through pin 57 is a holding pin forming a holding device for preventing the movement of the upper plate 54 in the webbing draw-out direction.

The upper plate 54 is a solid member which is made of metal is trapezoidal in cross section, and has a longitudinal length that is less than the distance between the opposed base side plates 51a and 51b of a retractor base 51. The upper plate 54 has a slide surface 54a where it slidably contacts the flat portion 6d of the clamp member 6. A guide groove 52 and a slit 53 are formed each of the opposed base side plates 51a and 51b. The guide groove 52 is extended along the base back plate 51e. The slit 53 is extended in parallel with respect to the guide groove 52. The slit 53 includes a support opening portion 53a and a narrow hole portion 53b. The support opening portion 53a opens at the bottom end of the slit 53, and has the substantially same shape as the shape in cross section of the through pin 57. The narrow hole portion 53b is extended upward from the support opening portion 53a and the width of the narrow hole portion 53b is less than the diameter of the through pin 57.

A slide plate 55 with through holes 55a is inserted into the guide grooves 52 of the base side plates 51a and 51b so that both ends of the slide plate 55 are supported at the through holes 55a, and firmly attached to the upper plate 54 by screwing fixing machine screws 56 into the through holes 55a. The slide surface 54a of the upper plate 54 is inclined at a given angle to a lower plate 16, with its top close to the lower plate 16. In this state, the upper plate 54 is movable in parallel with respect to the base back plate 51e. The lower plate 16 is fixed to the base back plate 51e of the retractor base 51. The slide surface 54a of the upper plate 54 guides the clamp member 6 to the webbing clamping and engaging position.

The through pin 57 is passed through a through hole 54c of the upper plate 54, which the through hole 54c is longitudinally punched through the upper plate 54. Both ends of the through pin 57 are inserted into the support opening portions 53a and supported thereby. The through pin 57 thus set prevents the movement of the upper plate 54 in the webbing draw-out direction. The width of the narrow hole portion 53b coupling to the support opening portion 53a is shorter than the diameter of the through pin 57. Therefore, the through pin 57 supported by the support opening portions 53a cannot be moved upward.

The through pin 57 and the slit 53 form a holding device for preventing the movement of the upper plate 54 in the webbing draw-out direction. When a load larger than a predetermined value is applied to the through pin 57 by the clamp member 6, the through pin 57 plastically deforms the slits 53 of the base side plates 51a and 51b to allow the upper plate 54 to move in the webbing draw-out direction.

Figure 12:
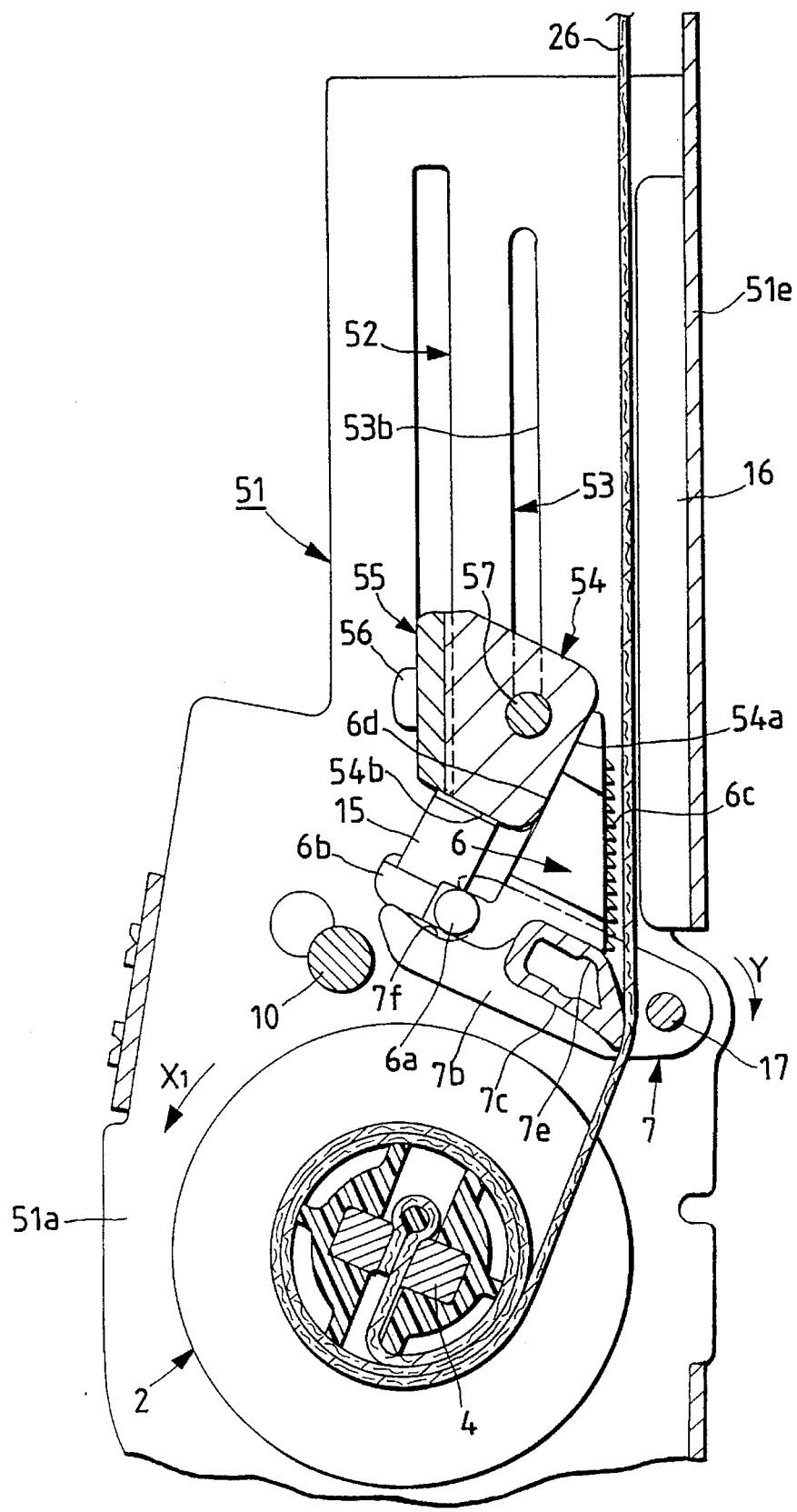
FIG. 12 is a longitudinal sectional view showing a main portion of the retractor with the clamping mechanism as shown in FIG. 11, for explaining the operation of the clamping mechanism of the retractor.

As shown in FIG. 12, the clamp member 6 is positioned in a state that the flat portion 6d of the clamp member 6 is in face contact with the slide surface 54a of the upper plate 54 while the acutely angled tip of the clamp member 6 is directed upward. Accordingly, the clamp teeth 6c of the clamp member 6 is constantly disposed in parallel with respect to the surface of the webbing 26 that is held with the clamp teeth. Therefore, the clamp member 6 which slides on the slide surface 54a of the upper plate 54 uniformly clamps and engages the webbing 26.

The operation of the clamping mechanism according to the third embodiment of the present invention will be described.

Figure 13:
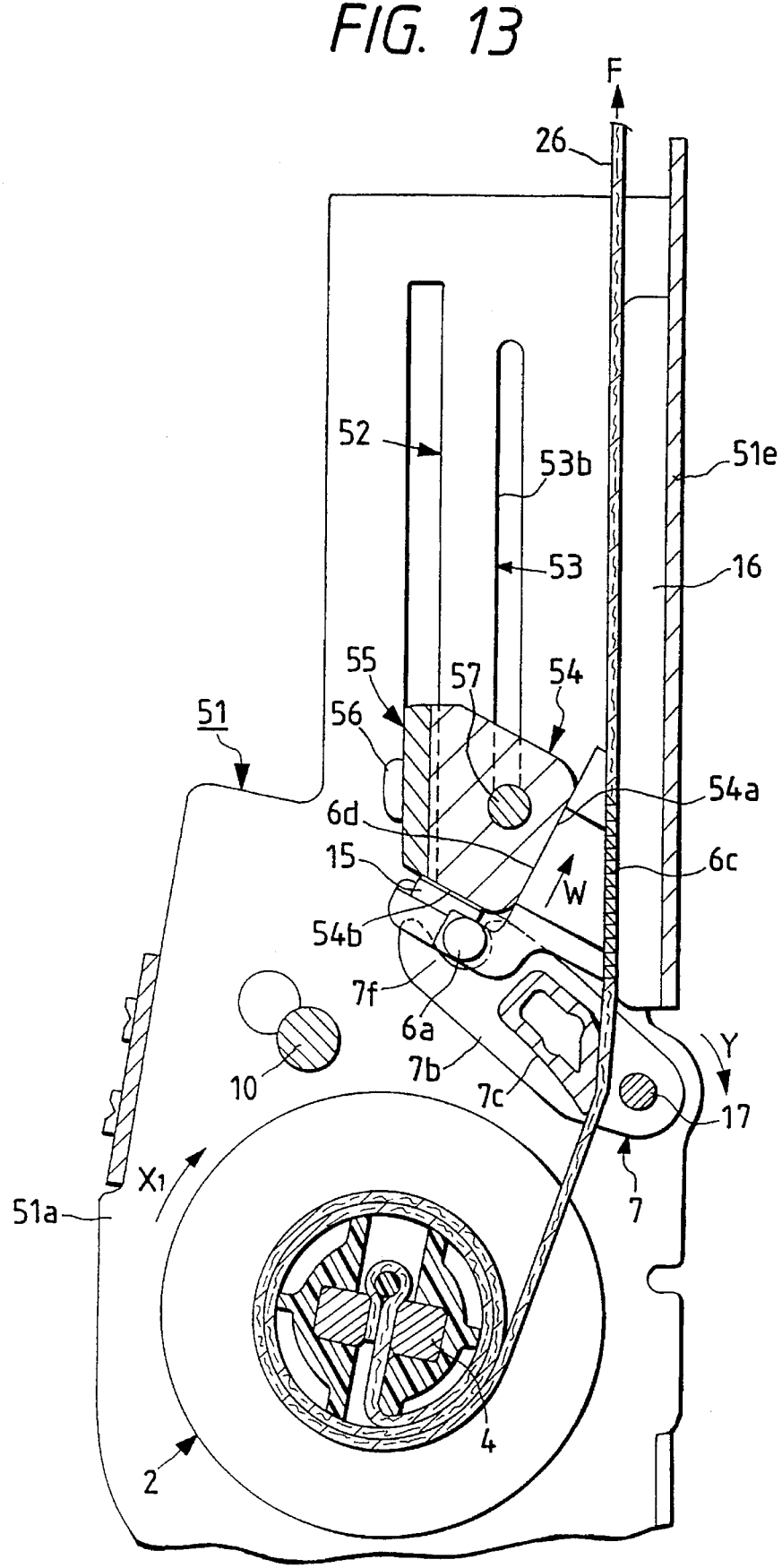
FIG. 13 is a longitudinal sectional view showing the main portion of the retractor with the clamping mechanism as shown in FIG. 11, for explaining the operation of the clamping mechanism of the retractor.

In an emergency, such as a vehicle collision, a tension acts on the webbing 26 and an abrupt turning force exceeding a predetermined value is applied to the winding shaft 4 in the webbing draw-out direction. The wedge-shaped clamp member 6 is immediately moved upward along the slide surface 54a of the upper plate 54 by the clamp lever 7, while resisting the spring force of the return spring 15 (FIG. 13). At this time, the wedge-shaped clamp member 6 is moved in the webbing holding direction (of an arrow W), to thereby hold the webbing 26 in a state that it is nipped between the slide surface 54a and the lower plate 16.

At this time, a vertical drag is applied between the clamp member 6 holding the webbing 26 and the upper plate 54. A pushing force for moving the upper plate 54 along the guide portion 52a in the webbing draw-out direction, acts on the upper plate 54. At this time, the through pin 57 moves upward in the retractor with the upward movement of the upper plate 54. Accordingly, a pushing force to push the narrow hole portion 53b wide acts on the bottom of the narrow hole portion 53b of the slit 53. However, the upper plate 54 is prevented in the movement in the webbing draw-out direction since the narrow hole portion 53b has such a rigidity as to prevent deformation of the narrow hole portion 53b when a tension acting on the webbing 26 is smaller than a given tension and when a load that is smaller than a predetermined load is applied to the lower end of the narrow hole portion 53b from the clamp member 6, through the upper plate 54 and the through pin 57. Accordingly, the webbing 26 is pressed between the clamp member 6 and the lower plate 16, so that it cannot be drawn out.

In the clamping state as mentioned above, when the collision shock becomes excessively large and the tension F of the webbing 26 further grows, the clamp member 6 moves in the direction W. Accordingly, a pushing force (vertical drag) of the clamp member 6 against the lower plate 16 and the upper plate 54 also grows.

A tension F larger than a predetermined value acts on the webbing 26, and the clamp member 6 moves the upper plate 54 and the through pin 57 toward the upper portion of the retractor while keeping the holding force. And a pushing force acting on the lower end of the narrow hole portion 53b exceeds a predetermined load. Accordingly, the upper plate 54, together with the clamp member 6, moves in the webbing draw-out direction while the upper plate 54 deforms the narrow hole portions 53b to be expanded, with the movement of the clamp member 6 in the webbing draw-out direction. As a result, the clamping mechanism holding operation is terminated.

Figure 14:
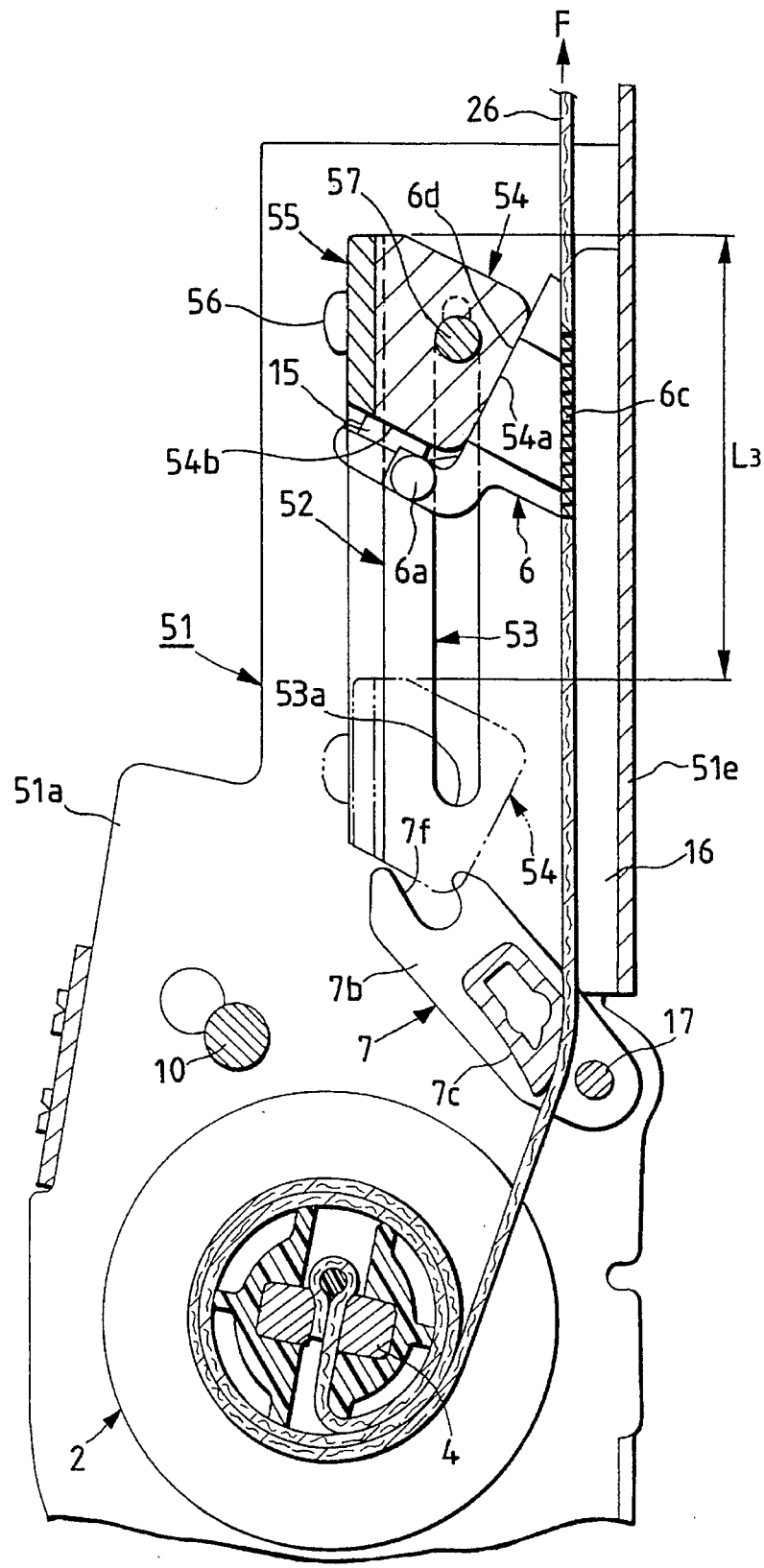
FIG. 14 is a longitudinal sectional view showing the main portion of the retractor with the clamping mechanism as shown in FIG. 11, for explaining the operation of the clamping mechanism of the retractor.

The upper plate 54, together with the clamp member 6, moves in the webbing draw-out direction, the webbing 26 is extended from the retractor, and the clamping mechanism holding operation is terminated. Thereafter, the upper plate 54 further moves a distance $L_3$ in the webbing draw-out direction while deforming the narrow hole portion 53b to be expanded by pushing the narrow hole portion 53b which prevents the movement of the upper plate 54 with the through pin 57 (FIG. 14). At the same time, the webbing 26 wound on the bobbin 2 is tightened to be extended outward a length $L_3$.

A kinetic energy of the occupant is effectively consumed by a deformation resistance of the narrow hole portion 53b and a winding resistance of the webbing 26. Further, an abrupt decrease of the tension to the webbing 26 is prevented when the clamp is removed. The webbing 26 is drawn out of the retractor while the draw-out force is kept at a fixed value.

Thus, as in the clamping mechanism of the above-mentioned embodiments, in the clamping mechanism of the third embodiment, by preventing the abrupt decrease of the tension of the webbing 26 after the clamp is removed, an efficient absorption of the kinetic energy of the occupant at the initial stage of the collision is realized. The load increase following the load decrease can be prevented, thereby effectively reducing the shock to the occupant.

In the retractor with the clamping mechanism according to the third embodiment, to remove the clamping mechanism, the upper plate 54, together with the clamp member 6, moves in the webbing draw-out direction while deforming the slits 53 of the base side plates 51a and 51b of the retractor base 51 with the through pin 57. Therefore, there is no need for movably attaching the main body of the retractor to the vehicle body. The retractor base 51 can be firmly attached to the panel of the vehicle body. The mounting of the retractor on the vehicle body is excellent.

It is evident that the shapes and the number of the constituent members, such as the guide member and the holding pin, and the like are not limited to those in the third embodiment, but can be altered within the scope of the present invention. In the third embodiment, the through pin 57 longitudinally passing through the guide member is used for the holding pin as one of the members of the holding device. Alternatively, short fixing pins are fixed to one end of the guide member in a state that these fixing pins pass through the slits of the base side plates of the retractor base 51. The upper plate 54, together with the clamp member 6, moves in the webbing draw-out direction while deforming the slits 53 of the base side plates 51a and 51b with the through the fixing pins.

A tensile load of the webbing when the holding operation of the clamping mechanism is removed and a tensile load after it is removed can be adjusted by changing the shape and the rigidity of the slits. The webbing extension length $L_3$ can also be adjusted easily.

Figure 16:
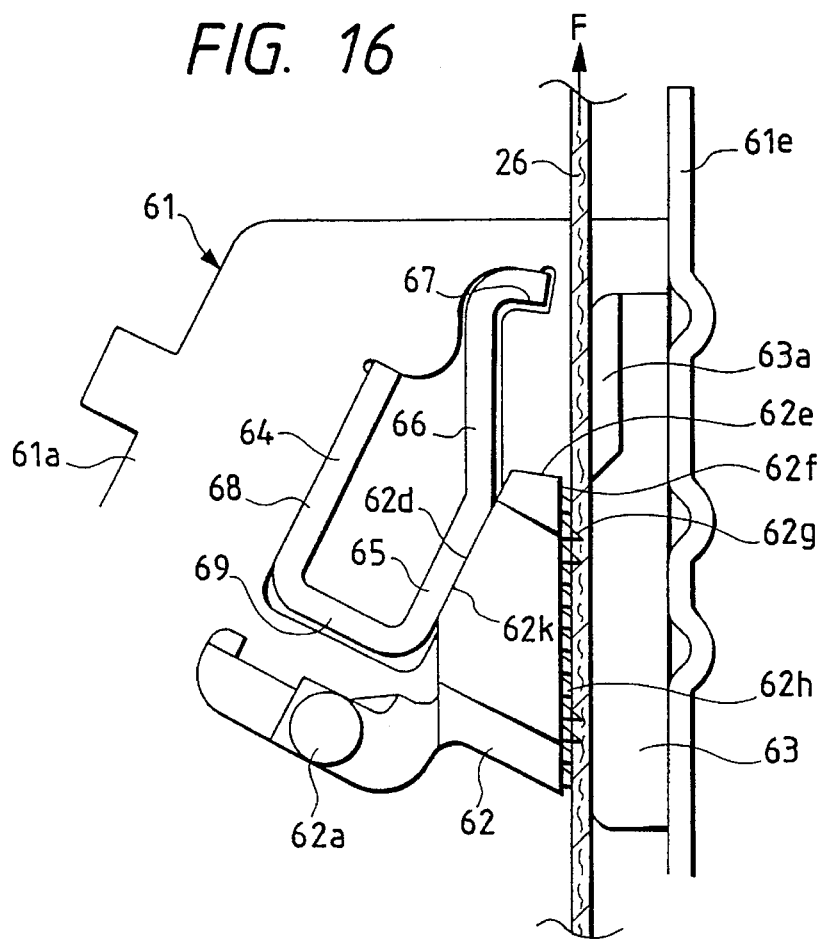
FIG. 16 is a longitudinal sectional view showing a clamping mechanism as a main portion of a retractor with a clamping mechanism according to a fourth embodiment of the present invention, for showing a holding state of a webbing by the clamping mechanism.
Figure 17:
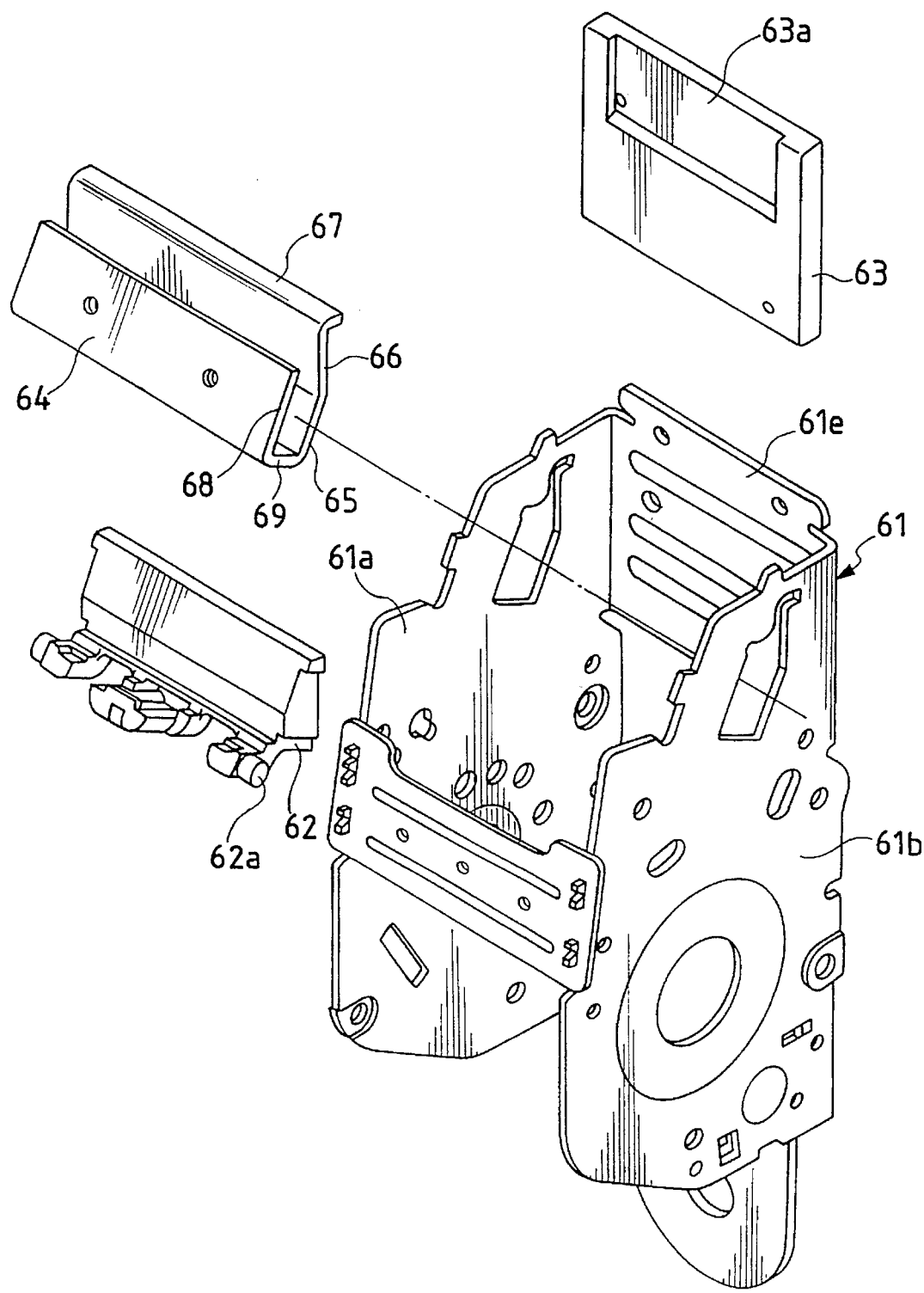
FIG. 17 is an exploded perspective view showing an overall construction of the clamping mechanism shown in FIG. 16.
Figure 18:
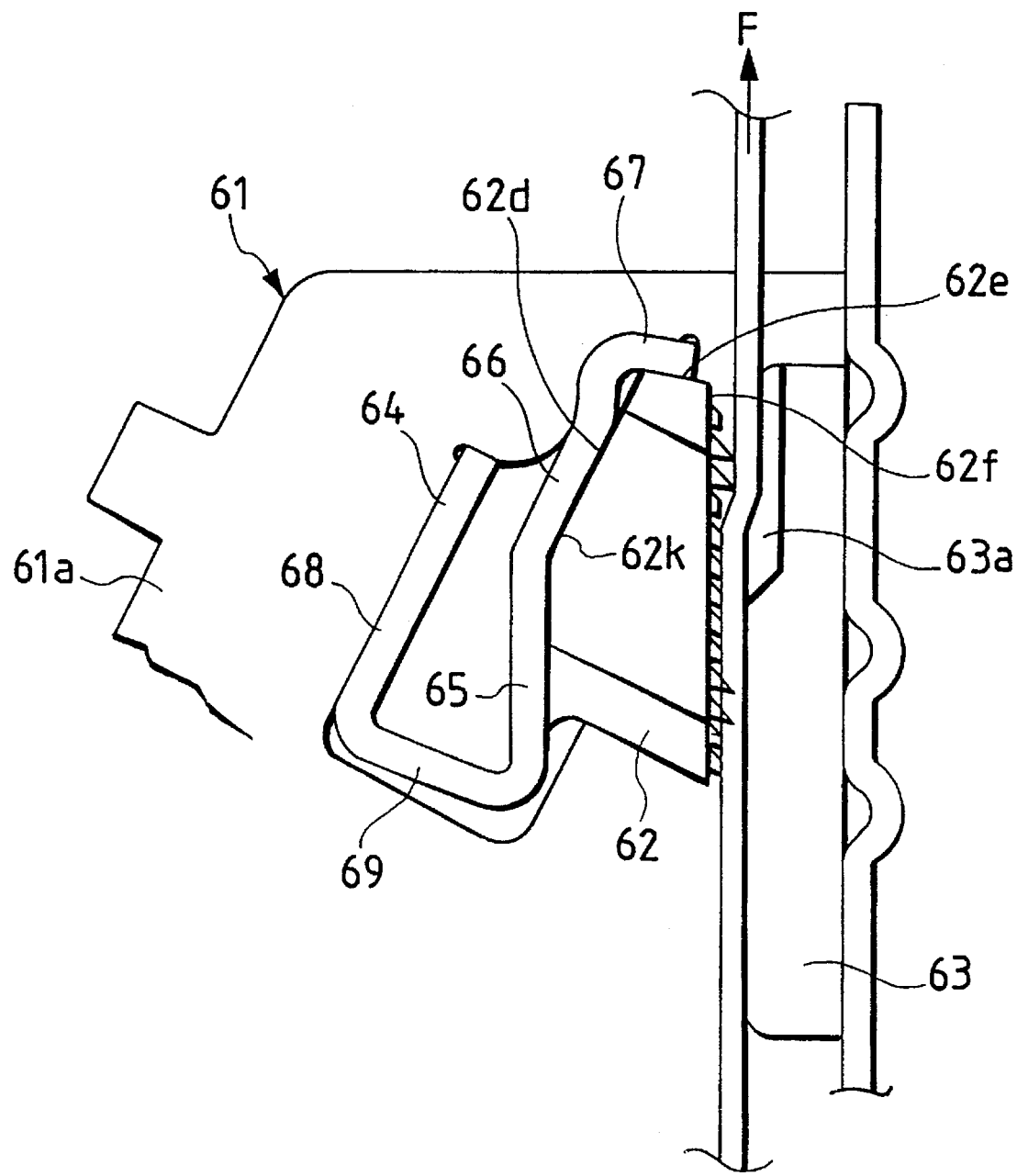
FIG. 18 is a longitudinal sectional view showing the clamping mechanism shown in FIG. 16 when the webbing is released from its holding state.

FIGS. 16 to 18 show a fourth embodiment of a retractor with a clamping mechanism according to the present invention. Of these figures, FIG. 16 is a longitudinal sectional view showing a clamping mechanism as a main portion of a retractor with a clamping mechanism according to a fourth embodiment of the present invention, the illustration showing a holding state of a webbing by the clamping mechanism. FIG. 17 is an exploded perspective view showing an overall construction of the clamping mechanism shown in FIG. 16. FIG. 18 is a longitudinal sectional view showing the clamping mechanism of FIG. 16 when the webbing is released from its holding state. Brief description will be given of the same or equivalent components, parts, and members as those in the above-mentioned embodiments.

The retractor with the clamping mechanism according to the fourth embodiment generally includes a retractor base 61, a bobbin (not shown), and a clamping mechanism. The retractor base 61 includes a pair of opposed base side plates 61a and 61b, and a base back plate 61e connecting the base side plates 61a and 61b. The retractor base 61 is mounted on a fixed structure (e.g., a vehicle body) of a seat. A webbing 26 as a seat belt is wound around the bobbin, rotatably supported by the retractor base 61. In an emergency, such as a vehicle collision, the clamping mechanism holds the webbing 26 at a predetermined position along the base back plate 61e of the retractor base 61, thereby preventing the draw-out of the webbing 26.

The clamping mechanism, as shown in FIGS. 16 and 17, is made up of a lower plate 63, a clamp member 62, an upper plate 64, and an upper stay. The lower plate 63 is fixed to a predetermined location on the base back plate 61e of the retractor base 61. The clamp member 62 with an array including a number of clamp teeth is pressed against the webbing 26, to thereby clamp and engage the webbing. The upper plate 64 serves as a guide member for guiding the clamp member 62. The upper stay fixes the upper plate 64 to the base side plates 61a and 61b of the retractor base 61.

The clamp member 62, as shown in FIG. 16, includes a flat surface 62e of the front end thereof, a webbing opposing surface 62f with clamp teeth formed thereon, which is to be pressed against the webbing 26 for clamping and engaging, a flat portion 62d which is located on the opposite side of the webbing opposing surface 62f and is to be slid on the slide surface of the upper plate 64, and a rear edge 62k located at the rear end of the flat portion 62d. The clamp member 62 further includes pivots 62a protruded sideways from rear extensions of the clamp member 62. The pivots 62a of the clamp member 62 are rotatably supported by a clamp lever. The clamp teeth formed on the webbing opposing surface 62f include first clamp teeth 62g with sharpened ends and second clamp teeth 62h with flat ends.

As shown in FIG. 16, the first clamp teeth 62g are stuck into the webbing 26, to thereby prevent the draw-out of the webbing 26. The second clamp teeth 62h are pressed against the surface of the webbing 26, and cooperate with the lower plate 63 to prevent the draw-out of the webbing 26. The strength of the first clamp teeth 62g are selected such that in a state that the webbing is held by the clamp member 62, if a tension (load) acting the webbing 26 exceeds a predetermined value F (first specific value), the tip portions of the first clamp teeth 62g stuck into the webbing 26 are sheared or deformed, to thereby release the webbing from being fixed by the tips of the first clamp teeth 62g. In this embodiment, two pairs of lines of the first clamp teeth 62g, a total of four lines, are arrayed on the webbing opposing surface 62f of the clamp member 62, one pair of the lines arrayed on the front portion of the webbing opposing surface 62f and the other pair on the rear portion thereof.

The upper plate 64 is formed by bending a metal plate. As shown in FIG. 16, the upper plate 64 is made up of an inclined portion 65, a guide portion 66, a stopper portion 67, a fixing portion 68, and a coupling portion 69. In an emergency, the inclined portion 65 guides the clamp member 62 toward the webbing 26 while sliding on the flat portion 62d of the clamp member 62 pushed out by the clamp lever. The guide portion 66 originates from the front end of the inclined portion 65 and extends in parallel with respect to the webbing 26. The stopper portion 67, coupling to the front end of the guide portion 66, comes in contact with the flat surface 62e of the clamp member 62, thereby preventing the movement of the clamp member 62 in the webbing draw-out direction. The fixing portion 68 is fixed to the retractor base 61, with the upper stay inserted therebetween. The coupling portion 69 connects the fixing portion 68 with the inclined portion 65.

In the strength and dimensions of the inclined portion 65 and the guide portion 66, the following operation and functions are realized. After the webbing is held by the clamp member 62, a tension acting on the webbing 26 is increased, so that a load acting on the upper plate 64 reaches a predetermined value F2 (second specific value). At this time, the rear edge 62k of the clamp member 62 pushes the inclined portion 65 toward the upper plate 64, to thereby plastically deform the inclined portion 65 and the guide portion 66. The plastic deformation of these portions allows the clamp member 62 to move in the webbing draw-out direction. This results in no increase of the tension acting on the webbing 26 and absorption of kinetic energy acting on the body of an occupant. When the clamp member 62 moves a fixed distance in the webbing draw-out direction, the stopper portion 67 is brought into contact with the flat surface 62e of the front end of the clamp member 62, to thereby prevent further movement of the clamp member 62 in the webbing draw-out direction.

Here, the second specific value F2 is selected to be smaller than the first specific value F1 capable of shearing or deforming the first clamp teeth 62g of the clamp member 62. The upper plate 64 supports the clamp member 62 holding the webbing 26. Further, it is plastically deformed by a load lower than the load capable of deforming the first clamp teeth 62g. The deformation allows the clamp member 62 to move a fixed distance in the webbing draw-out direction.

A recess 63a is formed on the surface of the front end of the lower plate 63 which cooperates with the clamp member 62 to hold the webbing 26. When the movement of the clamp member 62 caused by the plastic deformation of the inclined portion 65 and the guide portion 66 of the upper plate 64 terminates, the recess 63a receives the webbing 26, so that the webbing disengages from a predetermined number of the first clamp teeth 62g that are stuck into the webbing 26 (FIG. 18).

The operation of the retractor with the clamping mechanism according to the fourth embodiment will be described. In an emergency, for example, a vehicle collision, an abrupt deceleration is generated, and an emergency locking mechanism which prevents the rotation of the bobbin operates. At this time, the clamping mechanism also operates interlocking with the emergency locking mechanism. In the initial stage of the holding of the webbing by the clamping mechanism, as shown in FIG. 16, all the first clamp teeth 62g of the clamp member 62 are reliably stuck into the webbing, thereby preventing the draw-out of the webbing. After the webbing is held, a tension exceeding a predetermined value acts on the webbing, so that a load acting on the inclined portion 65 of the upper plate 64 exceeds the second specific value F2. Then, as shown, in FIG. 18, the plastic deformation of the inclined portion 65 and the guide portion 66 of the upper plate 64 starts and the clamp member 62 holding the webbing moves. The movement of the clamp member 62 absorbs the kinetic energy acting on the webbing from the occupant, thereby preventing an increase of the tension acting on the webbing. When the clamp member 62 moves, the rear extensions of the clamp member 62 from which the pivots 62a are protruded sideways, is broken by the upper plate 64.

The plastic deformation of the upper plate 64 terminates, and no further movement of the clamp member 62 in the webbing draw-out direction is allowed (FIG. 18). At this time, the tension acting on the webbing increases again. With increase of the tension, the load acting on the first clamp teeth 62g reaches the first specific value F1. Then, the first clamp teeth 62g are sheared or deformed. The holding force reduces. The draw-out of-the webbing is allowed by the amount of the reduction of the holding force. This results in a corresponding reduction of the tension acting on the webbing. When the plastic deformation of the upper plate 64 terminates, two lines of the first clamp teeth 62g arrayed on the front portion of the webbing opposing surface 62f disengage from the webbing since the webbing is in the recess 63a. In this state, the first clamp teeth 62g of which the holding force is reduced by the shearing or deformation is only the two lines arrayed on the rear portion of the webbing opposing surface 62f, although a total of four lines of the first clamp teeth 62g are arrayed on the front portion and the rear portion of the webbing opposing surface 62f of the clamp member 62. Therefore, an abrupt reduction of the holding force is avoided. The reduction of the tension acting on the webbing, that is caused by the shearing or deformation of the first clamp teeth 62g, is gentle. After an extension of the webbing due to the shearing or deformation of the first clamp teeth 62g terminates, the tension acting on the webbing increases again. However, this tension increase is not large because of the kinetic energy absorption and the tension reduction in the previous stage.

Figure 38:
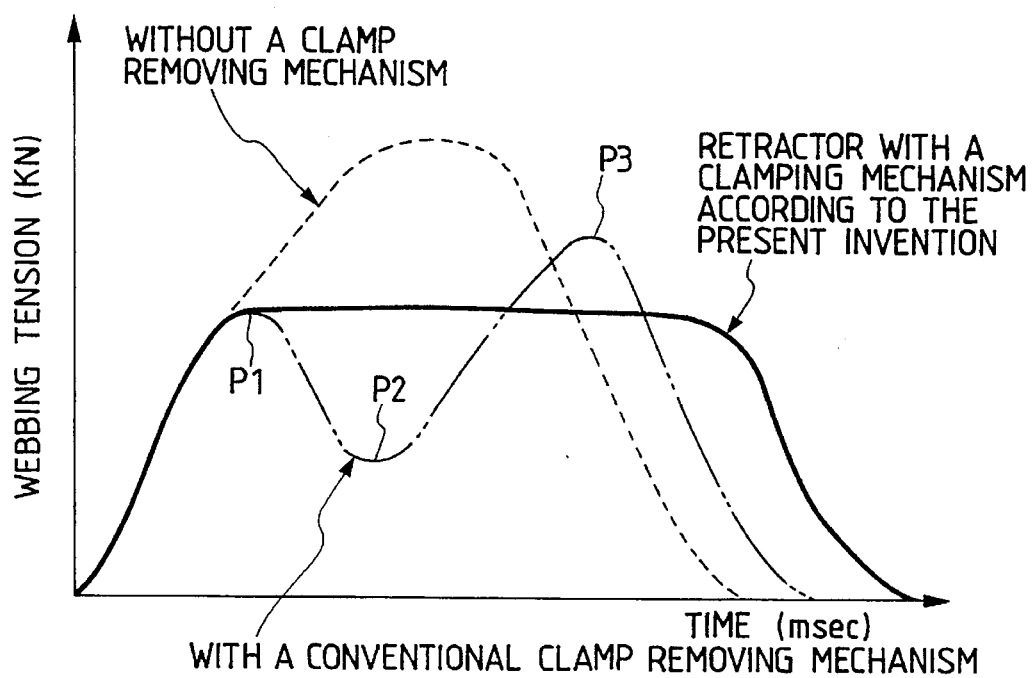
FIG. 38 is a graph showing a variation of tension of a seat belt as time passes after a collision takes place.
Figure 39:
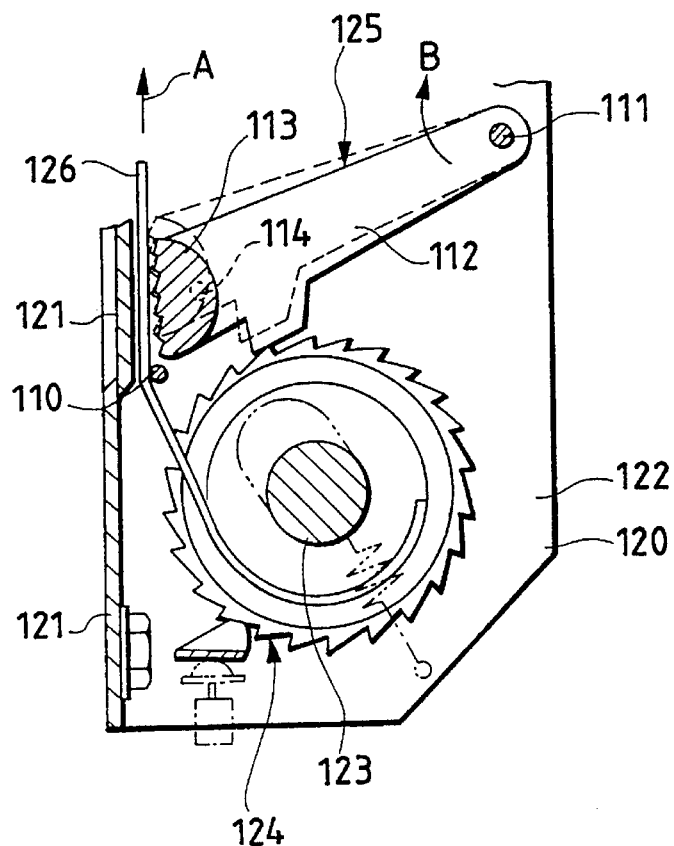
FIG. 39 is a diagram schematically showing a conventional retractor with a clamping mechanism.
Figure 40:
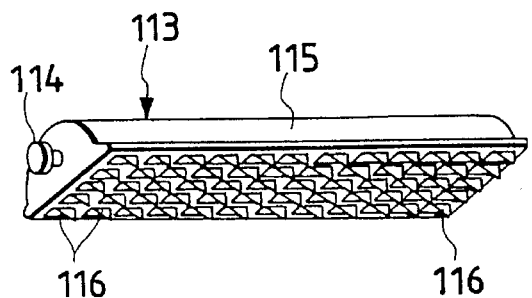
FIG. 40 is a perspective view showing a clamp member of a conventional clamping mechanism.
Figure 41:
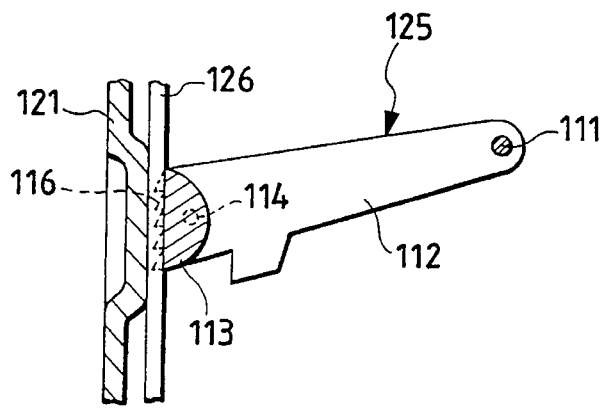
FIG. 41 is an explanatory diagram for explaining a holding state of the webbing by the conventional clamping mechanism.
Figure 42:
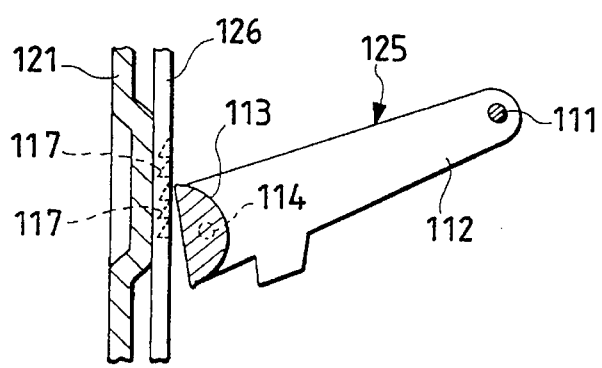
FIG. 42 is an explanatory diagram for explaining a state that the webbing is released from its holding state.
Figure 43:
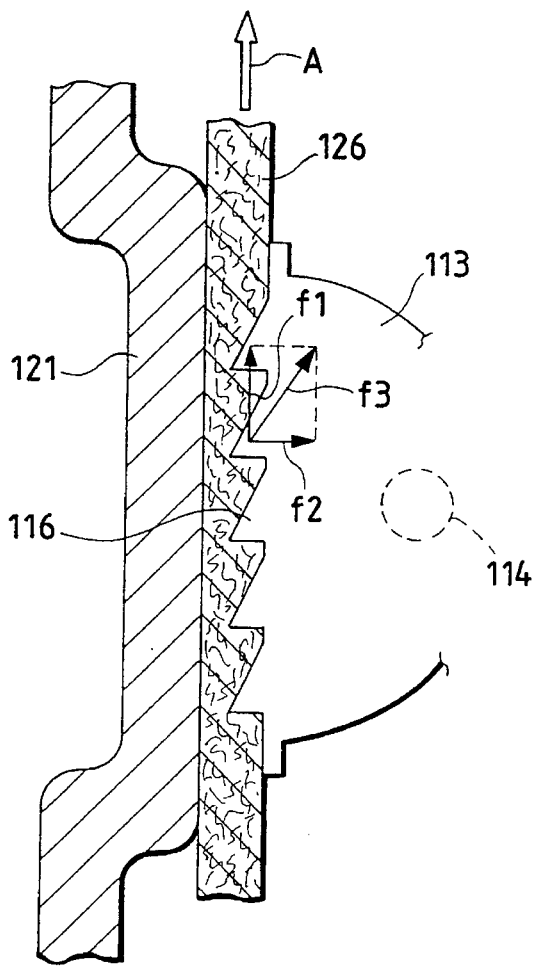
FIG. 43 is an explanatory diagram for explaining forces acting on the clamp member of the clamping mechanism.

In the fourth embodiment of the present invention, a variation of the tension acting on the webbing 26 is depicted by a smooth varying curve indicated by a solid line in FIG. 38. Due to the plastic deformation of the upper plate 64, the inclined portion 65 for pressing the clamp member 62 against the webbing 26 is broken, to thereby interrupt the continuous increase of the force for pressing the clamp member 62 against the webbing 26. Therefore, there is avoided such a situation wherein the pushing force to the webbing affects a great influence on the shearing or deformation of the first clamp teeth 62g.

Accordingly, the timing to release the webbing from being held by the clamping mechanism can be made to exactly correspond to the tension acting on the webbing. The variation of the tension acting on the seat belt can be made gentle. The amplitude of the variation of the tension can be reduced. Consequently, a shock the occupant receives from the seat belt in an emergency can be reduced effectively.

Figure 19:
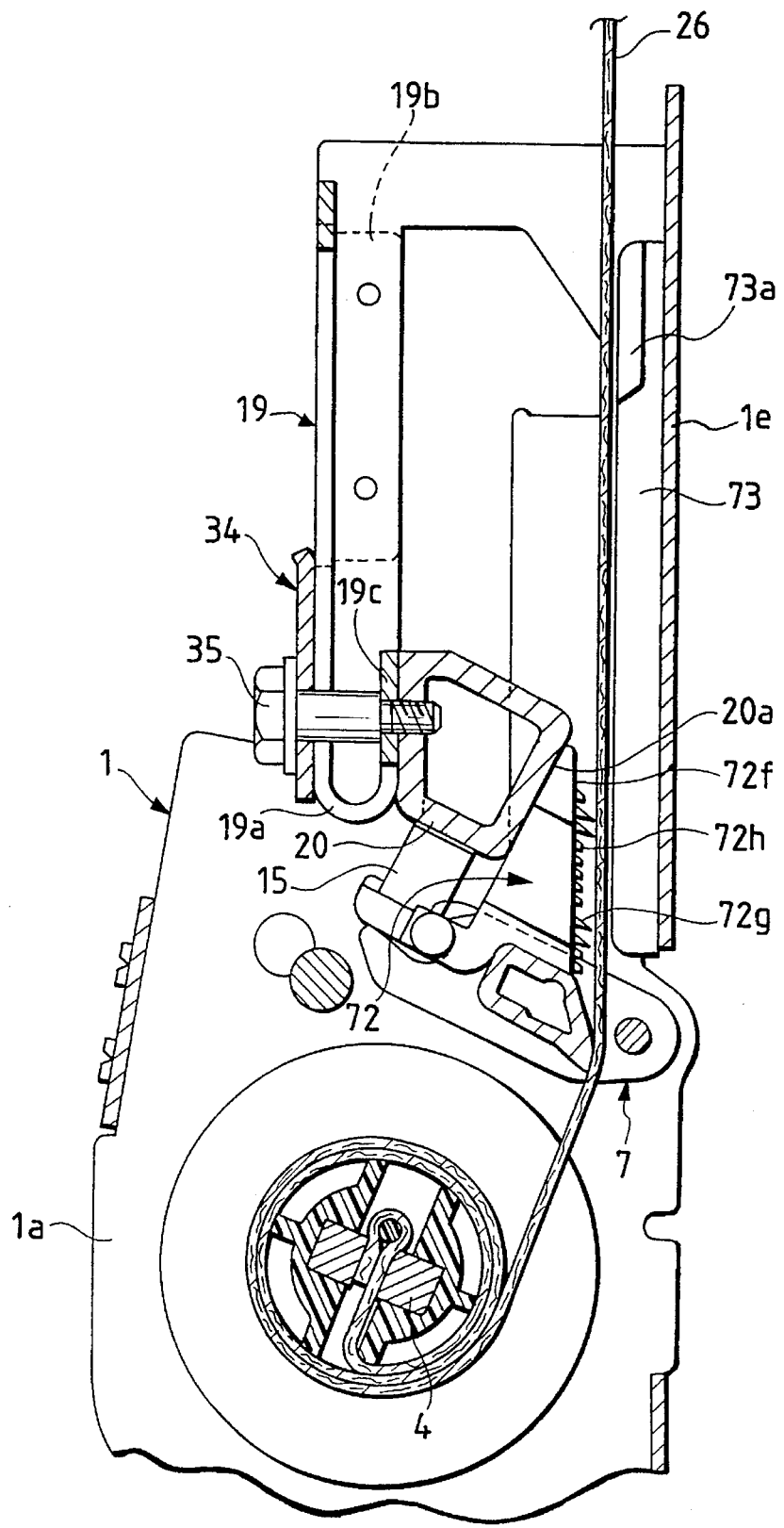
FIG. 19 is a longitudinal sectional view showing a main portion of a retractor with a clamping mechanism according to a fifth embodiment of the present invention.
Figure 20:
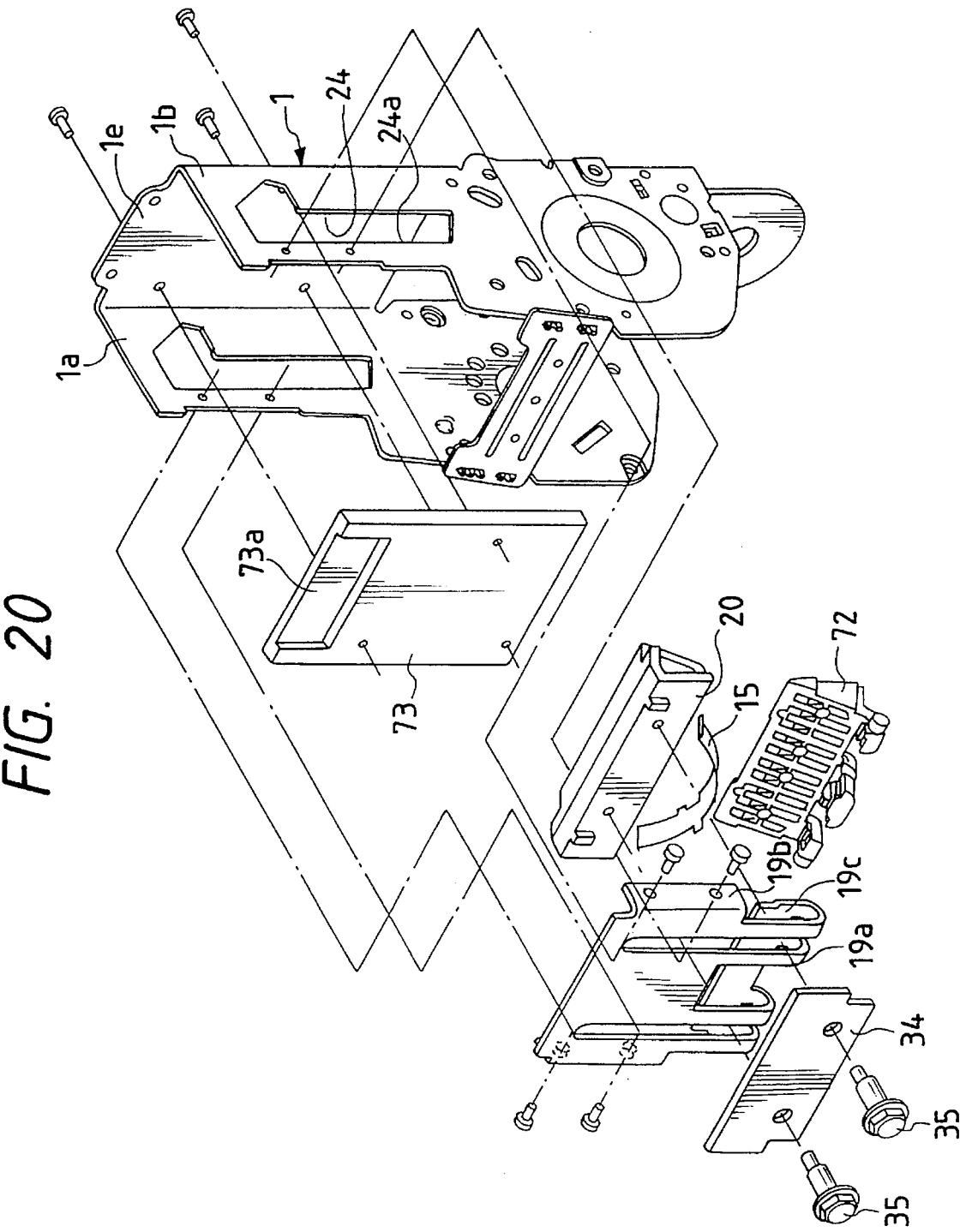
FIG. 20 is an exploded perspective view showing an overall construction of the retractor with the clamping mechanism as shown in FIG. 19.
Figure 21:
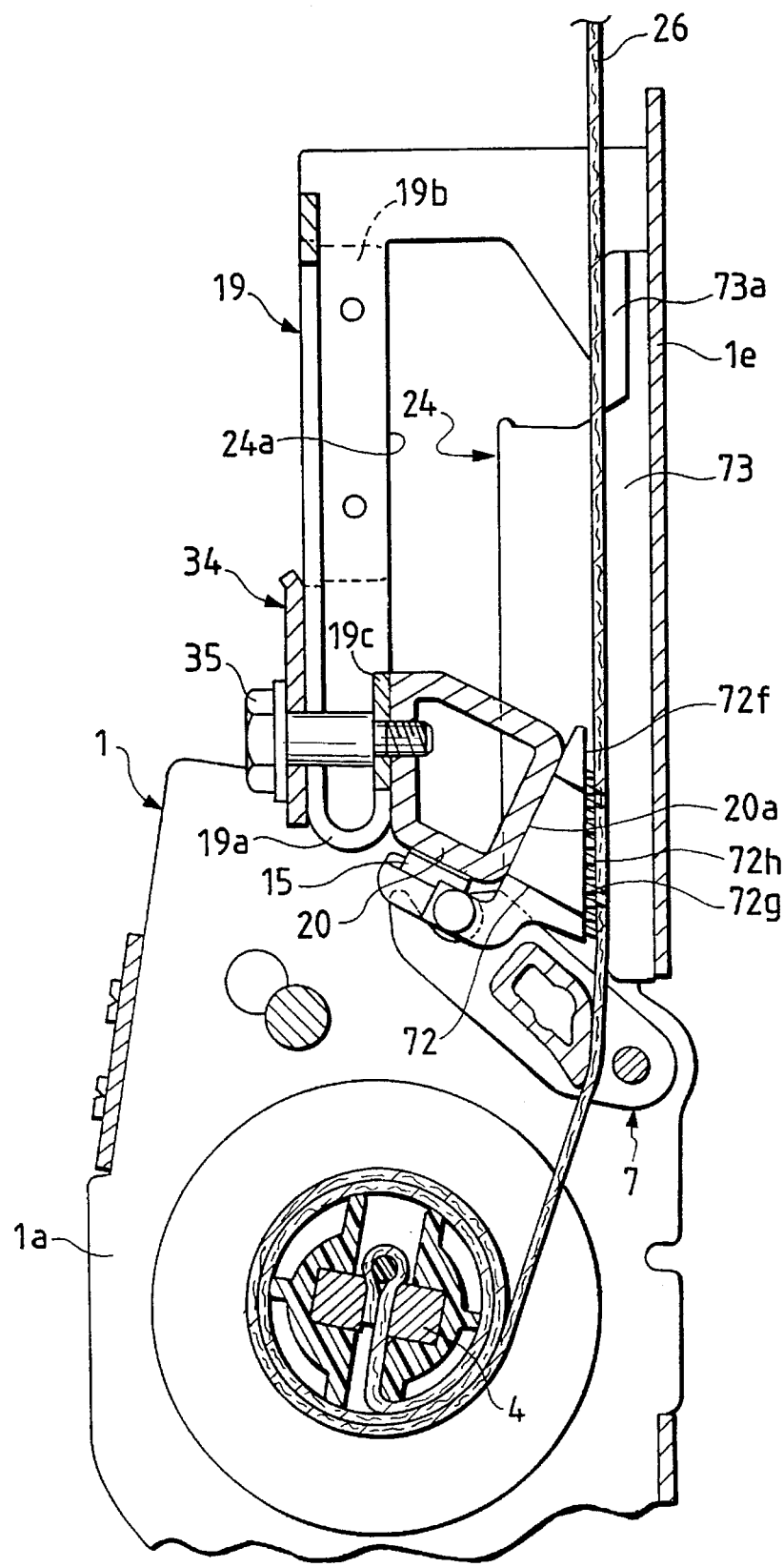
FIG. 21 is a longitudinal sectional view showing the retractor with the clamping mechanism as shown in FIG. 19, for showing a holding state of a webbing by the clamping mechanism.
Figure 22:
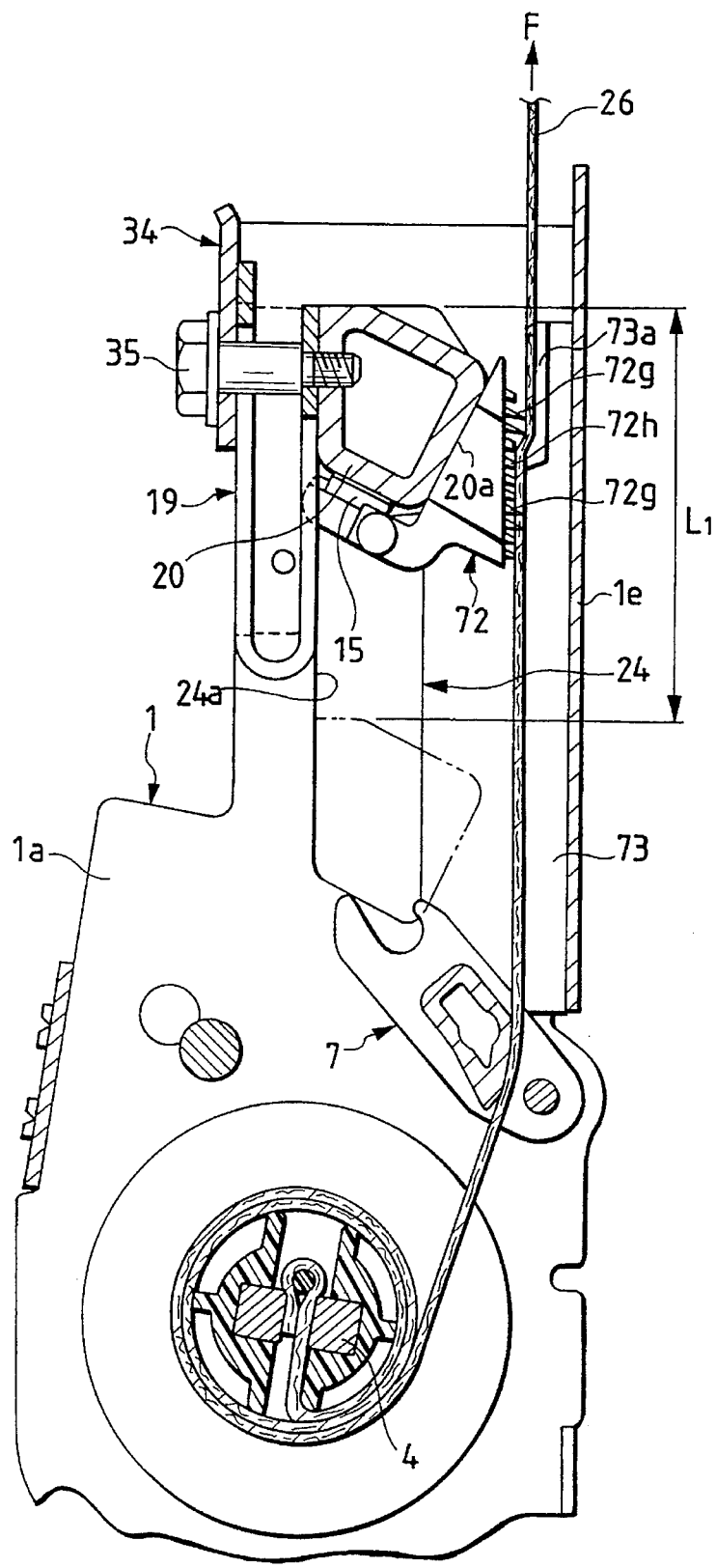
FIG. 22 is a longitudinal sectional view showing the retractor with the clamping mechanism as shown in FIG. 19, for showing a state that the webbing is released from its holding state.

FIGS. 19 to 22 show a fifth embodiment of a retractor with a clamping mechanism according to the present invention. Of those figures, FIG. 19 is a longitudinal sectional view showing a retractor with a clamping mechanism according to a fifth embodiment of the present invention. FIG. 20 is an exploded perspective view showing an overall construction of the retractor with the clamping mechanism as shown in FIG. 19. FIG. 21 is a longitudinal sectional view showing the retractor with the clamping mechanism as shown in FIG. 19, the illustration showing a state that the webbing is held by the clamping mechanism. FIG. 22 is a longitudinal sectional view showing the retractor with the clamping mechanism as shown in FIG. 19, the illustration showing a state that the webbing is released from its holding state. Brief description will be given of the same or equivalent components, parts, and members as those in the above-mentioned embodiments.

A clamping mechanism of a retractor according to a fifth embodiment of the present invention is different from that of the first embodiment in the structure of a clamp member 72 including first clamp teeth 72g and second clamp teeth 72h, and the structure of a lower plate 73 with a recess 73a. The first clamp teeth 72g and the second clamp teeth 72h are arrayed on a webbing opposing surface 72f of the clamp member 72, which is to be pressed against the webbing 26, as in the fourth embodiment. The recess 73a for receiving the webbing 26 is formed in the surface of the front portion of the lower plate 73, which is fixed to a predetermined location on the base back plate 1e of the retractor base 1.

The shape, dimension, and material of the plastically deforming portion 19a of the upper stay 19 are selected such that the plastically deforming portion 19a is deformed by a tensile force acting on the webbing when a tension F acting on the webbing 26 increases, and the load acting on the upper plate fixing portion 19c of the upper stay 19 through the clamp member 72 and the upper plate 20 reaches the second specific value F2.

In the retractor with the clamping mechanism according to the fifth embodiment, in a normal mode of the vehicle travel where an abrupt deceleration caused by a vehicle collision, for example, is not generated, as shown in FIG. 19, the clamp member 72 is kept apart from the webbing 26 by the return spring 15.

In an emergency mode of the vehicle travel where an abrupt deceleration is generated because of a vehicle collision, the clamp lever 7 turns interlocking with the emergency locking mechanism, which prevents the rotation of the bobbin. With the turn, the clamp lever 7 pushes the clamp member 72 along the slide surface 20a of the upper plate 20. The first clamp teeth 72g and the second clamp teeth 72h of the clamp member 72 are pressed against the webbing 26, thereby preventing the draw-out of the webbing 26 resulting from the tightening of the webbing (FIG. 21).

In the clamping state following the preventing of the webbing draw-out, a tension exceeding a predetermined value acts on the webbing 26 and the load acting on the upper stay 19 reaches the second specific value F2. At this time, the clamp member 72 moves the upper plate fixing portion 19c and the upper plate 20 upward in the retractor while keeping the holding force. A bending force acting on the plastically deforming portion 19a of the upper stay 19 also exceeds a predetermined value. Accordingly, the upper plate 20 bends (plastically deforms) the plastically deforming portion 19a, with the movement of the clamp member 72 in the webbing draw-out direction. The result is to allow the upper plate fixing portion 19c to move in the webbing draw-out direction (FIG. 22).

The movement of the upper plate fixing portion 19c in the webbing draw-out direction brings about the movement of the upper plate 20 and the clamp member 72 in the webbing draw-out direction. This results in an extension (draw-out) of the webbing 26. Kinetic energy acting on the webbing 26 is absorbed by the plastically deforming portion 19a of the upper stay 19, by an energy amount corresponding to an the amount of the extension. As a consequence, a shock the occupant receives from the webbing is alleviated correspondingly.

As shown in FIG. 22, when the plastic deformation of the upper stay 19 terminates (when the upper plate 20 has moved distance $L_1$ in FIG. 22), the first clamp teeth 72g arrayed on the front portion of the webbing opposing surface 72f of the clamp member 72 disengage from the webbing 26 since the webbing is put in the recess 73a of the lower plate 73, as in the fourth embodiment. By the subsequent increase of the tensile force acting on the webbing, the load acting on the first clamp teeth 72g reaches the first specific value F1. At this time, only the first clamp teeth 72g arrayed on the rear portion on the webbing opposing surface 72f of the clamp member 72 which engages the webbing 26, are sheared or deformed, to thereby reduce the tension acting on the webbing and absorb the kinetic energy acting on the webbing.

Thus, with the upper stay 19 designed so as to be plastically deformed by the second specific value F2, the tension acting on the webbing 26 varies as indicated by a solid line in FIG. 38. The effects comparable with those of the fourth embodiment can be obtained also in the fifth embodiment.

Figure 23:
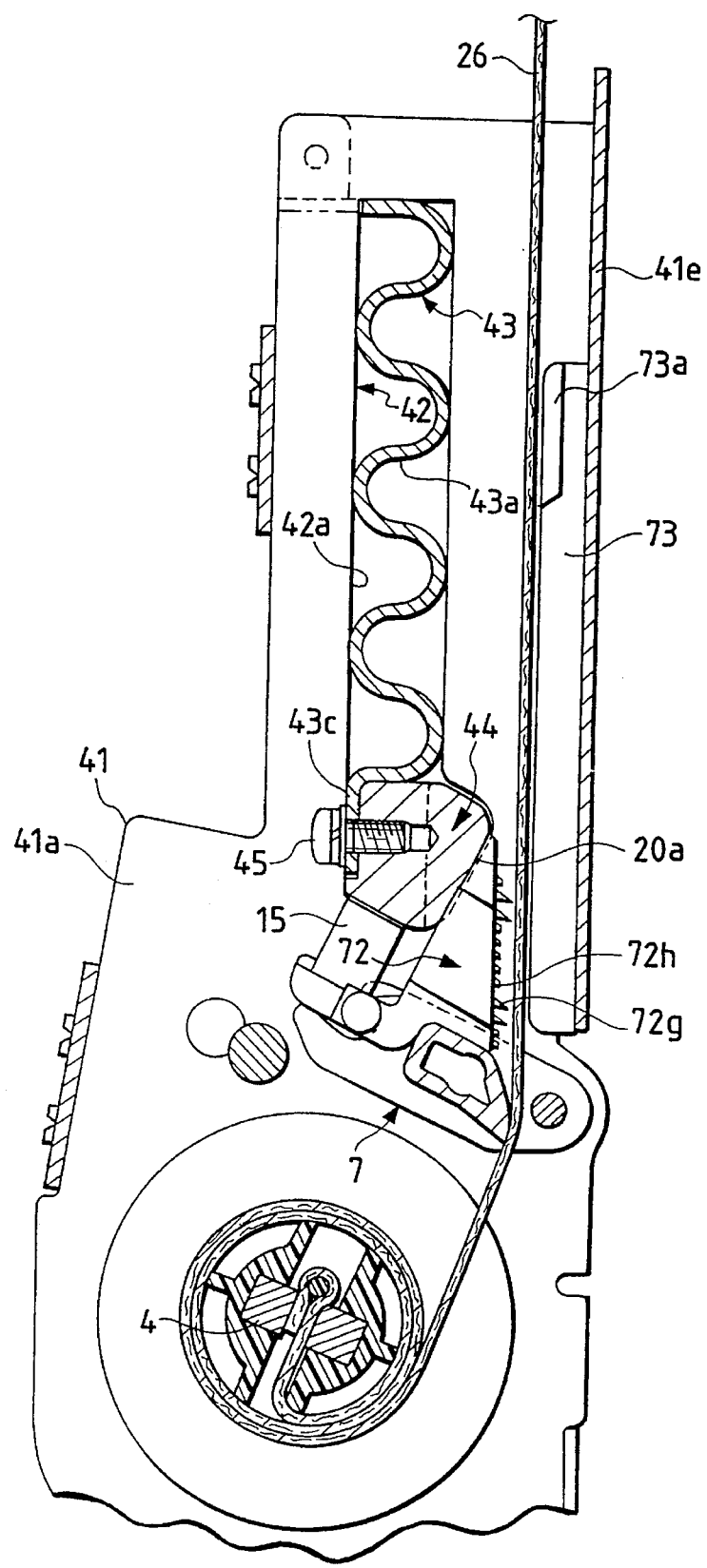
FIG. 23 is a longitudinal sectional view showing a main portion of a retractor with a clamping mechanism according to a sixth embodiment of the present invention.
Figure 24:
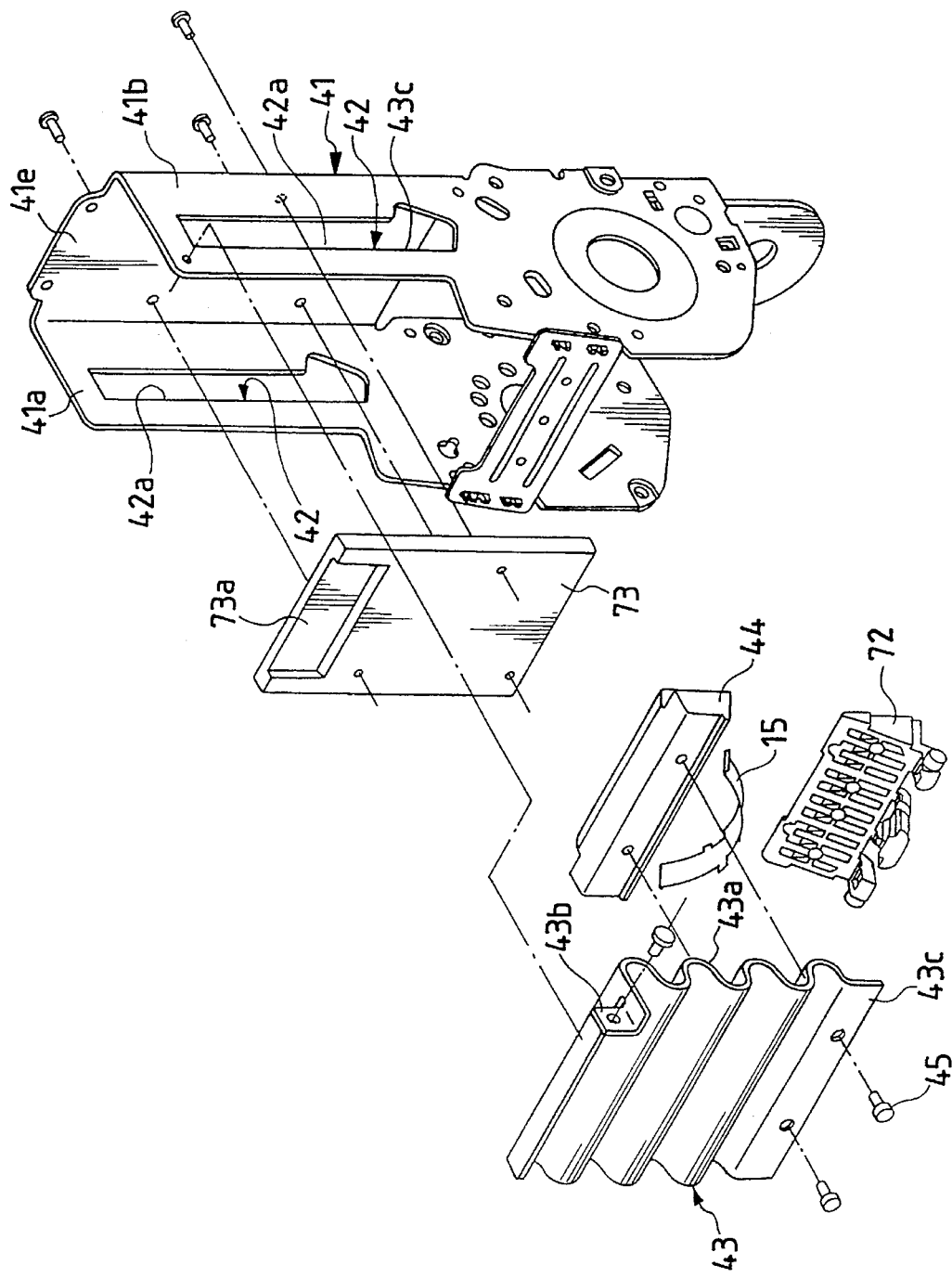
FIG. 24 is an exploded perspective view showing an overall construction of the retractor with the clamping mechanism as shown in FIG. 23.
Figure 25:
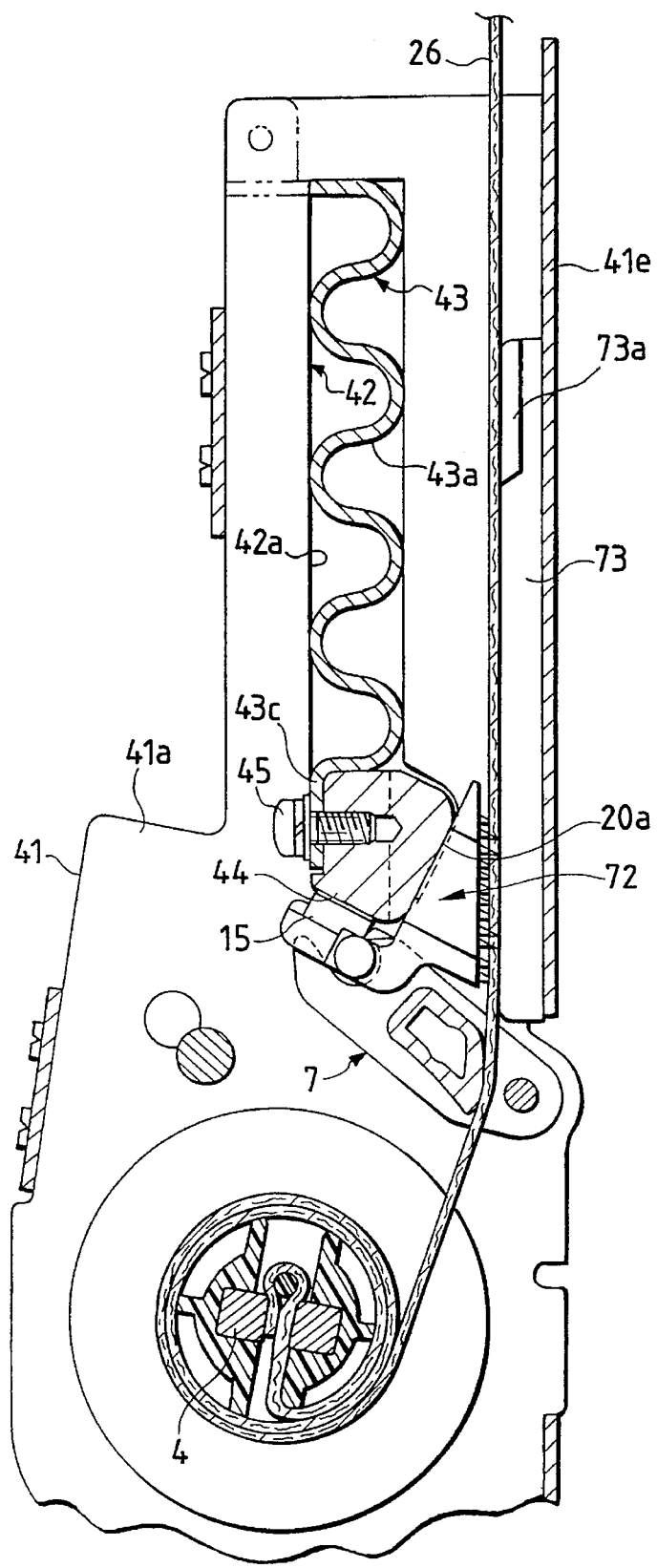
FIG. 25 is a longitudinal sectional view showing the retractor with the clamping mechanism as shown in FIG. 23, the illustration showing a holding state of a webbing by the clamping mechanism.
Figure 26:
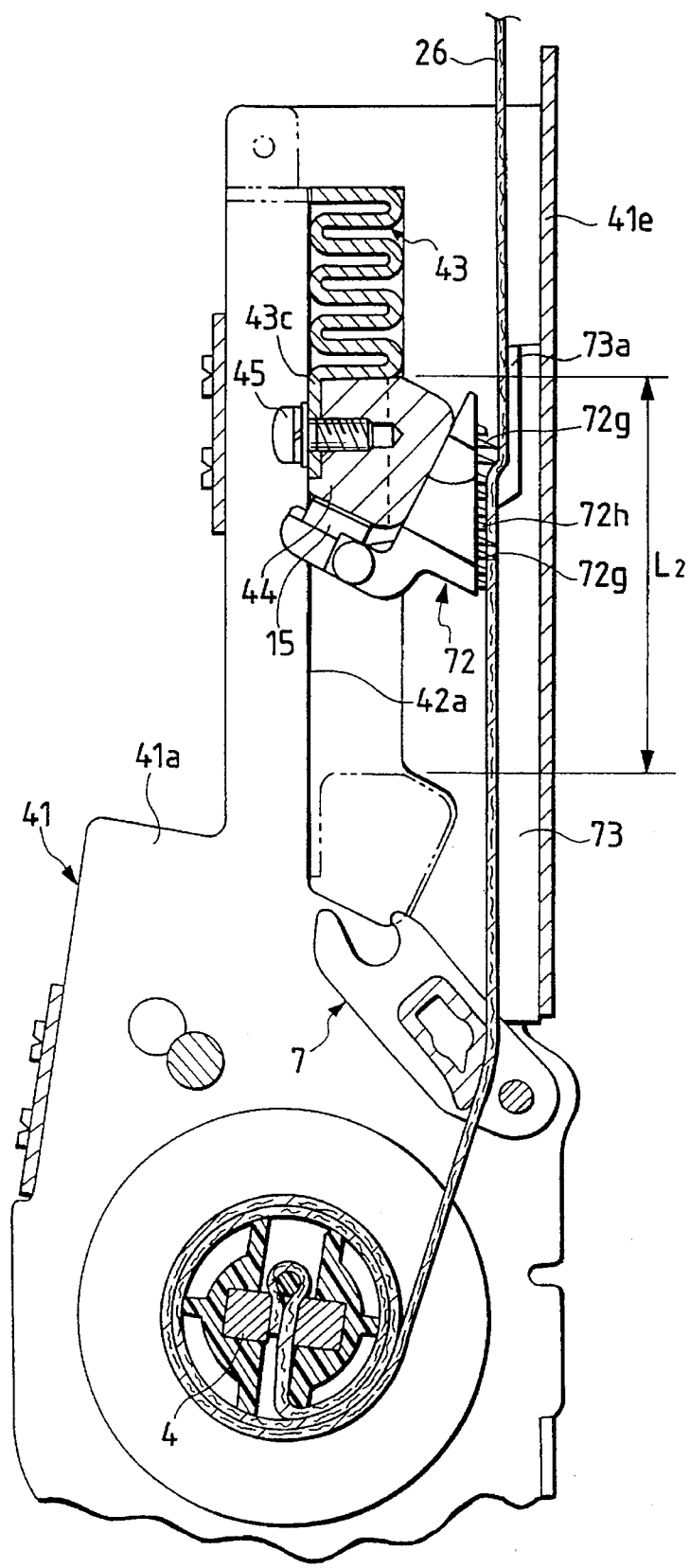
FIG. 26 is a longitudinal sectional view showing the retractor with the clamping mechanism as shown in FIG. 23, for showing a state that the webbing is released from its holding state.

FIGS. 23 to 26 show a sixth embodiment of a retractor with a clamping mechanism according to the present invention. Of those figures, FIG. 23 is a longitudinal sectional view showing a retractor with a clamping mechanism according to a sixth embodiment of the present invention. FIG. 24 is an exploded perspective view showing an overall construction of the retractor with the clamping mechanism as shown in FIG. 23. FIG. 25 is a longitudinal sectional view showing the retractor with the clamping mechanism as shown in FIG. 23, the illustration showing a state that the webbing is held by a clamping mechanism. FIG. 26 is a longitudinal sectional view showing the retractor with the clamping mechanism as shown in FIG. 23, the illustration showing a state that the webbing is released from its holding state. In the sixth embodiment, the clamp member 6 and the lower plate 16 in the clamping mechanism in the second embodiment are replaced with the clamp member 72 and the lower plate 73 in the fifth embodiment.

In the retractor with the clamping mechanism according to the sixth embodiment, in a normal mode of the vehicle travel where an abrupt deceleration caused by a vehicle collision, for example, is not generated, as shown in FIG. 23, the clamp member 72 is kept apart from the webbing 26 by the return spring 15.

In an emergency mode of the vehicle travel where an abrupt deceleration is generated because of a vehicle collision, the clamp lever 7 turns interlocking with the emergency locking mechanism, which prevents the rotation of the bobbin 4. While turning, the clamp lever 7 pushes the clamp member 72 along the slide surface 20a of the upper plate 44. The first clamp teeth 72g and the second clamp teeth 72h of the clamp member 72 are pressed against the webbing 26, thereby preventing the draw-out of the webbing 26 resulting from the tightening of the webbing (FIG. 25).

In the clamping state following the preventing of the webbing draw-out, a tension exceeding a predetermined value acts on the webbing 26 and the load acting on the upper plate fixing portion 43c through the clamp member 72 and the upper plate 44 reaches the second specific value F2. At this time, the clamp member 72 moves the upper plate fixing portion 43c and the upper plate 44 upward in the retractor while keeping the holding force. Since a compressing force acting on the plastically deforming portion 43a of the upper stay 43 also exceeds a predetermined value, the upper plate 44 moves with the movement of the clamp member 72 in the webbing draw-out direction. Accordingly, the corrugated plastically deforming portion 43a of the upper stay 43 is deformed or compressed in the webbing draw-out direction, thereby allowing the upper plate fixing portion 43c to move in the webbing draw-out direction. When the upper plate fixing portion 43c is compressed to the maximum, the upper plate fixing portion 43c is moved a distance $L_2$ in the webbing draw-out direction (FIG. 26).

The movement of the upper plate fixing portion 43c in the webbing draw-out direction brings about the movement of the upper plate 44 and the clamp member 72 in the webbing draw-out direction. This results in an extension (draw-out) of the webbing 26. Kinetic energy acting on the webbing 26 is absorbed by the upper stay 43, by an energy amount corresponding to the amount of the extension. As a consequence, a shock the occupant receives from the webbing is reduced correspondingly.

With the upper stay 43 thus constructed, the useful effects comparable with those of the fifth embodiment can be obtained.

Figure 27:
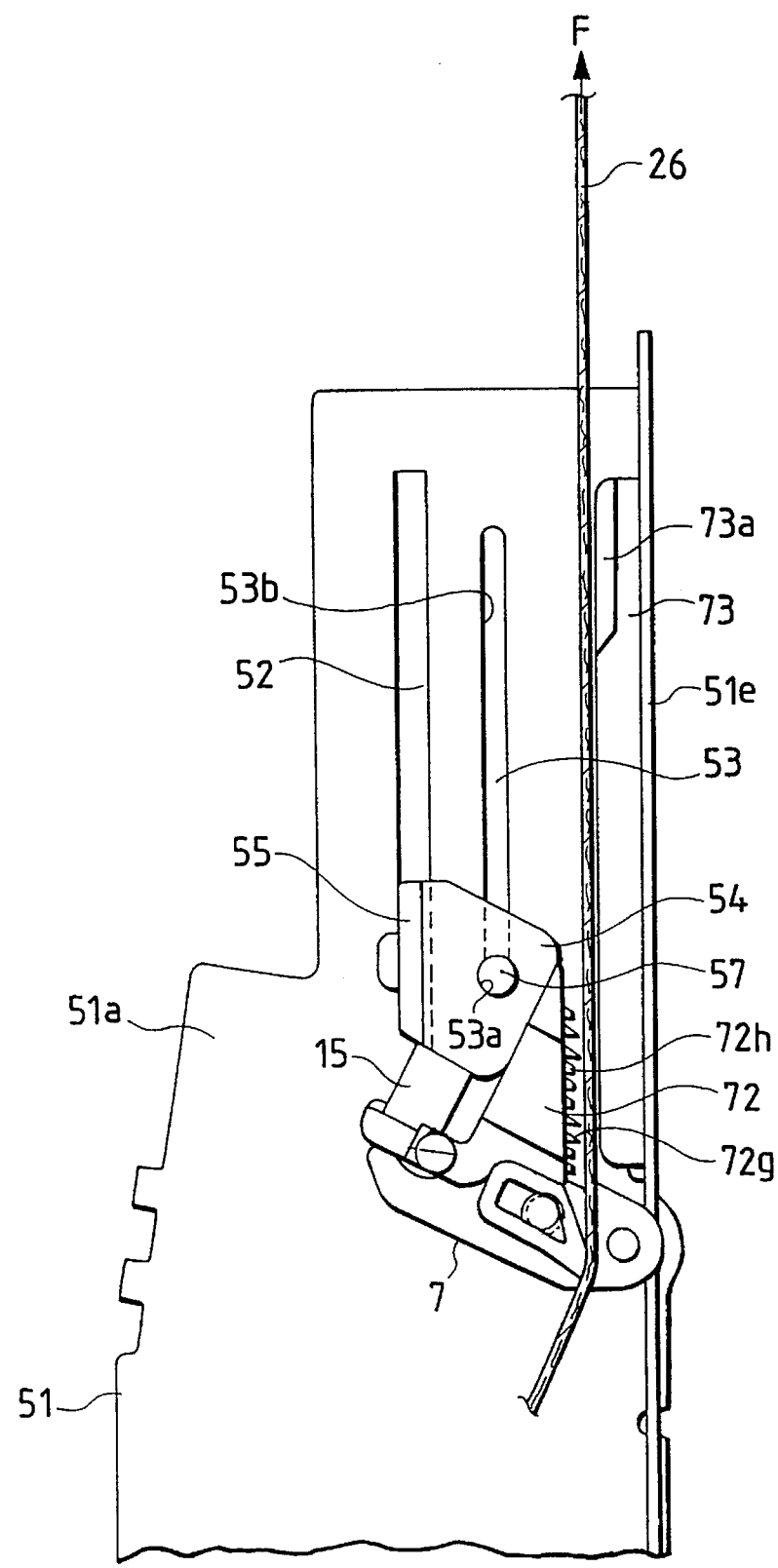
FIG. 27 is a longitudinal sectional view showing a main portion of a retractor with a clamping mechanism according to a seventh embodiment of the present invention.
Figure 28:
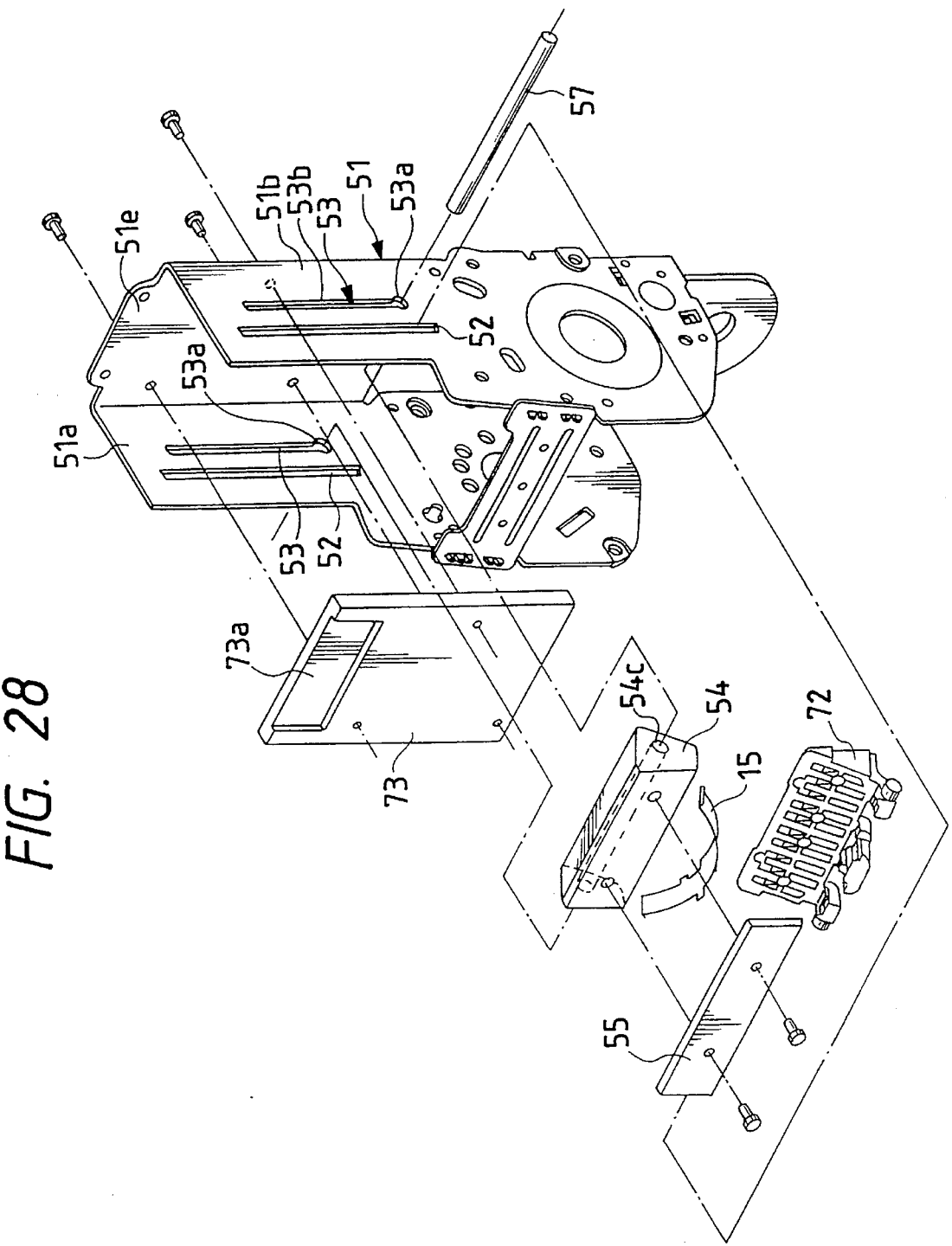
FIG. 28 is an exploded perspective view showing an overall construction of the retractor with the clamping mechanism as shown in FIG. 27.
Figure 29:
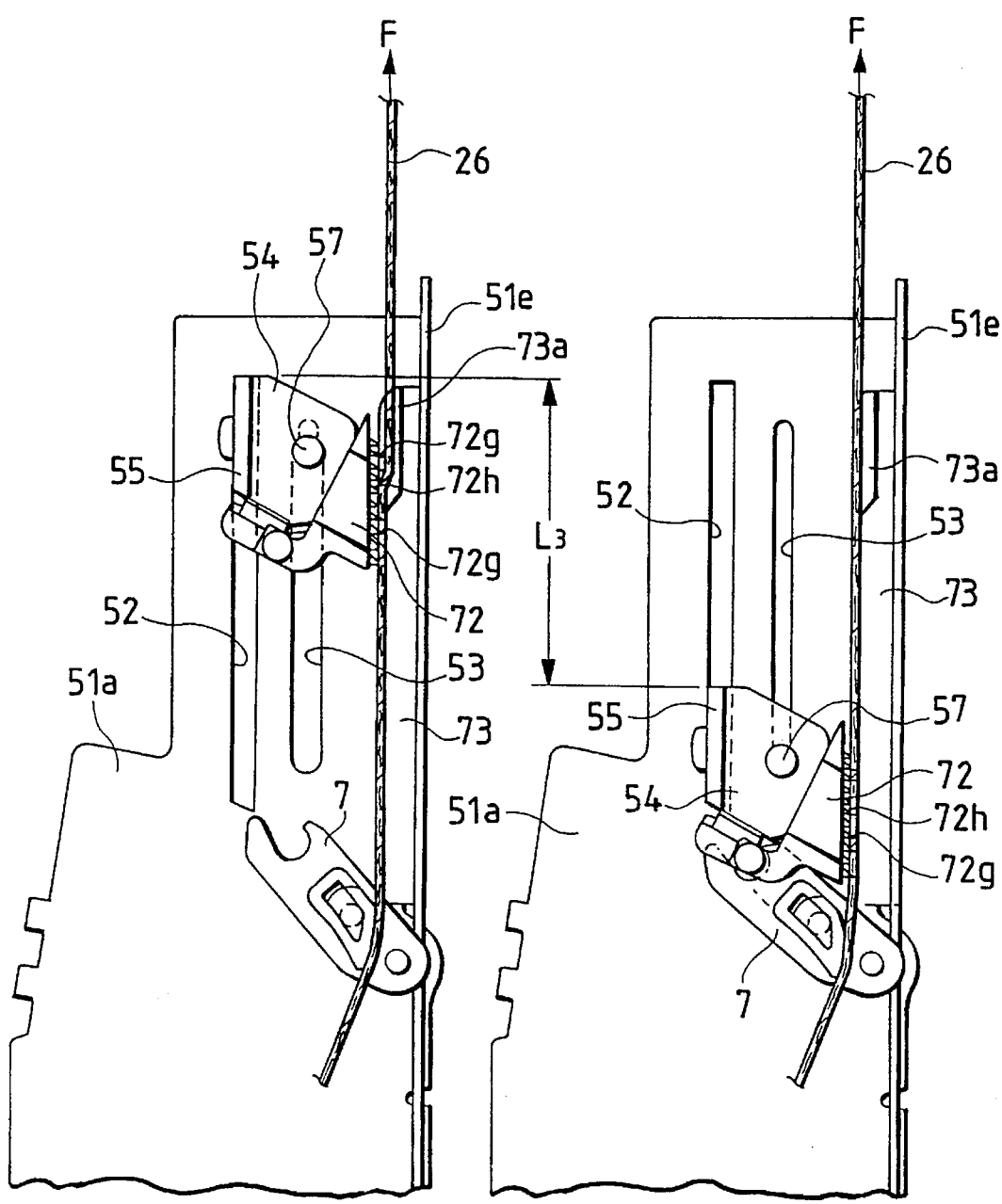
FIG. 29 is a longitudinal sectional view showing the retractor with the clamping mechanism as shown in FIG. 27, for showing the holding state that the webbing is stuck into the recess and part of the first clamp teeth of the clamp member disengage from the webbing.

FIGS. 27 to 29 show a seventh embodiment of a retractor with a clamping mechanism according to the present invention. Of those figures, FIG. 27 is a longitudinal sectional view showing a retractor with a clamping mechanism according to a seventh embodiment of the present invention. FIG. 28 is an exploded perspective view showing an overall construction of the retractor with the clamping mechanism as shown in FIG. 27. FIG. 29A is a longitudinal sectional view showing the retractor with the clamping mechanism as shown in FIG. 27, the illustration showing a holding state of the webbing with first and second clamp teeth of a clamping mechanism. FIG. 29B is a longitudinal sectional view showing the retractor with the clamping mechanism as shown in FIG. 27, the illustration showing a state that the webbing is stuck into the recess and part of the first clamp teeth of the clamp member disengage from the webbing.

In the seventh embodiment, the base side plates 51a and 51b of the retractor base 51, similar to those in the third embodiment, are used for the member which is deformed by the second specific value F2 applied thereto, to thereby allow the clamp member 72 to move in the webbing draw-out direction. The lower plate 73 and the clamp member 72 are similar to those in the sixth embodiment.

In the retractor with the clamping mechanism according to the seventh embodiment, in a normal mode of the vehicle travel where an abrupt deceleration caused by a vehicle collision, for example, is not generated, as shown in FIG. 27, the clamp member 72 is kept apart from the webbing 26 by the return spring 15.

In an emergent mode of the vehicle travel where an abrupt deceleration is generated because of a vehicle collision, the clamp lever 7 turns interlocking with the emergency locking mechanism, which prevents the rotation of the bobbin. With the turn, the clamp lever 7 pushes the clamp member 72 along the slide surface of the upper plate 54. The first clamp teeth 72g and the second clamp teeth 72h of the clamp member 72 are pressed against the webbing 26, thereby preventing the draw-out of the webbing 26 resulting from the tightening of the webbing (FIG. 29).

In the clamping state following the preventing of the webbing draw-out, a tension exceeding a predetermined value acts on the webbing 26 and the load acting on the through pin 57 through the clamp member 72 and the upper plate 54 reaches the second specific value F2. At this time, the clamp member 72 moves the through pin 57 and the upper plate 54 simultaneously to the upper portion of the retractor, while keeping the holding force. A pushing force acting on the lower end of the slit 53 also exceeds a predetermined value. Accordingly, with the movement of the clamp member 72 in the webbing draw-out direction, the upper plate 54 widens the slit 53 wide, i.e., it deforms the circumferential edge of the slit 53, to thereby allow the clamp member 72, the upper plate 54, and the like to be moved in unison in the webbing draw-out direction as shown in FIG. 29B. Finally, as shown in FIG. 29, the clamp member 72 moves a distance $L_3$ depending on the length of the lower plate 73, in the webbing draw-out direction. At this time, the deformation of the circumferential edge of the slit 53 absorbs the kinetic energy acting on the webbing 26.

As shown in FIG. 29B, when the plastic deformation of the circumferential edge of the slit 53 terminates, the first clamp teeth 72g arrayed on the front portion of the webbing opposing surface 72f of the clamp member 72 disengage from the webbing 26 since the webbing is in the recess 73a of the lower plate 73. At this time, only the remaining first clamp teeth 72g which engages the webbing 26 are sheared or deformed by the second specific value F2.

The seventh embodiment has substantially the same effects as those of the above-mentioned embodiments.

Figure 30:
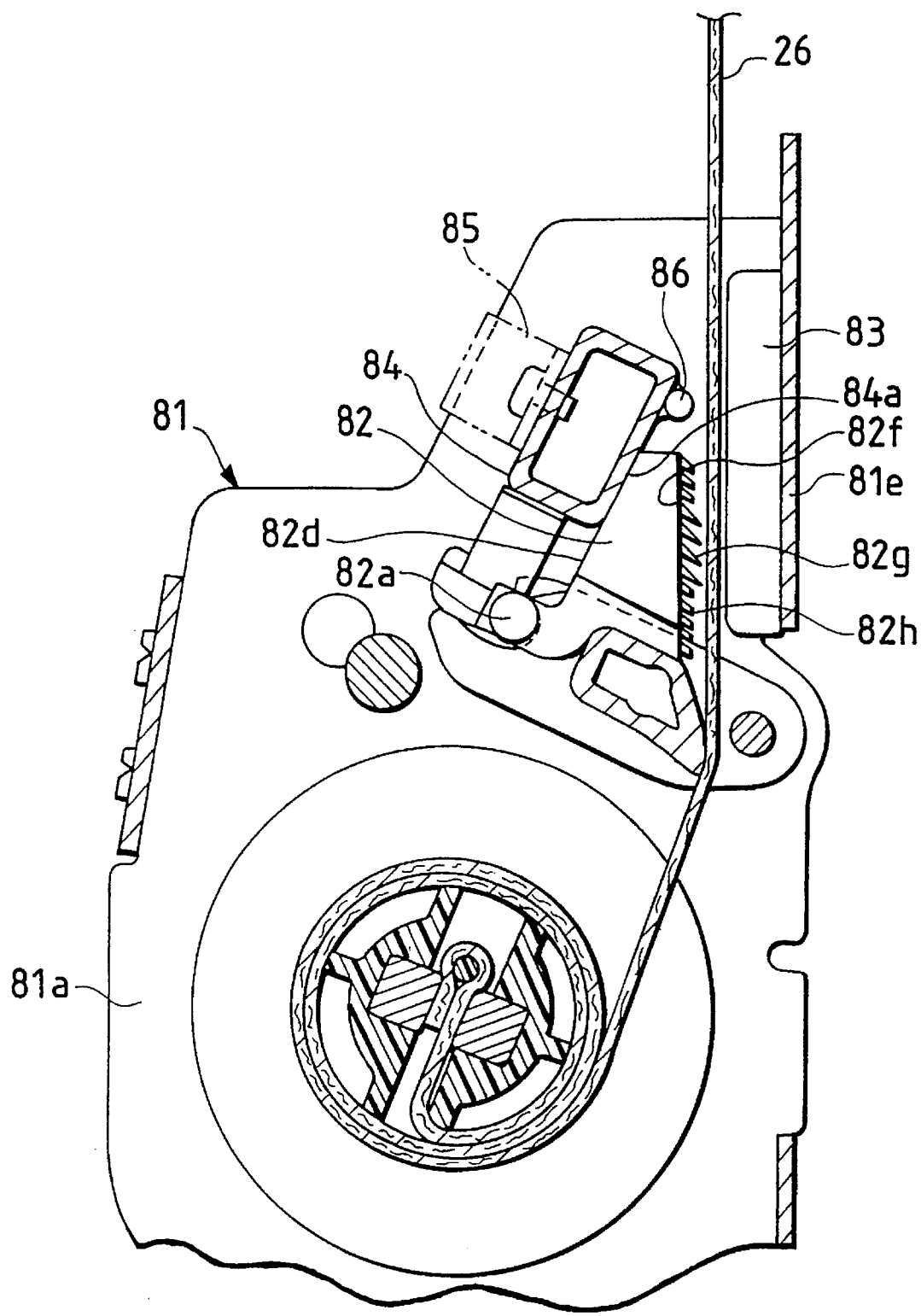
FIG. 30 is a longitudinal sectional view showing a clamping mechanism of a retractor according to an eighth embodiment of the present invention.

FIGS. 30 and 31 show an eighth embodiment of a retractor with a clamping mechanism according to the present invention. Brief description will be given of the same or equivalent components, parts, and members as those in the above-mentioned embodiments. A clamping mechanism of this embodiment, as shown in FIG. 30, is constructed with a lower plate 83 fixed to a predetermined location on a base back plate 81e of a retractor base 81, a clamp member 82 with an array consisting of a number of projections as clamp teeth, which is to be pressed against the webbing 26 to thereby hold the webbing, an upper plate 84 as a guide member for guiding the clamp member 82, and an upper stay 85 fixed to the side walls 81a and 82b of the retractor base 81.

The clamp member 82 includes a webbing opposing surface 82f with the clamp teeth formed thereon which are to be pressed against the webbing 26, a flat portion 82d which is to slide on the guide surface of the upper plate 84, and pivots 82a formed on the rear end of the clamp member 82. The pivots 82a are rotatably supported by the clamp lever. The clamp member 82 is wedge-shaped in cross section in which the webbing opposing surface 82f and the flat portion 82d meets in a sharply acute angle. The clamp teeth formed on the webbing opposing surface 82f include first clamp teeth 82g with sharpened ends and second clamp teeth 82h with flat ends. As shown in FIG. 31B, the sharpened ends of the first clamp teeth 82g are stuck into the webbing 26, to thereby prevent the draw-out of the webbing 26. The flat ends of the second clamp teeth 82h are pressed against the surface of the webbing 26, and cooperate with the lower plate 83 to prevent the draw-out of the webbing 26. The strength of the first clamp teeth 82g are selected such that in a state that the webbing is held by the clamp member 82, a tension acting the webbing 26 exceeds a predetermined value, the sharpened ends of the first clamp teeth 82g stuck into the webbing 26 are sheared or deformed, to thereby release the webbing from being fixed by the sharpened ends or tips of the first clamp teeth 82g.

The upper plate 84, as shown in FIG. 30, is a tubular member that is rectangular in cross section. The upper plate 84 is supported by the upper stay 85 in a state that the flat slide surface 84a of the upper plate 84 is inclined to the surface of the lower plate 83. The flat slide surface 84a of the upper plate 84 serves as a guide surface for moving the clamp member 82 to and from the webbing 26.

A stopper 86 is formed on the front end of the flat slide surface 84a of the upper plate 84. When the sharpened ends of the first clamp teeth 82g reach a predetermined depth of the webbing, the stopper 86 stops the movement of the clamp member 82 toward the webbing 26. The stopper 86 is a cylindrical shaft member welded on the flat slide surface 84a in the direction crossing the webbing. A depth (the predetermined depth) of the sharpened ends of the first clamp teeth 82g in the webbing, which determines the timing at which the stopper 86 is brought into contact with the clamp member 82, indicates an initial holding state. In this state, the sharpened ends of the first clamp teeth 82g exhibit a preventing force large enough to prevent the movement of the webbing 26 in the webbing draw-out direction, and the clamp member 82 is pressed against the webbing 26 to such an extent that the pushing force by the flat surfaces of the tips of the second clamp teeth 82h effectively prevent the draw-out of the webbing. At the predetermined depth, an increase of the tension acting on the webbing after it is held does not further increase the holding force of the clamp member 82.

The operation of the clamping mechanism of the retractor constructed as shown in FIG. 30 will be described.

Figure 31A:
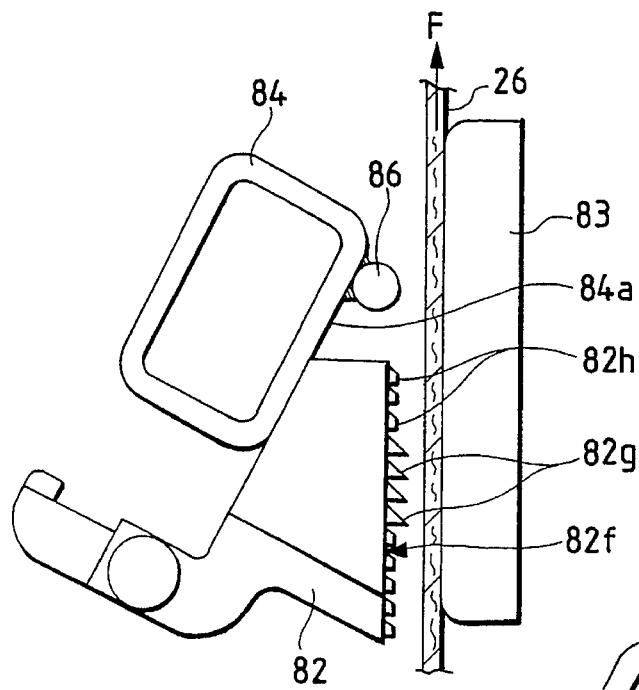
FIG. 31A is a sectional view showing the clamping mechanism in a normal mode of the vehicle.
Figure 31B:
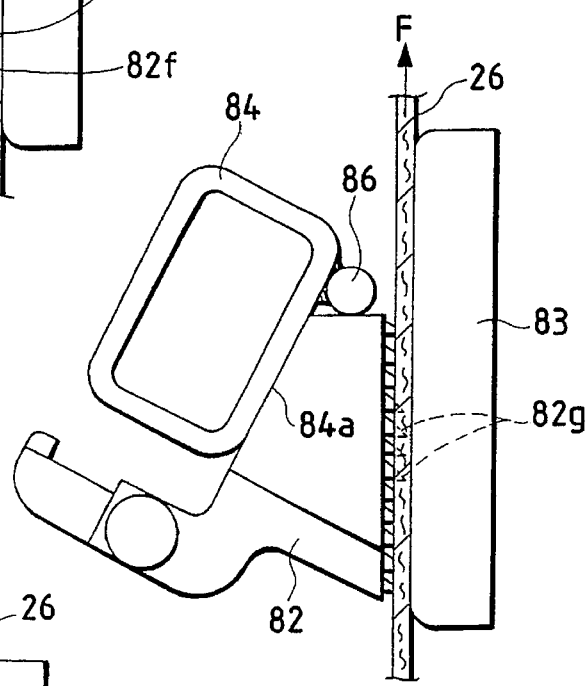
FIG. 31B is a sectional view showing the clamping mechanism when it is operated to hold the webbing.

In a normal mode of the vehicle travel where an abrupt deceleration caused by a vehicle collision, for example, is not generated, as shown in FIG. 31A, the clamp member 82 is kept apart from the webbing 26. In this state, the webbing 26 can freely be drawn out from the bobbin. In an emergent mode of the vehicle travel where an abrupt deceleration is generated because of a vehicle collision, the emergency locking mechanism senses it and operates, and the clamping mechanism operates interlocking with the emergency locking mechanism. The first clamp teeth 82g and the second clamp teeth 82h of the clamp member 82, as shown in FIG. 31b, are pressed against the webbing 26, thereby holding the webbing 26 with them.

When the clamping mechanism operates to hold the webbing, the movement of the clamp member 82 toward the webbing 26 is stopped at a predetermined position by the stopper 86 fixed to the underside of the clamp member 82.

Figure 31C:
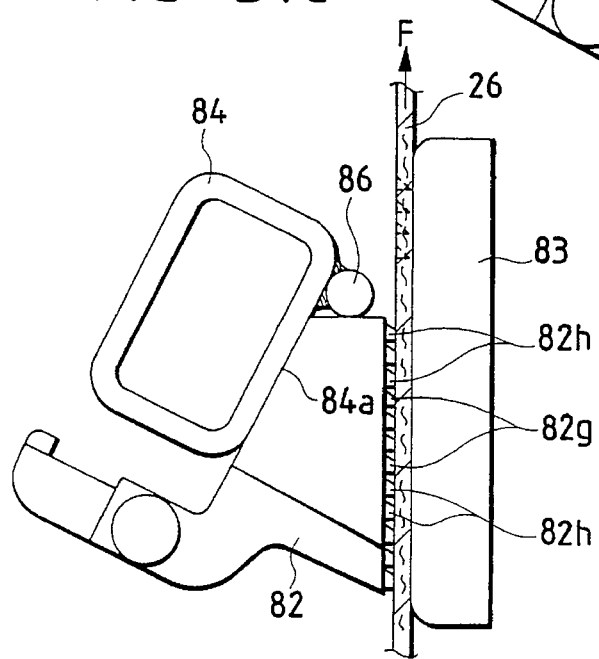
FIG. 31C is a sectional view showing the clamping mechanism when the tip portions of the clamp teeth stuck into the webbing are sheared or deformed.

When the clamping mechanism operates to prevent the draw-out of the webbing 26, the tension acting on the webbing 26 gradually increases by an inertial acting on the occupant held by the webbing. With increase of the tension, a shearing force acting on the first clamp teeth 82g reaches its strength limit. Then, as shown in FIG. 31C, the sharpened ends of the first clamp teeth 82g that are stuck into the webbing 26 are sheared or deformed. The holding force by the clamping mechanism is reduced. As a result, the webbing 26 is tightened. At this time, the holding by the clamping mechanism is removed. The shearing of the sharpened ends of the first clamp teeth 82g and the draw-out of the webbing 26 absorb the kinetic energy acting on the webbing 26. A shock the occupant receives from the webbing 26 is lessened.

The movement of the clamp member 82 toward the webbing to stick first clamp teeth 82g into the webbing is controlled by the stopper 86 at a position where the tips of the first clamp teeth 82g that are stuck reach the predetermined depth of the webbing.

If the force acting on the clamp teeth for preventing the draw-out of the webbing includes a reaction force f2 to the pushing force applied to the webbing in addition to the shearing force f1 by the tension to the webbing, the reaction force f2 never increases with the increase of the tension of the webbing, and can be set to an extremely small value as compared with the shearing force f1 by the increasing webbing tension. Therefore, the resultant force f3 which shears or deforms the clamp teeth can be considered to include only the shearing force f1 by the webbing tension.

By previously designing the strength of the first clamp teeth 82g allowing for a tension to remove the holding state, the timing of removing the holding of the webbing by the clamp removing mechanism can be made to exactly correspond to a tensile force acting on the webbing. Therefore, reduction of the maximum tension acting on the seat belt, shock absorption performance, and the like can be obtained as designed independently of shock operating conditions (deceleration conditions) in a vehicle collision.

In the above-mentioned embodiment, the stopper 86 is formed by bonding the shaft member on the upper plate 84. Alternatively, the stopper can be formed by cutting and raising a part of the upper plate 84 or cutting and raising a part of each of the side walls of the retractor base.

Figure 32:
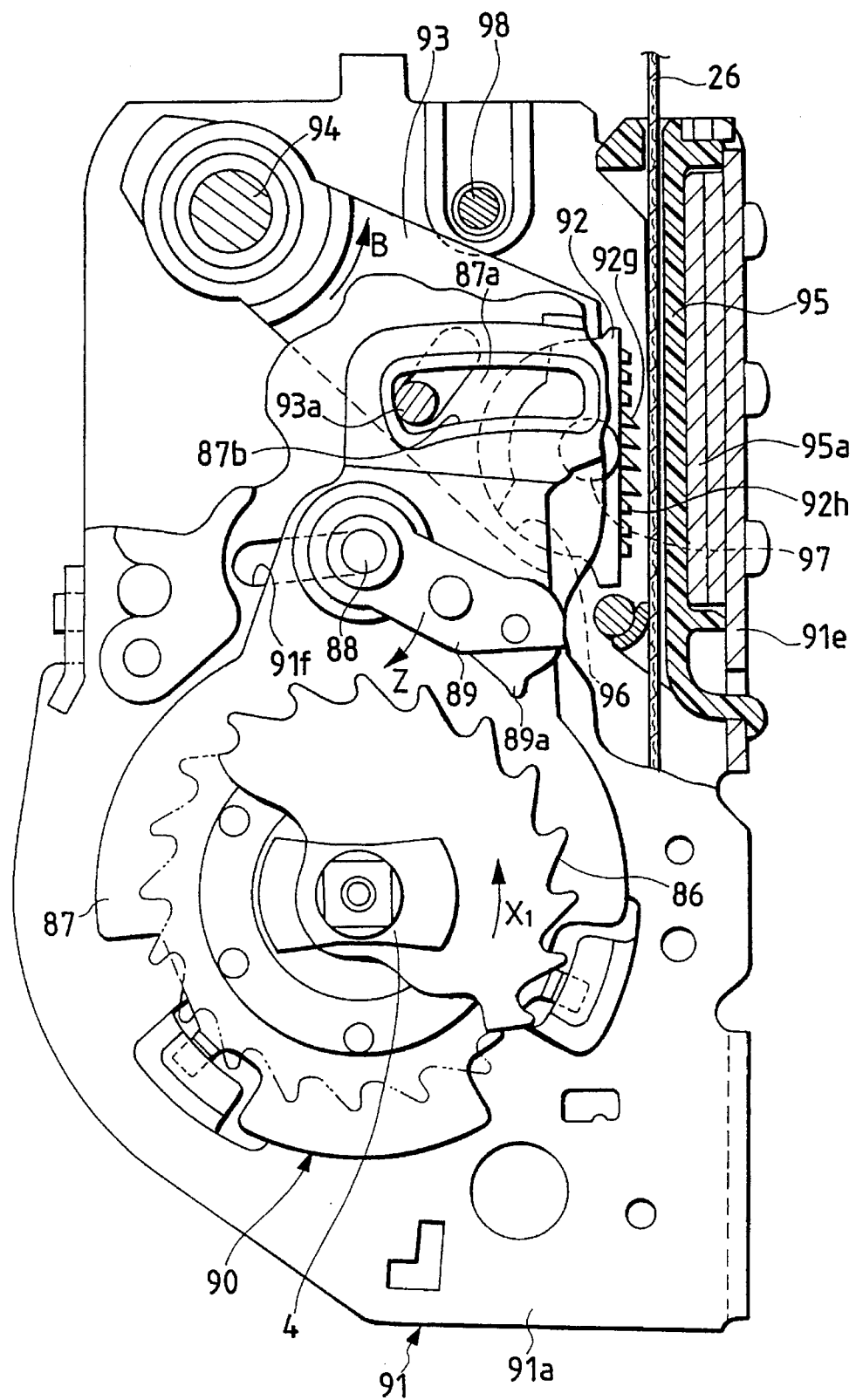
FIG. 32 is a longitudinal sectional view showing a clamping mechanism of a retractor according to a ninth embodiment of the present invention.
Figure 33:
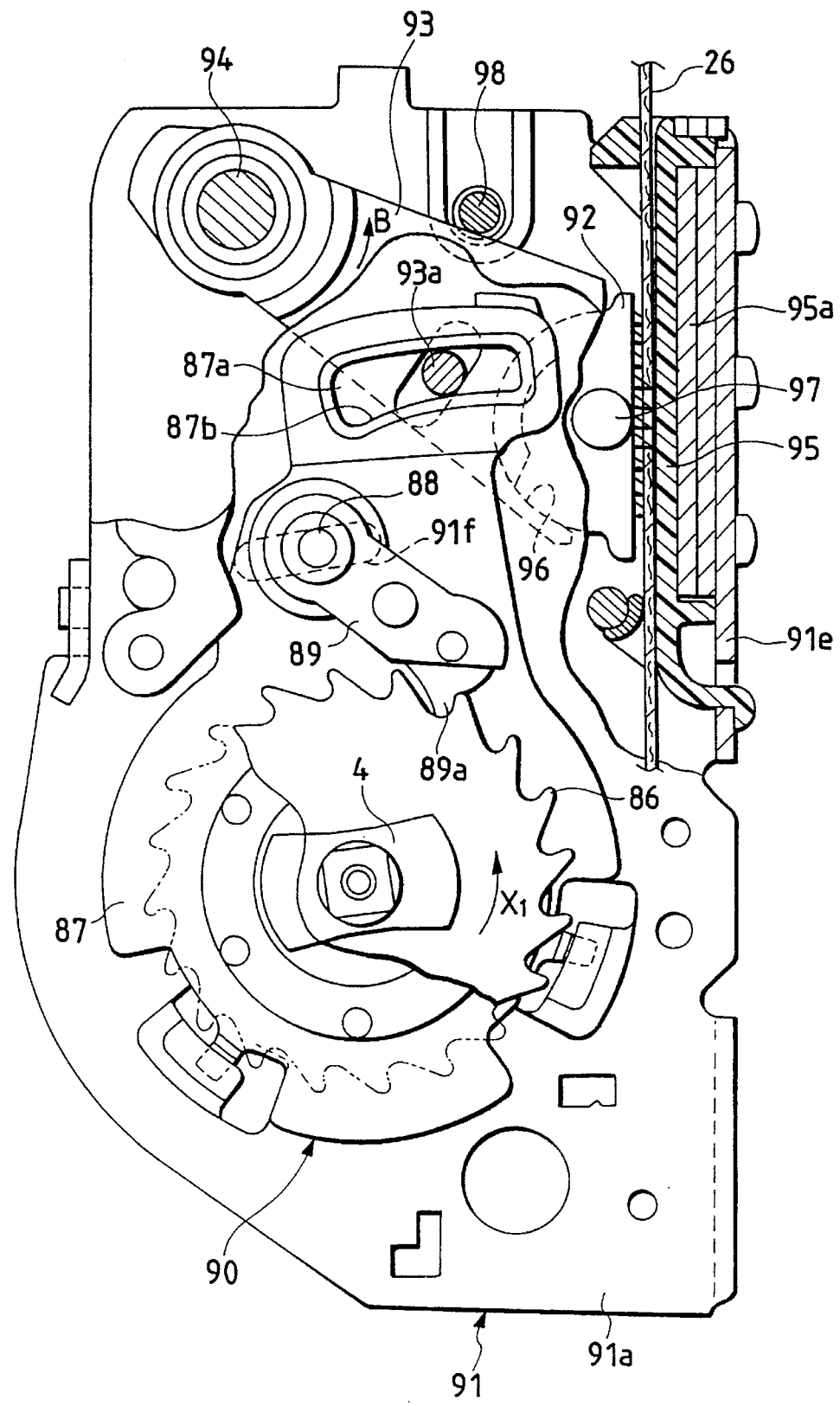
FIG. 33 is a longitudinal sectional view showing the retractor with the clamping mechanism as shown in FIG. 32, for showing a holding state of a webbing by the clamping mechanism.
Figure 34:
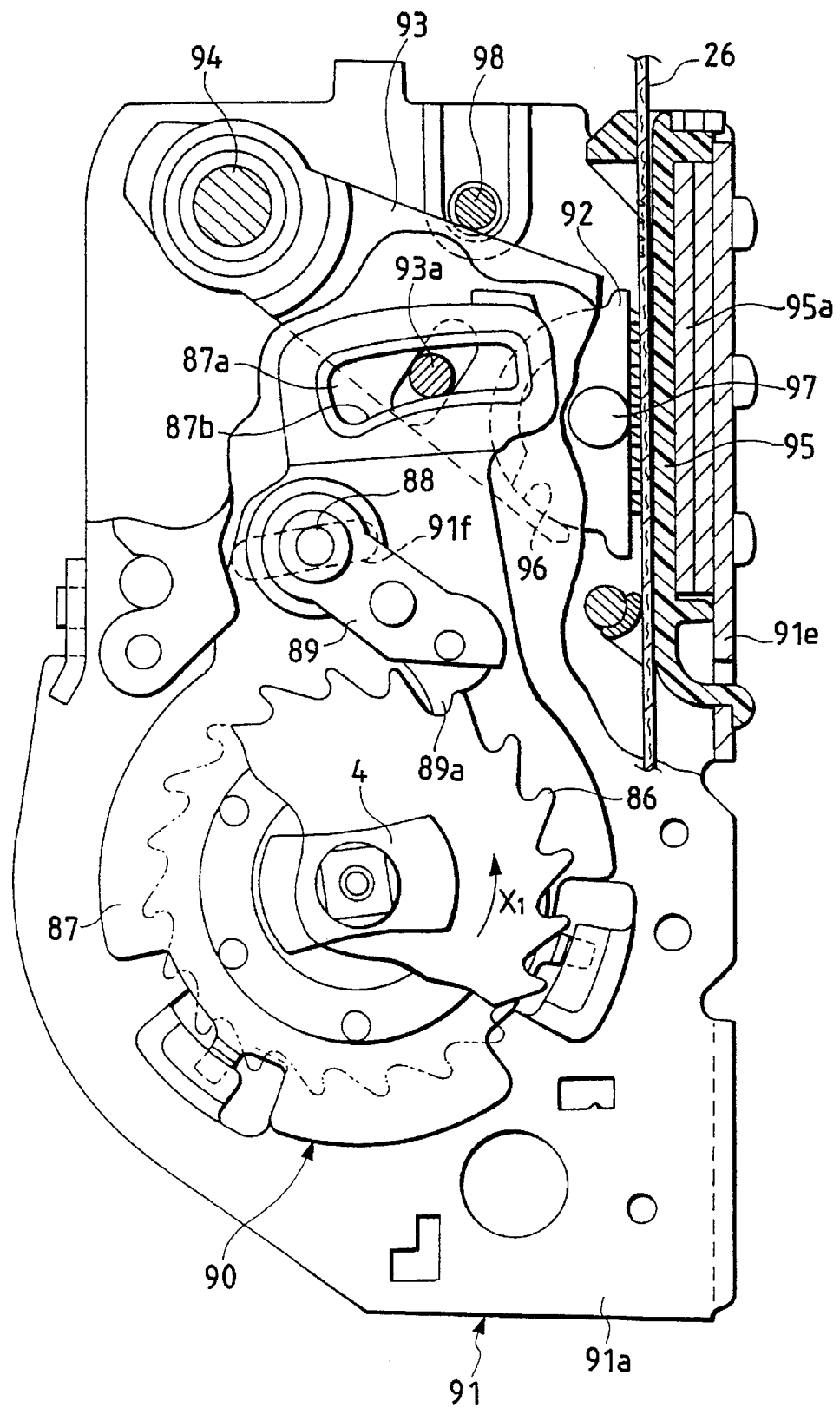
FIG. 34 is a longitudinal sectional view showing the retractor with the clamping mechanism as shown in FIG. 32, for showing a state that the webbing is released from its holding state.

FIGS. 32 through 34 show a ninth embodiment of a retractor with a clamping mechanism according to the present invention. The retractor with the clamping mechanism according to the ninth embodiment is different from that of the above-mentioned embodiments in the structure of the clamping mechanism. The retractor with the clamping mechanism includes a winding shaft 4 with a webbing 26 as a seat belt wound therearound, rotatably supported by a retractor base 91, and a clamping mechanism for preventing the draw-out of the webbing 26 by holding the webbing 26 on a webbing guide 95. The webbing guide 95 guides the webbing 26 that is drawn out of the winding shaft 4, along a base back plate 91e of the retractor base 91.

The webbing guide 95, together with a stay 95a, is fixed to the base back plate 91e by means of screws.

The clamping mechanism is constructed with a clamp shaft 94, a clamp holder 93, and a clamp member 92. The clamp shaft 94 is supported at both ends by a pair of base side plates 91a and 91b of the retractor base 91. The clamp holder 93 is supported swingably about the clamp shaft 94. The clamp member 92 is mounted in the front end of the clamp holder 93. In an emergency, the clamp holder 93 is swung in the direction of an arrow B to press the clamp member 92 against the webbing 26. At this time, the webbing 26 is put between the webbing guide 95 on the base back plate 91e and the clamp member 92, thereby preventing the draw-out of the webbing 26.

The clamp member 92 is a tubular member that is semicircular in cross section. The semicircular portion of the clamp member 92 is placed in a concavity 96 formed in the top end of the clamp holder 93, also semicircular in cross section. Support shafts 97 are protruded from both sides of the clamp member 92. The clamp member 92 is rotatably supported at the support shafts 97 in the concavity 96 of the top end of the clamp holder 93.

First clamp teeth 92g with the sharpened ends and second clamp teeth 92h with the flat ends are formed on a webbing opposing surface of the clamp member 92, which faces the webbing 26. The first clamp teeth 92g are extended beyond the second clamp teeth 92h, toward the webbing 26. The sharpened ends of the first clamp teeth 92g are stuck into the webbing 26, to thereby prevent the draw-out of the webbing 26. The flat ends of the second clamp teeth 92h are pressed against the surface of the webbing 26, and cooperates with the webbing guide 95 to prevent the draw-out of the webbing 26. The strength of the first clamp teeth 92g are selected such that in a state that the webbing is held by the clamp member 92, when a load acting on the sharpened ends of the first clamp teeth 92g that are stuck into the webbing 26 exceeds a predetermined value, the sharpened ends of the first clamp teeth 92g are sheared or deformed, to thereby release the webbing from being fixed by the tips of the first clamp teeth 92g.

In an emergency, for example, a vehicle collision, the clamping mechanism operates such that the clamp holder 93, which operates linking with an emergency locking mechanism, is swung to move the clamp member 92 toward the webbing 26, and the clamp member 92 holds the webbing. A stopper 98 is disposed to prevent the movement of the clamp member 92 toward the webbing 26 by contacting with the clamp holder 93 when the sharpened ends of the first clamp teeth 92g reach a predetermined depth of the webbing.

The stopper 98 is formed of a shaft member spanned between the base side plates 91a and 91b of the retractor base 91. A depth (the predetermined depth) of the sharpened ends of the first clamp teeth 92g in the webbing, which determines the timing at which the stopper 98 is brought into contact with the clamp member 93, indicates an initial holding state. In this state, the sharpened ends of the first clamp teeth 92g exhibit a preventing force enough to prevent the movement of the webbing 26 in the webbing draw-out direction, and the clamp member 92 is pressed against the webbing 26 to such an extent that the pushing force by the flat surfaces of the tips of the second clamp teeth 92h effectively prevent the draw-out of the webbing. At the predetermined depth, an increase of the tension acting on the webbing after it is held would not further increase the holding force of the clamp member 92.

In a normal mode of the vehicle travel where an abrupt deceleration caused by a vehicle collision, for example, is not generated, as shown in FIG. 32, the clamp member 92 is kept apart from the webbing 26. The stopper 98 is also kept apart from the clamp holder 93.

The operation of the clamping mechanism in the ninth embodiment in an emergency will be described. In an emergency, for example, a vehicle collision, the emergency locking mechanism 90 operates to turn a pawl 89 about a pawl pin 88, which passes through a lower tension plate 87, in the direction of an arrow Z. A stopper pawl 89a integral with the pawl 89 is made to engage a ratchet wheel 86, as shown in FIG. 33, thereby preventing the rotation of the winding shaft 4 in the webbing draw-out direction. When a force to turn in the webbing draw-out direction (the direction of an arrow $X_1$) acts on the winding shaft 4 in a state that the stopper pawl 89a engages the ratchet wheel 86, the lower tension plate 87, which rotatably supports the pawl 89, also turns in the same direction. At this time, the pawl pin 88 moves from the base back plate 91e to the front within an elongated hole 91f formed in the base side plate 91a of the retractor base 91. A cam pin 93a, which engages an engaging surface 87b of a throttle hole 87a formed in the lower tension plate 87, slides on the engaging surface 87b upwards (in the webbing draw-out direction) in FIGS. 32 and 33.

The cam pin 93a stands upright on the clamp holder 93. When the cam pin 93a slides on the engaging surface 87b with rotation of the lower tension plate 87, the clamp holder 93 turns about the clamp shaft 94 in the direction of an arrow B. With the turn of the clamp holder 93, the clamp member 92 placed in the front end of the clamp holder 93 moves toward the webbing 26 and is pressed against the webbing. When the clamp member 92 moves toward the webbing 26, it comes in contact with the stopper 98 (FIG. 33) and stops there. At this time, the first clamp teeth 92g of the clamp member 92 are stuck into the webbing and stopped at the predetermined depth, while the flat surfaces of the tips of the second clamp teeth 92h are pressed against the webbing 26. In this way, the webbing 26 is held and not drawn out.

Thus, the clamping mechanism operates interlocking with the emergency locking mechanism 90. With kinetic energy acting on the webbing from the occupant after the webbing is held, a tension acting on the webbing 26 increases. With the tension increase, a load acting on the first clamp teeth 92g of the clamp member 92 exceeds a predetermined value. At this time, the sharpened ends of the first clamp teeth 92g are sheared or deformed. The holding force decreases. As a result, the webbing is released from its holding state to allow the draw-out of the webbing 26 (FIG. 34). A tension acting on the webbing 26 is reduced, and a shock acting on the occupant because of holding the occupant by the webbing is lessened.

The movement of the clamp member 92 toward the webbing to stick first clamp teeth 92g into the webbing 26 is controlled by the stopper 98 at a position where the tips of the first clamp teeth 92g reach the predetermined depth of the webbing.

If the force acting on the clamp teeth for preventing the draw-out of the webbing includes a reaction force f2 to the pushing force applied to the webbing in addition to the shearing force f1 by the tension to the webbing, the reaction force f2 never increases with the increase of the tension of the webbing, and can be set to an extremely small value as comparing with the shearing force f1 by the increasing webbing tension. Therefore, the resultant force f3 which shears or deforms the clamp teeth can be considered to include only the shearing force f1 by the webbing tension.

By previously designing the strength of the first clamp teeth 92g allowing for a tension to remove the holding state, the timing of removing the holding of the webbing by the clamp removing mechanism can be made to exactly correspond to a tensile force acting on the webbing. Therefore, reduction of the maximum tension acting on the seat belt, shock absorption performance, and the like can be obtained as designed independently of shock operating conditions (deceleration conditions) in a vehicle collision.

In the ninth embodiment mentioned above, the stopper 98 is formed of a shaft member spanned between the base side plates 91a and 91b of the retractor base 91. The stopper 98 can be realized in various ways.

Figure 35:
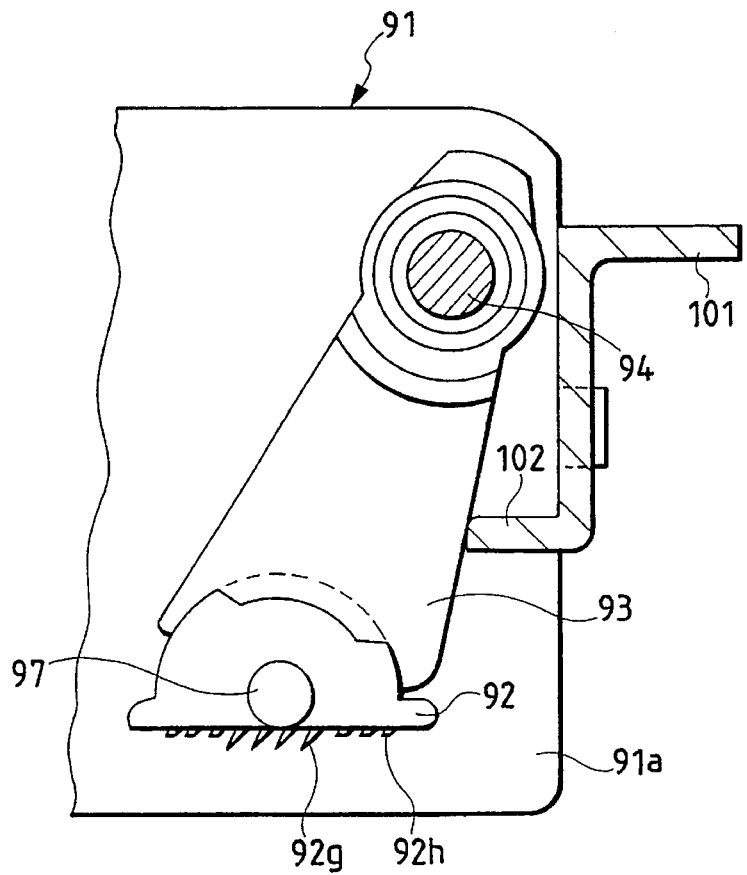
FIG. 35 is a diagram showing a stopper of a clamp member in a tenth embodiment of the present invention.

In a tenth embodiment of the present invention shown in FIG. 35, an upper stay 101, made of metal, which is fixed to the upper portion of the base side plate 91a of the retractor base 91 for fixing the retractor base 91 to the vehicle body, is bent to form a projecting portion 102 serving as the stopper.

Figure 36:
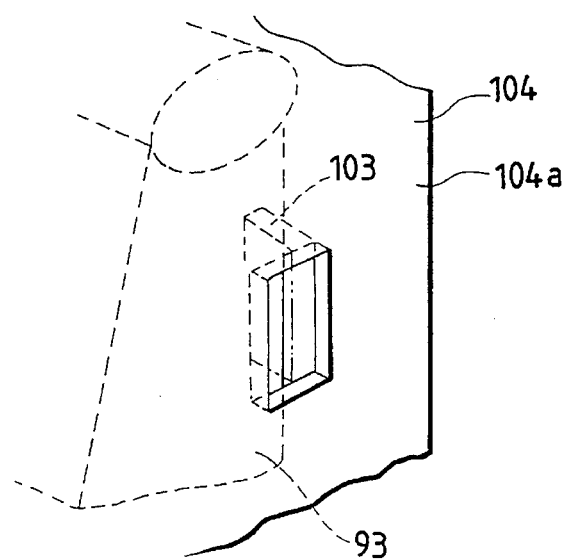
FIG. 36 is a diagram showing a stopper of a clamp member in an eleventh embodiment of the present invention.

In an eleventh embodiment of the present invention shown in FIG. 36, a part of the base side plate 104a of a retractor base 104 is raised toward the clamp holder 93, thereby forming a protruded piece 103. This protruded piece 103 is used as the stopper.

Figure 37:
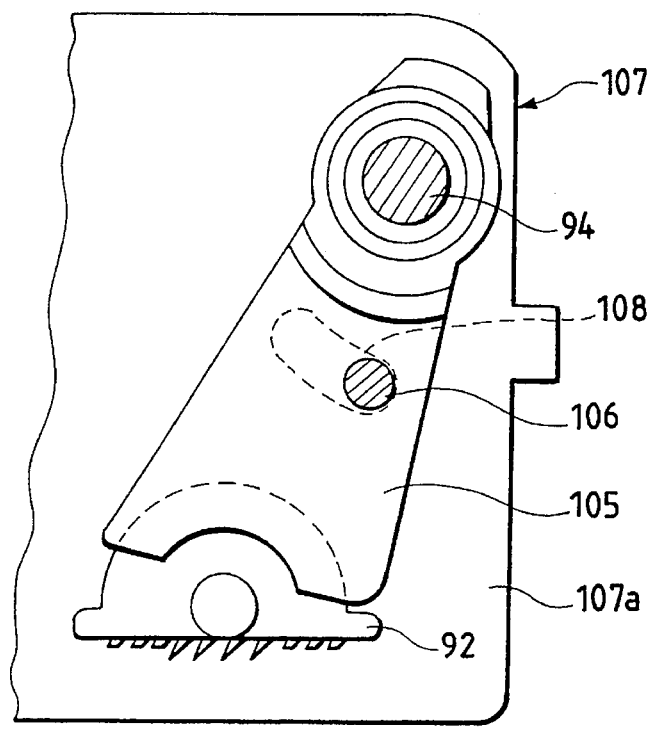
FIG. 37 is a diagram showing a stopper of a clamp member in a twelfth embodiment of the present invention.

In a twelfth embodiment of the present invention shown in FIG. 37, a positioning pin 106 is inserted into the clamp holder 105 while being arranged in parallel with respect to the clamp shaft 94. Both ends of the positioning pin 106 are movably placed in elongated holes 108 formed in the base side plates 107a of a retractor base 107. The positioning pin 106 serves as the stopper. Within the range of the movement of the positioning pin 106 within the elongated holes, the first clamp teeth 92g can be stuck into the webbing.

In the retractor with the clamping mechanism according to the present invention, when a tension exceeding a predetermined value acts on the webbing in a vehicle emergency, the guide member moves in the webbing draw-out direction while plastically deforming the holding device, with the movement of the clamp member in the webbing draw-out direction. After the removal of the guide member, the guide member moves in the webbing draw-out direction while plastically deforming the holding device for preventing its movement. At the same time, the webbing is tightened on the winding shaft.

A kinetic energy of the occupant is effectively consumed by a deformation resistance of the holding device and a winding resistance of the webbing. Further, an abrupt decrease of the tension to the webbing is prevented when the clamp is removed. The webbing is drawn out of the retractor while the draw-out force is kept at a fixed value.

By preventing the abrupt decrease of the tension of the webbing after the clamp is removed, an efficient absorption of the kinetic energy of the occupant at the initial stage of the collision is realized. The load increase following the load decrease can be prevented, thereby effectively reducing the shock to the occupant.

The holding device is deformed, and the guide member, together with the clamp member, moves in the webbing draw-out direction, thereby to remove the clamping mechanism. Therefore, there is no need for movably attaching the main body of the retractor to the vehicle body. The retractor base can be firmly attached to the panel of the vehicle body. The mounting of the retractor on the vehicle body is excellent.

In the retractor with the clamping mechanism according to the present invention, in an initial stage of holding the webbing by the clamping mechanism, the clamp member holds the webbing with all of the clamp teeth formed on the clamp member, thereby preventing the draw-out of the webbing. When a tension acting on the webbing after the webbing is held exceeds a predetermined value, plastic deformation of the guide member for guiding the clamp member starts. The clamp member which holds the webbing moves along the webbing. Otherwise, when the plastic deformation of the holding device starts, the guide member moves in the webbing draw-out direction along with the clamp member. Through the movement of these members, kinetic energy transferred from the occupant to the webbing is absorbed to thereby hold back an increase of the tensile force acting on the webbing.

When the plastic deformation of the guide member or the holding device terminates and the clamp member cannot move in the webbing draw-out direction, the tension acting on the webbing increases. In this case, when the tension reaches a predetermined value, the clamp teeth are sheared or deformed. The holding force of the webbing decreases to allow the webbing to be drawn out by the corresponding amount. As a result, the tension acting on the webbing is reduced. The clamp teeth, which are used for reducing the holding force by their shearing or deformation, are limited to a portion of the clamp teeth. Because of this, there is no chance that the holding force is abruptly reduced. Accordingly, reduction of the tension acting on the webbing that is caused by the shearing or the deformation is gentle. When the extension of the webbing caused by the shearing or the deformation of the clamp teeth is completed, the tension acting on the webbing increases again. However, the increase of the tension this time is not so high because of the kinetic energy absorption and the tension reduction in the previous operation.

Accordingly, the timing to release the webbing from being held by the clamping mechanism can be made to exactly correspond to the tension acting on the webbing. The variation of the tension acting on the seat belt can be made gentle. The amplitude of the variation of the tension can be reduced. Consequently, a shock the occupant receives from the seat belt in an emergency can be reduced effectively.

Also in the retractor with the clamping mechanism according to the present invention, in an emergency, for example, a vehicle collision, the clamping mechanism operates to press the clamp member against the webbing drawn out of the winding shaft onto the lower plate mounted on the retractor base. The clamp teeth of the clamp member are stuck into the webbing, thereby preventing the draw-out of the webbing. The movement of the clamp member toward the webbing to stick the clamp teeth into the webbing is controlled by the stopper at a position where the tips of the clamp teeth reach the predetermined depth of the webbing. If the force acting on the clamp teeth for preventing the draw-out of the webbing includes a reaction force f2 to the pushing force applied to the webbing in addition to the shearing force f1 by the tension to the webbing, the reaction force f2 never increases with the increase of the tension of the webbing, and can be set to an extremely small value as comparing with the shearing force f1 by the increasing webbing tension. Therefore, the resultant force f3 which shears or deforms the clamp teeth can be considered to include only the shearing force f1 by the webbing tension.

By previously designing the strength of the clamp teeth allowing for a tension to remove the holding state, the timing of removing the holding of the webbing by the clamp removing mechanism can be made to exactly correspond to a tensile force acting on the webbing. Therefore, reduction of the maximum tension acting on the seat belt, shock absorption performance, and the like can be obtained as designed independently of shock operating conditions (deceleration conditions) in a vehicle collision.

What is claimed is:

1. A retractor with a clamping mechanism for directly holding a webbing in an emergency vehicle, comprising:

a retractor base;

a lower plate fixed to the retractor base;

a movable clamp member for holding a webbing between the lower plate and the clamp member;

a guide member for guiding the clamp member to a webbing holding position; and a holding means for preventing a movement of the guide member in a webbing draw-out direction, the holding means including a plastically deforming portion which is deformed in accordance with a further movement of the clamp member in the webbing draw-out direction beyond the webbing holding position;

wherein the guide member is fixed to the holding means so that the clamp member is moved in the webbing draw-out direction, while the clamp member holds the webbing, by deforming the plastically deforming portion of the holding means in accordance with the further movement of the clamp member in the webbing draw-out direction when a tensile force exceeding a predetermined value acts on the webbing.

2. The retractor of claim 1, wherein the retractor base includes:

a pair of base side plates opposing each other; and a base back plate coupling the base side plates, each of the base side plates having a through hole, the through hole having a guide portion extending along the base back plates, and wherein the guide member includes both ends inserted into the guide portion and is movably disposed in parallel with respect to the base back plate.

3. The retractor of claim 2, wherein the holding means includes:

mounting portions formed on both side ends in a width direction thereof for mounting the holding means to the base side plates of the retractor base; and an upper plate fixing portion for fixing the guide member, and wherein the plastically deforming portion of the holding means is coupled to the upper plate fixing portion, a lower end portion of the plastically deforming portion forming a pair of legs bent in an inner side of the retractor base to be J-shaped in cross section.

4. The retractor of claim 2, wherein the holding means includes:

a mounting portion formed at an upper end of the holding means for mounting the holding means to the base side plates of the retractor base;

an upper plate fixing portion formed at a lower end of the holding means for fixing the guide member; and a corrugated plastically deforming portion extending upward from the upper plate fixing portion.

5. The retractor of claim 4, wherein the holding means has a width longer than a distance between the base side plates of the retractor base, and a height of a corrugation of the corrugated plastically deforming portion is substantially equal to an opening width of the guide portion of the through hole.

6. The retractor of claim 1, wherein the retractor base includes:

base side plates opposing each other; and a base back plate coupling the base side plates, each of the base side plates having a guide groove extending along the base back plate, wherein the guide member includes:

a slide plate having both ends inserted in the guide groove; and a through hole punched in a longitudinal direction of the guide member, and wherein the holding means includes:

slits formed in the base side plates of the retractor base in parallel with respect to the guide groove, and a through pin inserted into the through hole of the guide member, wherein each of the slits includes a support opening portion in a lower portion thereof, and having the substantially same shape as a shape in cross section of the through pin, and a narrow hole portion extending upward from the support opening portion and having a width narrower than a diameter of the through pin.

7. A retractor with a clamping mechanism for directly holding a webbing in a vehicle emergency, comprising:

a retractor base;

a lower plate fixed to the retractor base;

a movable clamp member for holding a webbing between the lower plate and the clamp member, wherein the clamp member includes:

clamp teeth for clamping and engaging the webbing to a webbing opposing surface of the clamp member, the clamp teeth having first clamp teeth with sharpened ends and second clamp teeth with flat ends;

a flat portion located on an opposite side of the webbing opposing surface;

a rear edge located at a rear end of the flat portion; and a flat surface located on a front end of the clamp member;

a guide member for guiding the clamp member to a webbing holding position, wherein the guide member includes:

an inclined portion sliding on the flat portion of the clamp member;

a guide portion extending from a front end of the inclined portion in parallel with respect to the webbing; and a stopper portion coupling to a front end of the guide portion, wherein the sharpened ends of the first clamp teeth are sheared or deformed when a tensile force acting on the webbing exceeds a first value, wherein the inclined portion and the guide portion are deformed by the rear edge of the clamp member in accordance with a movement of the clamp member in a webbing draw-out direction when a load acting on the guide member exceeding a second value, and wherein the first value is set to be larger than the second value.

8. The retractor of claim 7, wherein the lower plate includes a recess for receiving the webbing in a front end portion, the recess allowing a part of the first clamp teeth, which are stuck to the webbing, to disengage from the webbing when a plastic deformation of the guide member terminates.

9. The retractor of claim 7, wherein the stopper portion of the guide member prevents the clamp member from moving beyond a predetermined distance in the webbing draw-out direction after the clamp member has moved to the webbing holding position.

10. A retractor with a clamping mechanism for directly holding a webbing in an emergency vehicle, comprising:

a retractor base;

a lower plate fixed to the retractor base;

a movable clamp member for holding a webbing between the lower plate and the clamp member, wherein the clamp member includes clamp teeth for clamping and engaging the webbing to a webbing opposing surface of the clamp member, the clamp teeth having first clamp teeth with sharpened ends and second clamp teeth with flat ends;

a guide member for guiding the clamp member to a webbing holding position; and a holding means for preventing a movement of the guide member in a webbing draw-out direction, the holding means including a plastically deforming portion which is deformed in accordance with a further movement of the clamp member in the webbing draw-out direction beyond the webbing holding position, wherein the sharpened ends of the first clamp teeth are sheared or deformed when a tensile force acting on the webbing exceeds a first value, wherein the guide member is fixed to the holding means so that the clamp member is moved in the webbing draw-out direction, while the clamp member holds the webbing, by deforming the plastically deforming portion of the holding means in accordance with the further movement of the clamp member in the webbing draw-out direction when a load acting on the holding means exceeding a second value, and wherein the first value is set to be larger than the second value.

11. The retractor of claim 10, wherein the retractor base includes:

a pair of base side plates opposing each other; and a base back plate coupling the base side plates, each of the base side plates having a through hole, the through hole having a guide portion extending along the base back plates, and wherein the guide member includes both ends inserted into the guide portion and is movably disposed in parallel with respect to the base back plate.

12. The retractor of claim 11, wherein the holding means includes:

mounting portions formed on both side ends in a width direction thereof for mounting the holding means to the base side plates of the retractor base; and an upper plate fixing portion for fixing the guide member, and wherein the plastically deforming portion of the holding means is coupled to the upper plate fixing portion, a lower end portion of the plastically deforming portion forming a pair of legs bent in an inner side of the retractor base to be J-shaped in cross section.

13. The retractor of claim 11, wherein the holding means includes:

a mounting portion formed at an upper end of the holding means for mounting the holding means to the base side plates of the retractor base;

an upper plate fixing portion formed at a lower end of the holding means for fixing the guide member; and a corrugated plastically deforming portion extending upward from the upper plate fixing portion.

14. The retractor of claim 13, wherein the holding means has a width longer than a distance between the base side plates of the retractor base, and a height of a corrugation of the corrugated plastically deforming portion is substantially equal to an opening width of the guide portion of the through hole.

15. The retractor of claim 10, wherein the retractor base includes:

base side plates opposing each other; and a base back plate coupling the base side plates, each of the base side plates having a guide groove extending along the base back plate, wherein the guide member includes:

a slide plate having both ends inserted in the guide groove; and a through hole punched in a longitudinal direction of the guide member, and wherein the holding means includes:

slits formed in the base side plates of the retractor base in parallel with respect to the guide groove; and a through pin inserted into the through hole of the guide member, wherein each of the slits includes a support opening portion in a lower portion thereof, and having the substantially same shape as a shape in cross section of the through pin, and a narrow hole portion extending upward from the support opening portion and having a width narrower than a diameter of the through pin.

16. A retractor with a clamping mechanism for directly holding a webbing in an emergency vehicle, comprising:

a retractor base;

a lower plate fixed to the retractor base;

a movable clamp member for holding a webbing between the lower plate and the clamp member, the clamp member including clamp teeth for clamping and engaging the webbing to a webbing opposing surface of the clamp member, wherein the clamp teeth have:

first clamp teeth with sharpened portions for preventing the webbing from drawing out by sticking the sharpened portions to the webbing; and second clamp teeth with flat portions for preventing the webbing from drawing out by pressing the flat portions against a surface of the webbing and cooperating with the lower plate to hold the webbing; and a guide member for guiding the clamp member to a webbing holding position, wherein the guide member includes:

a slide surface for guiding the clamp member to the webbing holding position; and a stopper formed on a front end of the slide surface of the guide member for preventing the clamp member from moving toward the webbing at a position where the sharpened portions of the first clamp teeth are stuck to the webbing.

17. The retractor of claim 16, wherein the sharpened ends of the first clamp teeth are sheared or deformed when a tensile force acting on the webbing exceeds a predetermined value.

18. A retractor with a clamping mechanism for directly holding a webbing in a vehicle emergency, comprising:

a retractor base;

a winding shaft rotatably supported in a retractor base for winding the webbing;

a webbing guide for guiding the webbing drawn out of the winding shaft, along the retractor base;

a clamp holder supported swingably about a clamp shaft supported at both ends thereof by the retractor base;

a clamp member mounted in a front end of the clamp holder for holding the webbing between the webbing guide and the clamp member by a swinging movement of the clamp holder, the clamp member including clamp teeth for clamping and engaging the webbing to a webbing opposing surface of the clamp member, wherein the clamp teeth have:

first clamp teeth with sharpened portions for preventing the webbing from drawing out by sticking the sharpened portions to the webbing; and second clamp teeth with flat portions for preventing the webbing from drawing out by pressing the flat portions against a surface of the webbing and cooperating with the webbing guide to hold the webbing; and a stopper disposed for preventing the clamp member from moving toward the webbing by contacting with the clamp holder when the sharpened portions of the first clamp teeth are stuck to the webbing, wherein the sharpened portions of the first clamp teeth are sheared or deformed when a tensile force acting on the webbing exceeds a predetermined value.

19. The retractor of claim 18, wherein the stopper comprises a shaft member spanned with the retractor base.

20. The retractor of claim 18, wherein the stopper comprises a projecting portion of an upper stay formed in an upper portion of the retractor base for fixing the retractor base to a vehicle body.

21. The retractor of claim 18, wherein the stopper comprises a protruded piece raising a part of the retractor base toward the clamp holder.

22. The retractor of claim 18, wherein the stopper comprises a positioning pin inserted into the clamp holder.

* * * * *